(12) United States Patent
Dukach et al.

(10) Patent No.: US 6,812,851 B1
(45) Date of Patent: Nov. 2, 2004

(54) APPARATUSES FOR DISPLAYING INFORMATION ON VEHICLES

(75) Inventors: Semyon Dukach, Boston, MA (US); Matt W. D. Mankins, Somerville, MA (US); Leonid Fridman, Somerville, MA (US); Brad Harkavy, Cambridge, MA (US); Michael Platsidakis, Mansfield, MA (US)

(73) Assignee: Vert, Inc., Boston, MA (US)

( * ) Notice: Subject to any disclaimer, the term of this patent is extended or adjusted under 35 U.S.C. 154(b) by 0 days.

(21) Appl. No.: 09/751,664

(22) Filed: Dec. 29, 2000

Related U.S. Application Data

(63) Continuation-in-part of application No. 09/618,862, filed on Jul. 18, 2000, now Pat. No. 6,701,143, and a continuation-in-part of application No. PCT/US00/34549, filed on Dec. 15, 2000.
(60) Provisional application No. 60/226,000, filed on Aug. 16, 2000, provisional application No. 60/237,238, filed on Oct. 2, 2000, and provisional application No. 60/170,914, filed on Dec. 15, 1999.

(51) Int. Cl.[7] .................................................. G08B 5/00
(52) U.S. Cl. .............................. 340/815.4; 340/425.5; 340/691.6; 340/693.3; 345/212
(58) Field of Search ......................... 340/425.5, 815.4, 340/468, 479, 691.6, 539.1, 693.3; 345/212; 307/10.1; 386/125, 464; 40/546

(56) References Cited

U.S. PATENT DOCUMENTS

| | | | | |
|---|---|---|---|---|
| 4,928,084 A | * | 5/1990 | Reiser | 340/479 |
| 4,974,354 A | * | 12/1990 | Hembrook, Jr. | 40/546 |
| 5,223,844 A | * | 6/1993 | Mansell et al. | 342/357.07 |
| 5,825,281 A | * | 10/1998 | McCreary | 340/425.5 |
| 6,060,993 A | * | 5/2000 | Cohen | 340/691.6 |
| 6,067,011 A | * | 5/2000 | Leslie | 340/468 |
| 6,404,423 B1 | * | 6/2002 | Kivela et al. | 345/212 |
| 6,418,273 B1 | * | 7/2002 | Lubinski et al. | 386/125 |
| 6,476,800 B2 | * | 11/2002 | Millman et al. | 345/212 |

* cited by examiner

*Primary Examiner*—Benjamin C. Lee
(74) *Attorney, Agent, or Firm*—Burns & Levinson LLP; Yan Lan; Frederick C. Williams

(57) ABSTRACT

A system for publicly displaying messages can comprise an automotive vehicle having an automotive electrical system including an ignition system and a generator and a publicly visible electronic display; video drive circuitry for generating images (which can include advertisements) on the display; display-power circuitry for receiving power from the vehicle's automotive electrical system, supplying that power to the display, and automatically reducing the power supplied to the display after the vehicle's ignition is turned off. The display-power circuitry can automatically increase power to the display when the vehicle's ignition is turned back on. A computer can control the images on the display and the display-power circuitry can automatically reduce power to the display independently of whether the computer is operating. A system for publicly displaying messages can also comprise an automotive vehicle having a publicly visible electronic display; a computer for showing various messages (which can include advertisements) on the display; an input device which can be used by an occupant of the vehicle to generate one or more emergency signals; and a connection supplying such emergency signals to the computer. The computer can respond to the emergency signal by showing an emergency message on the display. A radio can be connected to the computer to supply information to the computer about messages to be displayed and to respond to the generation of an emergency signal by sending an emergency message to a remote electronic system.

3 Claims, 56 Drawing Sheets

```
-Energy Conservation Scheme~1530
    -After ignition is shut off~1532
        -at first time after shut off~1534
            -decrease power to displays~1536
        -at second longer time after shut off~1538
            -turn off power to displays by hardware switch~1540
        -at third still longer time after shut off~1542
            -start computer shut down~1544
        -after computer is shut down,~1546
            -turn off power to computer~1548
    -after ignition is turned on~1550
        -after first time after turn on~1552
            -boot computer~1554
        -after second longer time after turn on~1556
            -provide full power to display backlights~1558
```

| Zone ⌐116 | Time ⌐118 | 1st Display Msg ⌐120 | 2nd Display Msg ⌐122 | ⌐114 |
|---|---|---|---|---|
|  |  |  |  | ⎫ |
|  |  |  |  | ⎬ 124 |
|  |  |  |  | ⎭ |
|  |  |  |  |  |
|  |  |  |  | ⎫ |
|  |  |  |  | ⎬ 124 |
|  |  |  |  | ⎭ |
|  |  |  |  |  |

FIG. 2

| Time | Data Stream1 ⌐186 | Data Stream2 | Data Stream3 ⌐186 | ... | Data StreamN | 184 |
|---|---|---|---|---|---|---|
| Time1 | Disp.Msg1011 | Disp.Msg8359 | Disp.Msg1011 | ... | Disp.Msg1011 | 132 |
| Time2 | ↓ | Disp.Msg4930 | Disp.Msg6576 | ... | Disp.Msg3655 |  |
| Time3 | ↓ | Disp.Msg2948 | ↓ | ... | ↓ |  |
| Time4 | Disp.Msg4834 | Disp.Msg7483 | ↓ | ... | ↓ | 132O |
| Time5 | Disp.Msg0537 | Disp.Msg0486 | ↓ | ... | ↓ |  |
| Time6 | Disp.Msg1011 | Disp.Msg4875 | Disp.Msg3987 | ... | ↓ |  |
| Time7 | ↓ | Disp.Msg3645 | ↓ | ... | Disp.Msg0758 | 132 |
| Time8 | Disp.Msg1065 | Disp.Msg2715 | ↓ | ... | Disp.Msg4545 |  |
| Time9 | ↓ | Disp.Msg2976 | ↓ | ... | Disp.Msg5675 |  |
| Time10 | ↓ | Disp.Msg3746 | ↓ | ... | ↓ | 132P |
| Time11 | Disp.Msg8629 | Disp.Msg1457 | ↓ | ... | ↓ |  |
| Time12 | ↓ | Disp.Msg2847 | Disp.Msg6758 | ... | Disp.Msg8780 |  |
| Time13 | ↓ | Disp.Msg3546 | ↓ | ... | ↓ |  |
| Time14 | Disp.Msg0947 | Disp.Msg2332 | ↓ | ... | ↓ | 132R |
| ... | ... | ... | ... | ... | ... |  |

FIG. 8

-Mobile Unit's Controller Main Loop~186
    -...
        -If receive message from central system~188
            -Read message to determine its type~190
            -If message is a display-selection message~192
                -For each display message identified in display-selection message~194
                    -If identified display message is part of display-selection message~196
                        -cause display message to be shown on display~198
                    -else if identified display message is stored in cache memory~200
                        -Cause identified display message's data to be read from memory and shown on identified display~202
                    -else if the identified display message is a message in a broadcast data stream~204
                        -cause the data-stream receiver to receive the identified display message~206
                        -cause the identified display message to be shown on the mobile unit's display in real time~208
                    -else send a locator signal indicating mobile unit does not have requested message~210
                -if message contains a locator-signal period~212
                    -set mobile unit's locator-signal period to period specified in signal~214
            -if message is a caching message~216
                -cache display messages identified in caching message~218
            -if message is a locator-signal-period message~220
                -set mobile unit's locator-signal period walking were sitting to period specified in signal~222
    -...

FIG. 9

-Display-selection message~224

-Header~226
    -Mobile Unit ID~228
    -$1^{st}$ Display Message ID~230
    -$2^{nd}$ Display Message ID~232
    -[locator-signal period]~234
    -...

FIG. 10

-Display-selection message~224A

-Header~226
    -Mobile Unit ID~228
    -$1^{st}$ Display Message~236
    -$2^{nd}$ Display Message~236
    -[locator-signal period]~234
    -...

FIG. 11

-locator signal~240
    -header~242
    -mobile unit ID~244
    -GPS coordinates~246
    -ID of display messages currently being shown on each display ~248
    -Vehicle speed~250
    -[missing selected display messages]~252
    -[intended destination]~254

FIG. 12

-Mobile Unit's locator-signal daemon~260
    -if time since last transmission of a locator signal is equals locator-signal period~261
        -transmit a locator signal including~262

FIG. 13

-Mobile Unit's vehicle destination-input daemon~264
    -if vehicle destination has been entered~266
        -send a wireless locator signal to central system also informing it of the intended location~268

FIG. 14

-Mobile Unit's speed monitoring daemon~270
    -read vehicle speed generated by speed sensor~272
    -if vehicle speed or direction of mobile unit has change by more than a certain amount~274
        -vary locator-signal period accordingly~276

FIG. 15

-Central System's Locator Signal Response Programming~280
    -if receive a locator signal~282
        -associate a geographic location with the mobile unit which sent the signal~284
        -determine which geographic zones the location is in~286
        -if display messages which locator signal indicates are being shown on mobile unit are different than those in the last display-selection message sent to the mobile unit~288
            -indicate difference in billing data base~290
        -if the mobile unit is in a geographic zone for which different display message should be shown than those in the locator signal~292
            -select the display messages to be displayed by the mobile unit based on the zone and current time~294
            -send a display-selection message to the mobile unit identifying the selected display messages to be shown on the mobile unit~296
            -record zone, time, and display messages associated with display-selection message in billing data base~298
        -record information about the location of the mobile unit derived from its locator signal in the mobile unit location history data base~300
        -if variable frequency locator signals are being used~302
            -determine, from locator signal, a distance from the mobile unit to the boundary of its current geographic zone~304 I
            -based on this distance and the speed of the vehicle, calculate the length of time before the mobile unit is likely to exit its current geographic zone~306
            -based on this length of time, calculate a locator-signal period, indicating how long it should be before the given mobile unit transmits each of one or more subsequent locator signal~308
            -send a wireless locator-signal-period message to the given mobile unit containing said locator-signal period~310
        -if locator signal includes intended destination~312
            -select a subset of a larger set of display messages which are to be cached by storage in the memory of a given mobile unit as a function of one or more of said geographic locations which have been associated with the given mobile unit and of intended location~314
            -send a wireless caching message to the given mobile unit informing the given mobile unit to cache the selected subset of display messages~316
    -...

FIG. 16

-Central System's Bill generation Programming~320
    -based on the billing records, create bills for individual advertising clients with the amount of each such bill being a function of the number and length of displays of their display messages, and the time and zones in which such displays were made~322

FIG. 17

-Central System's On-Line Site programming~420
    -provide downloadable point and clickinterface allowing a user to:~422
        -obtain content explaining:~424
            -system's features~426
            -how to purchase advertising on system~428
            -how to respond to advertisements on system~430
            -system's contests and promotions~432
        -use geosynchron selling interface to:~1152
            -examine geosynchrons by time-location map~1154
            -search for geosynchrons by criteria~1156
            -select or deselect one or more geosynchrons shown in map or search results~1158
            -add or subtract selected geosynchrons from a selected group~1160
            -select, add, or subtract geosynchron groups~1162
            -purchase or bid for selected geosynchrons~1164
            -if select auto-placement~1166
                -select criteria for automatic display of messages by system~1168
            -upload advertisement message~1170
                -including text, bitmapped, bitmapped-animations, vector-based animation, and real-time feed~1172
            -select or reselect uploaded message to be shown in purch.ased geosynchron~1174
            -sell or resell geosynchrons~1176
            -track showing of messages in purchased geosynchrons~1178
            -track showing of auto-placement messages~1180
    -bill customers for display of advertisements at prices associated with the time and place of their showing~1181

-see traffic information collected from mobile units, with ability to see traffic information for given locations and at given times~438
        -see weather information collected from mobile units, with ability to see information for given location and time~440
        -navigate 3D image of city, by location and time~441
        -select to have directions using 3D images to give visual directions~442
        -see current images from cameras on local units~443
        -upload content for non-commercial display on mobile units~444
        -...

FIG. 23

-Central System Geosynchron Selling Programming~446
    -...
    -if user selects a particular display of geosynchrons~448
        -generate and show a specified display of a set of geosynchron ~450
    -if user click on a geosynchron~1182
        -select geosynchron~1184
    -if user selects a geosynchron selection criteria~452
        -search for and generate a ranked list display or map display of geosynchrons matching or best matching the criteria~454
    -if user selects auto-placement criteria~456
        -system automatically shows messages at certain times and places as function of customer selected criteria~458
    -if user selects auto-bidding criteria~1186
        -system automatically places bids on geosynchrons based on customer seleded auto-bidding criteria~1188
    -if user selects to estimate price of a selected geosynchron set~460
        -display distribution of probable prices for set based on price (fixed or currently bid) and past message display patterns~462
    -if user selects to place geosynchron which it owns for resale~464
        -provide user with an interface allowing it to identify its AdvertiserID, the GeosynchronOwnershipID for sale, the asked price, if fixed price sale; and the starting bid, minimimum price, and closing time, if auction~466
        -if receive proper re-sale information from user~468
            -record offer, and place geosynchron in system's inv of entory~470
    -if user selects to place geosynchrons for sale for the first time~471
        -provide user with an interface which allows it to enter information defining the geosynchron and the term under which it is for sale~472
        -if receive proper sale information from user~473
            -record offer, and place geosynchron in the system's inventory~474

FIG. 24A

-if user selects to purchase a fixed price ad~475
    -if purchase is authorized~476
        -record advertiser's purchase in billing records~477
        -send advertiser a GeosynchronOwnershipID entitling it to associate ad
        with geosynchron in schedule~478
-if user or auto-bid programming selects to bid on auctioned ad~479
    -If bid is higher than current highest bid~480
        -place bid and advertiserID in database for geosynchron~482
    -return indication whether bid was successful~484
-If user requests to see current bid on auctioned geosynchron~486
    -display it~488
-if time for closing bidding on one or more geosynchrons is up~490
    -for each geosynchron whose bidding has just closed~492
        -declare highest qualified bidder the winner, and record winning price
        for the geosynchron~494
        -send winner a msg informing it that it has won geosynchron which
        includes a GeosynchronOwnershipID~496
-Associate a fixed price with each fixed price geosynchron offered for sale based
on~498
    -auction prices for comparable geosynchron~500
    -percent of similar geosynchrons which have sold at various prices~502
    -demographics, display traffic, viewer traffic, auction prices, click-throughs on
    website, time, and other relevant attributes of the geosynchron~504
    -human set prices~506

FIG. 24B

-geosynchron display interface~508
- -provide controls enabling user to select~510
    - -ad display device type~512
        - -including fixed location; taxi displays; bus displays; PDA displays; location of display on vehicle (e.g., side or back) ...~514
    - -sale type~516
        - -including auctioned ads; fixed price ads: ...~518
    - -ad type~520
        - -including whole geosynchrons; geosynchron time slices; personal announcements; display-time-limited geosynchrons, unused time geosynchrons, secondary market geosynchrons; sponsorships geosynchrons; ...~522
    - -time~524
    - -location~526
    - -geosynchron color scheme~528
        - -including:~530
            - -demographic info~532
            - -mobile unit traffic~534
            - -price ~536
            - -buys made by one or more other advertiser~538
            - -degree of match with criteria selected by customer with geosynchron selection interface~540
            - -any other criteria useable in geosynchron selection interface~542
            - -whether geosyncrhon is selected, non-selected in one or more geosynchron groups~548
    - -geosynchron display scheme~550
        - -including map and scale of map or text list~552
- -to open, edit, or save a geosynchron set~554
-if user selects to show geosynchrons with current settings~556
- -generate geosynchron display according to selected settings~558
-if user select a geosynchron shown in such a geosynchron display~560
- -use can choose to do the following to selected geosynchron~562
    - -to deselect it~564
    - -to see demographic info on geosynchron~566
    - -to see images from mobile unit cameras recorded during corresponding geosynchrons in past~568
    - -to see data extracted from cameras on mobile units during corresponding geosynchrons in past~570
    - -to buy or bid on it~572
    - -if currently owns selected geosynchron, to off it for re-sale~574
    - -if the geosynchron is an expired geosynchron owned by the user~576
        - -can select to to see actual images recorded during display of user's own advertisement, if available~578
        - -can select to see statistics about audience during display of ad, if available~580

FIG. 25

-geosynchron selection interface~582
    -provide controls enable user to make one or more weighted selections from each of following criteria (i.e., parameters):~584
        -ad display device type~586
            -including fixed location, taxi, bus, PDA, location of display on vehicle (e.g., side or back) ...~588
        -sale type~590
            -including auctioned ads; fixed price ads: ...~592
        -ad type, including~594
            -including whole geosynchrons; geosynchron time slices; personal announcements; unused time, secondary market; sponsorships of programming such as news, time, weather, traffic, contests; ...~596
        -time profile~614
            -including time of day, day of week, work days, weekends, holidays, rush hours, nearness in time to events, ....
        -location profile~616
            -including~618
                -nearness to Residential, Entertainment, Universities, Parks, Government Buildings, Tunnels, Bridges, Business Districts, Tourist Areas, Art Galleries, Restaurants, Movie Theatres, 24 hour stores, Toll Booths, High Traffic Areas, Airports, Taxi Stands, subway stop, types of store, named businesses,... ~620
                -City, town, Geon list~622
        -demographic profile~600
            -including~602
                -population, including age, education, income, education, language, ethnic group, behavioral or psychological characteristic, and sex of population, if available~604
                -audience, including number, age, education, income, education, size, sex, distance and orientation relative to display, type of car, time to watch display, and current activiity of audience, if available~606
                -household value~608
                -retail sales~610
                -number of employees~612

FIG. 26A

-price profile~624
    -including least/most expensive n%; under/over running average for region; less/greater than $n; least/most price fluctuation;...~626
    -total price limit~627
-event profile~628
    -including by named event, by event type~630
-ad purchaser~632
    -including by name; by business; by size; by location; by advertiserID (including a user's own id)~634
-geosynchron sets~636
    -including a set or one or more geons or geosynchrons~638
-enable user to select:~640
    -run exact match or best match~641
    -to run matching programming that generates and displays a geosynchron set from current parameter set~642
    -to name and save a geosynchron set~644
    -to open or save a geosynchron selection parameter set~646
    -to remove geosynchrons for a geosynchron set~648
    -to add or substract geosynchron sets ~650

FIG. 26B

-Optimization Programming~652
    -Define multidimensional space as function of customer selected criteria and customer selected weights associated with those criteria respectivelyn~653
    -find distance between one or more points in that space representing values of customer selected criteria and one or more points represented by each of a plurality of geosynchrons is indicated by criteria values associated with those geosynchrons in demographic and/or other databases~654
    -select a set of one or more best scoring geosynchrons which comply with the price limit, if any, selected by the customer~655

FIG. 27

-Central System Public Ad Selling API ~674
- ...
    -selectGeosynchrons (AdvertiserID, AdDisplayType, SaleType, AdType, DemographicProfile, TimeProfile, LocationProfile, PriceProfile, EventProfile, AdPurchaser, StartingGeosynchronSet)~675
    -bidForGeosynchron (AdvertiserID, GeosynchronID, Price);~676
    -showCurrentGeosynchronBid (AdvertiserID, GeosynchronID)~677
    -uploadAd(AdvertiserID, AdURL)~678
    -pickAdForGeosynchron (AdvertiserID, AdID, GeosynchronOwnershipID);~679
    -getGeonForCensusBlock (AdvertiserID, CensusBlockNumber);~680
    -getGeonForCoordinates (AdvertiserID, Longitude, Latitude)~681
    -getGeonForAddress (AdvertiserID, StreetAdr1, StreetAdr2, City, State, Zip)~682
    -getGeosynchronForGeon(AdvertiserID, GeonID, Time)~683
    -getInfoOnGeosynchron(AdvertiserID, GeosynchronID, TimeSpec, infoForm)~684
    -getInfoOnGeon (advertiserID, geonID, infoForm)~685
    -getAccountInfo (AdvertiserID, AccountID, InfoForm)~686
    -resellGeosynchron (AdvertiserID, GeosynchronOwnershipID, FixedPrice, MinPrice, Deadline)~687
    -getGeosynchronDisplayInfo (AdvertiserID, GeosynchronOwnershipID, infoForm)~688
- ...

FIG. 28

-Central System Personal Message Selling Programming~694
- ...
    -if user selects to purchase a personal Message~695
        -provide interface allowing user to either upload a message or select, compose, and/or edit a personal message~696
        -provide interface allowing user to see information, such as price, demographics, and audience, associated with various personal announcement geosynchrons~697
        -provide interface allowing user to see location and destination of display units near a given location which have personal announcement geosynchron availability~698
        -provide interface allowing a user to purchase the geosynchron in which the message is to be displayed~699
            -displayed at a selected fixed location, time, and duration~700
            -displayed automatically upon proximity to particular wireless device~701
            -displayed at an exact time and location triggered by user command, such as by web, phone, i-phone, or PDA~702
        -provide interface for billing user for a personal message~703
- ...

FIG. 29

-Central System's Ad Response Programming~705
    -if receive a wireless data, wireless phone, landline phone, internet, or local communication device message~706
        -down
        -ad response msg specifying time and location of ad interested in~718
            -record time and location selection~719
            -send client msg with identification and link to ads shown near the location and time, and standard ad response interface~720
        -ad selection msg~721
            -record selection~722
            -respond by transmitting currently displayed message's associated user response, which can include~762
                -additional information about message or its advertiser~764
                -instant messaging message~766
                -electronic coupon~768
                -map to advertiser's nearest store~772
                -link to advertiser's web site~774
                -phone connection to advertiser~775
                -audio to accompany message~776
                -selectable list of such options~778
                -link to other aspects of central system's site~780
        -coupon redemption msg from a merchant~725
            -record merchant, coupon ID, time~726
        -"show me" request~746
            -if have location of requestor and if schedule allows~748
                -show image of location of requesting device~750
        -request to show a personal announcement with ownershipID~752
            -display personal msg on mobile unit closest to him or her~754
            -record that display has been made for accounting purposes~756

FIG. 30

-Central System's Locator Signal Response Programming~280A
    -...
    -obtain information from wireless network about identity, number, and/or closeness, of wireless units near mobile unit~790
    -if the mobile unit is in a geographic zone for which different display message should be shown than those in the locator signal, or if the identity, number, and/or closeness of wireless units near the mobile unit indicates that a different message should be shown~292A
        -select the display messages to be displayed by the mobile unit based on the zone, current time, and identity, number, and closeness of wireless units identified in area~294A
    -...

FIG. 31

-Central System's Locator Signal Response Programming~280B
    -...
    -obtain information about speed of vehicle~792
    -if the mobile unit is in a geographic zone for which different display message should be shown than those in the locator signal, or if the speed of the mobile unit indicates that a different message should be shown~292B
        -select the display messages to be displayed by the mobile unit based on the zone, current time, and speed of vehicle, with possible changes in rate of motion in messgage, or length of message as a function of speed~294B
    -...

FIG. 32

-Mobile Unit Camera Programming~794
    -upload images~796
    -use comparison with 3d model to help more clearly recognize cars and people (which are not part of permanent 3D model)~798
    -if receive message that PDA in mobile units location has sent a "show me" request~799
        -show picture of location of PDA~800
    -if receive message from central system to photograph a given location from a given angle and zoom setting~802
        -do so~804
    -if specific conditions are met~806
        -show image recorded by camera on display screen~808
    -compare 2d images and location indications against 2d projections from 3d model of city to confirm exact location, and provide output to mobile units location detecting system~810
    -use vision recognition to extract image information including the following from vehicle's camera images~1200
        -estimates of audience information including number, type, distance, relative speed, and activity of any people in view associated with each display, as well as the make, model, and year and relative speed of any vehicles in such views~1202
        -estimates of traffic information based on number, speed, and relative speed of vehicles ~1204
        -estimates of weather characteristics~1206
    -upload extracted image information ~1208
    -if auto-placement is in use,~1210
        -use audience, traffic, or weather information extracted from images to select which display message to show as a function of customer selected criteria~1212

FIG. 33

-Central System Camera Programming~812
    -record images and/or image information unloaded from mobile unit in association with location and time of recording~814
    -use 2D to 3D software to create 3D model of portion of city being imaged, removing moving objects, updating image for changes~816
    -record image information defining audience characteristics received from display units in demographic database, performing machine recognition if not already performed by display units~818
    -record image information defining type, absolutes speed, and relative speed of vehicles and other traffic conditions and record them in traffic database for time and location, performing machine recognition if not already performed by display units~820
    -record image information defining weather conditions and record them in weather data base for time and location, performing machine recognition if not already performed by display units~822
    -use visual recognition to vary messages shown by mobile unit's external display~823
        -based on ~824
            -estimation of number of people who can see display~826
            -estimation of speed of vehicle or nearby vehicles~828
            -estimation of age, sex, race, social class of people around display~830
            -estimation of weather~832
            -lighting conditions~834
        -...
    -use visual recognition to detect behavior of person relative to display and respond to behaviors which indicate recognition or attention toward display by~838
        -giving reward to person, if they identify themselves~840
        -showing picture of person~842
        -recording the users sign of recognition for statistical purposes~843
        -...
    -respond to inputs from users of the system for given images to be taken in given locations by instructing mobile unit in that location to take given images, including angle and zoom of image~844
    -...

FIG. 34

-Central Systems Synchronized Displays Programming~846
  -...
      -if current location of two display units are close enough to be seen by same people~848
          -instruct the close displays to show a msg in synchronism~850
              -if msg is designed for simple synchronization~852
                  -show same msg on the close displays in synchronism~854
              -if msg is designed for ping-ponging~856
                  -ping-pong the msg on the close displays in synchronism~858
  -...

FIG. 35

-Central Systems Location Varying Message Programming~860
      -if current location of a mobile display units is close enough to a specific location~862
          -instruct the display to show a location varying message for the specific location~864

FIG. 36

-Mobile Unit's Location Varying Message Programming~866
  -...
      -if receive instruction from central system to display a given location varying message~867
          -start displaying the message~868
          -until end of message's display~867
              -mobile unit obtains information on its current locations as it moves during the animation~870
              -mobile unit varies display of successive images in message in response to changes in location~872
  -...

FIG. 37

-Cab Mobile Unit Programming~874
    -if new destination is input on driver input~875
        -indicate new destination on driver (and perhaps external) display~876
        -transmit new destination to central system~877
    -if a new status is input on the driver input~878
        -indicate change in status on driver (and perhaps central) display~879
        -transmit status change to central system~890
    -if a fare is being earned~891
        -display fare information on drivers (and passengers) display~892
        -transmit information about fare to central system~893
    -if driver signals a given emergency type~894
        -depending on emergency type: ~896
            -send message to central system and police indicating, vehicles ID, Driver Name, and type of emergency~898
            -turn on an audio listening device and record and/or broadcast audio and images from camera to central system ~900
            -have external displays show a message appropriate for emergency type~902

FIG. 38

-Cab Central System Programming~904
    -if receive information on location of a cab~906
        -record it in cab database in association with cab ID and time~908
        -update cab location display to show new address~910
    -if receive information on new destination for a cab~912
        -record new destination in association with cab ID and time~914
        -calculate one or more best route to destination (considering factors such as cab's current location, time, current traffic info, historical traffic info for time, advertising demand in various locations, and cost)~916
        -transmit one or more best routes with calculated time, cost, and earnings to cab for display on driver's display~918
    -if receive information on change in cab status~920
        -record it in association with cab ID and time~921
    -if receive information about cab fare~922
        -record it in association with cab ID and time~923
    -aggregate from cab database info on~924
        -productivity of individual drivers~926
        -productivity of various locations~928
        -traffic flows rates at given locations and given repeated times~930
        -cab availability~932
    -calculate information about best places for cabs to wait for passengers~934
        -based on number of pick-ups at various locations at various times in the past~936
        -based on info recently entered into system by cab~938
    -if driver requests info on where to wait for pick-ups, given its current location~940
        -calculate information on best place for cab to wait for a pick-up given current location~942
        -send information to driver~944
    -if receive request to view cabs in a given location~946
        -send out page showing current location of cab from cab database~948
    -if receive request for estimate for how long it would take a free cab to reach a given location to pick some one up~950
        -calculate estimate based on location of free cabs or cabs that are about to come free, location of requested pick-up, current traffic information, weather, and historical traffic information for locations involved~952
        -send estimate to user~954
    -if receive request for estimate of how long it would take to get from one location to another at a given time~956
        -calculate estimate of how long trip would take based current traffic information, weather, and historical traffic information for locations involved~958
        -send estimate to user~960
    -if receive request to see historical information on how long it takes to go from one location to another by cab~962
        -send out page enabling a user to obtain historical information from cab database on the length of time for similar trips in past at various selectable times and weather conditions~964

FIG. 39A

-if receive request for pick up at a first location for a trip to a second location as soon as possible~966
    -determine if any free cabs from cab data base~968
    -calculate likely time to reach first location~970
    -calculate likely time of trip from first to second location~972
    -send user information on time calculations, and ask if wants to book trip~974
    -if so~976
        -inform driver of expected fare and confirm if he or she can take it~978
        -if driver confirms can take fare~980
            -send message to cab, to change its status display to ~982
            -send passenger message that cab will be book, with booking url from which can find status of cab~984
-if receive request to find status of booked cab~986
    -query cab database to find location of booked cap~988
    -estimate time for cab to get from current location to pick-up location,~990
    -send requestor a map showing both booked pick-up location and location and speed of booked cab, and estimated time of arrival time, and send to user~992

FIG. 39B

-Traffic Information System~994
    -multiple mobile units, each with an external display, report on location and speed at successive points in time~996
    -central system records vehicle position, time, and speed~998
    -central system calculates speed of traffic flows at various locations from this information and other information if available~1000
    -central system transmits information about traffic flow to mobile units~1002
    -mobile units display information about traffic flows at multiple locations derived from multiple mobile units on external displays, selecting on which locations to show which traffic information as function of mobile units location ~1003

FIG. 40

-Weather Information System~1004
    -multiple mobile units, each with an external display, report on weather at their location at successive points in time~1006
    -central system records vehicle position, time, and the weather information it is reporting~1008
    -central system calculates weather information at various locations from this information and other information if available~1010
    -central system transmits information about weather to mobile units~1012
    -mobile units display information about weather at multiple locations derived from multiple mobile units on external displays ~1014

FIG. 41

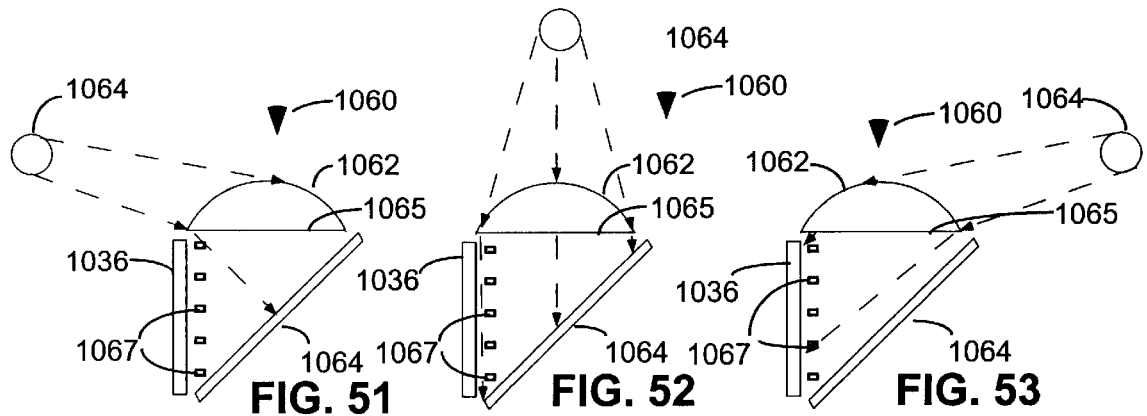
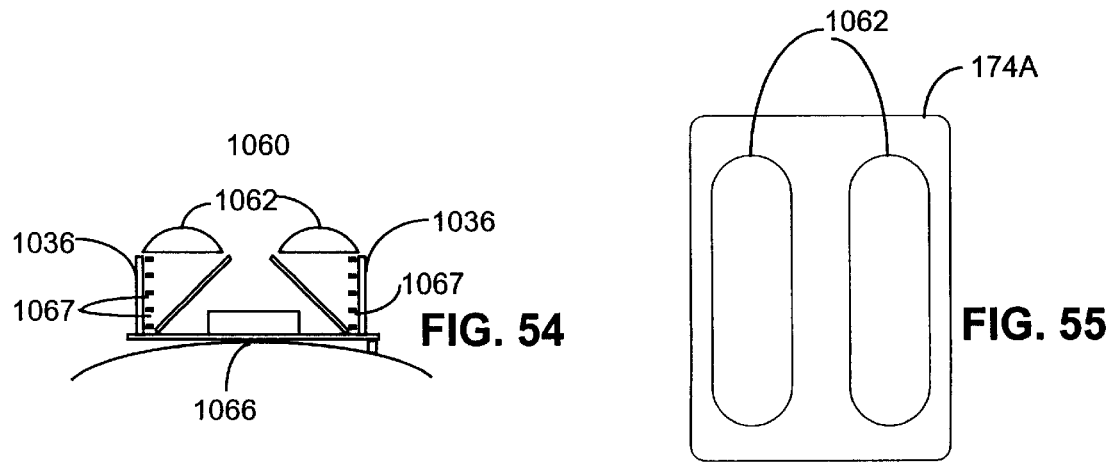
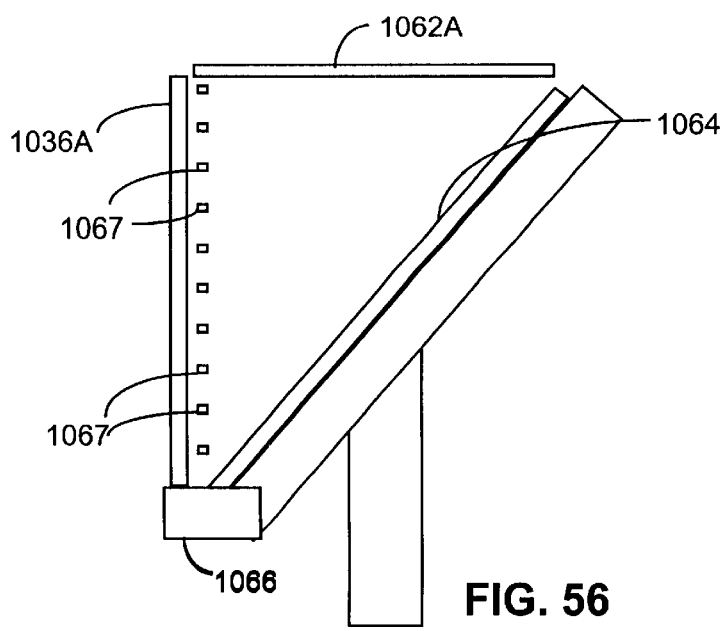

-Paid-Driver Central System Programming~1070
　-...
　　-use successive locations and time through which display travels to calculate a value for the travel~1072
　　-credits calculated value to vehicle operator~1074
　　-transmit calculated value credited to the vehicle for display to driver~1076
　　-transmit information to driver showing different value associated with driving through different areas~1078
　　-when driver enters a destination for travel~1080
　　　　-calculate one or more routes to the destination with a maximum combination of quickest route, most display earnings, and/or lowest cost~1082
　　　　-communicate this calculated information to the driver~1084
　-...

FIG. 57

-Programming database~1124
　　-street location programming~1125
　　-time programming~1126
　　-weather programming~1128
　　-news programming~1130
　　-sports programming~1132
　　-traffic programming~1134
　　-public service announcements~1136
　　-contest programming~1138
　　-soap opera programming~1140
　　-greetings programming~1144
　-...

FIG. 58

--Central System's Public API To Display Units ~1220
　　-From Central System To display ~1222
　　　　-displaySelectionMsgWithIDs(header, mobileUnitID, displayMsgIDString, <locationSignalPeriod.) ~1224
　　　　-CachingMsg(header, mobileUnitID, displayMsgIDString, <locationSignalPeriod>) ~1226
　　　　-locatorSignalPeriodMsg(header, mobileUnitID, locatorSignalPeriod) ~1228
　　　-...
　　-From Display To Central System ~1230
　　　　-locatorSignalMsg(Header, MobileUnitID, GPSCoords, Speed, currentSideMsgID, currentbackMsg, vehicleSpeed, displayUnitStatus, <missingDisplayMsg>, <intendedDestination>)~1232

FIG. 59

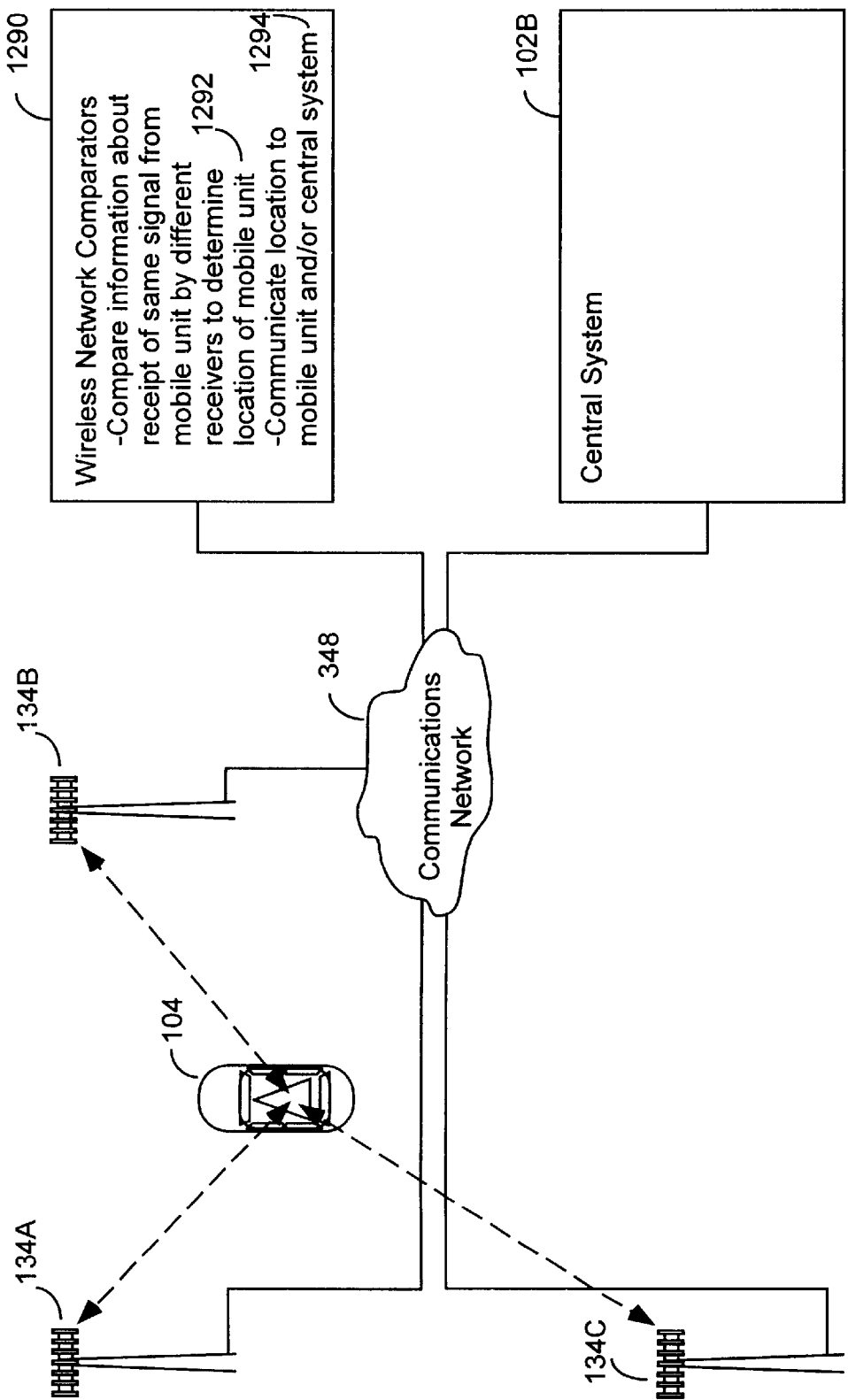

-Central System Auto-Placement Programming~1300
　-...
　　-provide user interface and receive from user information defining an auto-placement order, including~1302
　　　　-allowing user to specify for each of one or more viewer types~1304
　　　　　　-One or more characteristics of viewer type, including~1306
　　　　　　　　-...
　　　　　　　　-ethnic group~1308
　　　　　　　　-estimated income~1310
　　　　　　　　-life-style category~1312
　　　　　　　　-...
　　　　　　　　-current activity~1314
　　　　　　　　　　-driving~1316
　　　　　　　　　　-walking~1318
　　　　　　　　　　-sitting~1320
　　　　　　　　　　-...
　　　　　　　　-relationship to display~1322
　　　　　　　　　　-side display viewer~1324
　　　　　　　　　　-back display viewer~1326
　　　　　　　　　　-view duration~1328
　　　　　　　　　　-relative speed~1330
　　　　　　　　　　-proximity~1332
　　　　　　　　　　-orientation~1334
　　　　　　　　　　-...
　　　　　　　　-time classification ~1336
　　　　　　　　-location classification~1338
　　　　　　-Number of viewers of that type~1342
　　　　-select order's time frame~1343
　　　　-system indicates price of each viewer type given time frame~1344
　　　　-select one or more messages to be shown with order~1174
　　　　-select to commit to the current order~1347
　　-...
　　-receive shown-message information from each of plurality of display units~1348
　　　　-for each shown message record received~1350
　　　　　　-for each viewer type in order associated with shown message~1352
　　　　　　　　-use estimated number of viewers of that type to~1354
　　　　　　　　　　-determine number of exposures to viewers of that time still remaining in order~1356
　　　　　　　　　　-calculate urgency for viewers of that type for the given order as function of number of exposures to viewers of that type remaining and amount of time remaining~1358
　　　　　　　　　　-calculate charge for order to be billed to customer~1360
　　-...
　　-download to display units changes in viewer type urgency associated with different orders~1362
　　　-...

FIG. 65

-Display Unit Auto-Placement Programming~1364
  -...
    -For each display (side or back) which is about to be free to show a new message~1366
      -For each of plurality of orders~1368
        -For each of viewer types in order~1370
          -Calculated product of~1372
            -estimated number of viewers of that type for display (side or back) from demographic data base for current place and time and/or from demographic data derived from real time sensors~1374
            -order's price for each viewer of that type~1376
            -order's urgency for each viewer of that type~1378
          -add product to orderScore calculated for all of order's viewer types~1380
      -select order with best orderScore~1382
      -show message associated with selected order as soon as display is free to show new message~1384
      -record the following shown-message information for each shown message~1386
        -message number~1388
        -order number~1390
        -time and place of showing~1392
        -for each of its viewer types~1394
          -the estimated number of its viewers of that type~1396
  -...
  -upload shown message information to central system~1398
  -...

FIG. 66

-Energy Conservation Scheme~1530
    -After ignition is shut off~1532
        -at first time after shut off~1534
            -decrease power to displays~1536
        -at second longer time after shut off~1538
            -turn off power to displays by hardware switch~1540
        -at third still longer time after shut off~1542
            -start computer shut down~1544
        -after computer is shut down,~1546
            -turn off power to computer~1548
    -after ignition is turned on~1550
        -after first time after turn on~1552
            -boot computer~1554
        -after second longer time after turn on~1556
            -provide full power to display backlights~1558

FIG. 77

-Mobile Unit Energy Conservation, Temperature, and Status Programming~1560
  -...
    -if receive input indicating ignition is off~1562
      -record ignition-off time~1564
    -if time since ignition-off time is above a given duration (which is longer than relay's time delay)~1566
      -shut down computer~1568
  -...
    -if input from temperature sensor indicates temperatures is above a first level~1570
      -if fan is not turned on~1572
        -turn it on~1574
    -if input from temperature sensor indicates temperature is below a second level~1576
      -if fan is turned on~1578
        -turn it off~1580
    -if input from temperature sensor indicates temperatures is above a third level~1582
      -if heater is turned on~1584
        -turn it off~1586
    -if input from temperature sensor indicates temperature is below a forth level~1588
      -if heater is off~1590
        -turn it on~1592
  -...
    -if receive input indicating emergency switch has been pushed~1594
      -if emergency state is off~1596
        -turn emergency state on, suspending display of normal messages~1598
        -repeatedly show one or more predefined emergency message to all displays~1600
        -repeatedly send predefined emergency message including location to central system~1602
      -if emergency state is on~1603
        -display message to all displays that emergency is over~1604
        -turn emergency state off, resuming display of normal messages~1606
        -send message to central system that emergency is over~1608
  -...
    -if receive request from central system for a particular type of status report~1610
      -generate requested report from current values of report's corresponding parameters ~1612
      -send requested report to central system over wireless connection~1614
    -if computer detects that power to backlight has been cut~1616
      -send message to central system informing it of this change and its time~1618
    -if computer detects that power to backlight has been returned after a cut off~1620
      -send message to central system informing it of this change and its time~1622
    -if computer detects that hard disk is beyond a certain percent full~1624
      -send message to central sytem informing it of this change and its time~1626
  -...

FIG. 78

-Central System Status Monitoring Programming~1628
    -...
        -display system status monitoring and request programming~1630
            -remote access programming~1632
            -status request programming~1634
            -status recording programming~1636
            -status analyzing programming~1638
            -status reporting programming~1640
    -...

FIG. 79

-Standard Status Report~1642
    -Header~1644
    -Mobile Unit ID~1646
    -Geographic Coordinates~1648
    -Vehicle Speed~1650
    -Mass Storage Size~1652
    -Free Mass Storage Space~1654
    -RAM Size~1656
    -Free RAM~1658
    -CPU Usage~1660
    -Network Traffic Volume~1662
    -IDs Of Currently Displayed Messages ~1664
    -Output Of Each Light Sensor~1666
    -Power Supplied To Each Display~1668
    -Temperature In Unit~1670
    -Power supplied to Heater~1672
    -Ignition Status~1674
    -Strength Of Received Wireless Signal~1676
    -IP Address Of Network Interface~1678
    -...

FIG. 80

-Message Cache Status Report~1680
    -Header~1682
    -Mobile Unit ID~1684
    -...
    -List Of All Cached Messages~1686
    -...

FIG. 81

-Video Memory Status Report~1688
    -Header~1690
    -Mobile Unit ID~1692
    -...
    -Compressed Image Of Video Memory~1694
    -...

FIG. 82

APPARATUSES FOR DISPLAYING INFORMATION ON VEHICLES

RELATED APPLICATIONS

This application is related to the following applications listed in this section. It is a continuation-in-part of and claims priority under 35 U.S.C. § 119(e) from the following co-pending U.S. patent applications:

Non-Provisional application 09/618,862 filed by Semyon Dukach et al. on Jul. 18, 2000, now U.S. Pat. No. 6,701,143 entitled "Apparatuses, Methods, And Computer Programs For Displaying Information On Mobile Signs;

Provisional Application 60/226,000 filed by Semyon Dukach et al. on Aug. 16, 2000, entitled "Apparatuses, Methods, and Computer Programs For Displaying Information On Signs";

provisional application 60/237,238 filed by Leonid Fridman et al on Oct. 2, 2000, entitled "Apparatuses, Methods, and Computer Programs For Displaying Information On Signs";

provisional application 60/170,914 filed by Semyon Dukach et al on Dec. 15, 1999, entitled "Apparatuses, Methods, and Computer Programs For Displaying Information On Signs"; and PCT patent application PCT/US00/34549 filed with the USPTO by Semyon Dukach on Dec. 15, 2000, entitled "Apparatuses, Methods, and Computer Programs For Displaying Information On Signs", which PCT application designated the United States of America.

All of these related applications are hereby incorporated by reference in their entirety.

FIELD OF THE INVENTION

The present invention relates to a system for displaying information to the public.

BACKGROUND OF THE INVENTION

Communication of information to the public is a major industry. One of the major means of such communications is by publicly visible signs, including advertising signs. Signs have been in use for centuries, and have performed a valuable service of informing consumers about choices that are available to them. But advances in technology have made traditional signs seem somewhat out of date.

U.S. Pat. No. 6,060,993 issued to Eyal Cohen (the "Cohen Patent") discloses one possible system for displaying messages in advertisements on mobile signs, such as those placed on the tops of motor vehicles such as taxis. In this system a geographic area is divided up into separate zones and when a mobile unit makes a transition from one zone into another the controller located on the mobile unit determines when it has made such a transition based on a positioning system within the mobile unit, on a series of geographic zone definitions which it stores in its memory, and on a schedule indicating which messages are to be shown in which zones at which times. The Cohen patent is hereby incorporated herein by reference in its entirety.

SUMMARY OF THE INVENTION

It is an object of the present invention to provide for more flexible, effective, and/or profitable usage of signs.

According to one aspect of the invention, a system for publicly displaying messages comprises an automotive vehicle and the following elements carried by the vehicle: a publicly visible electronic display (i.e., a display which can easily be seen by people external to the display); a sensor for sensing the brightness of light in the vicinity of the display; and illumination varying circuitry for varying the brightness of light generated by the display in response to brightness detected by the sensor.

In some embodiments of this aspect of the invention, the display is a backlit display illuminated by a backlight and the illumination varying circuitry varies the brightness of the backlight. The display can be a high bright backlit displays, by which we mean a displays having an illumination of over s over 1000 NITs, where one NIT is one candella per square meter of surface radiation. In some embodiments the backlit display is a transreflective display which can be lit either by reflected light or by backlighting, and the degree to which the display is lit by backlighting is controlled by the illumination varying circuitry.

In some embodiments the vehicle carries at least two of the publicly visible displays, and each display has an associated light sensor and illumination varying circuitry for varying the generated brightness of each display in response to the brightness detected by its associated light sensor. In some such multiple-display embodiments each displays is lit both by light incident upon display and by light generated by display under control of the illumination varying circuitry. Examples of such displays include transreflective displays, which can pass either generated or reflected light through a display's light valve to brighten its image, as well as displays that generate an images by spatially varying reflective shade or color, which can be light by either ambient or generated light. The illumination generated for each display can be controlled as a function of the amount of light falling on its associated light sensor, either dependently or independently of the amount of light generated for other displays and/or the amount of light falling on other the sensors associated with the position of other displays.

According to another aspect of the invention a system for publicly displaying messages comprises an automotive vehicle carrying the following elements: a publicly visible display formed by ganging together a plurality of individual electronic displays, each having at least a resolution of 640×480 pixels; and video drive circuitry for generating signals to cause images to be shown on the ganged display, with different portions of individual images being shown on each of the individual displays.

In some such ganged display embodiments, the individual display are high bright backlit displays having over 1000 NITs of illumination. In some such embodiments a light sensor senses external light on the display and circuitry varies brightness of the entire ganged display in response to the sensor. This system includes these elements carried by the vehicle: a sensor for sensing the brightness of light in vicinity of the ganged display and illumination varying circuitry for varying the brightness of the entire ganged display as a unit in response to brightness detected by the sensor.

In some such ganged display embodiments, there are at least two of such ganged displays and the video drive circuitry is capable of driving separate images on each ganged display.

According to another aspect of the invention, a system for publicly displaying messages comprising of an automotive vehicle having an automotive electrical system and also the following elements carried by the vehicle: a publicly visible high-bright display, capable of providing over 1000 NITS illumination and having 640 by 480 or greater pixel resolution; and video drive circuitry for generating signals to cause images to be shown on the display.

In some such high-bright embodiments, the vehicle includes a computer and a radio connected to provide received digital data to the computer. The computer is programmed to generate animated images from vector-based animation files received over the radio.

In some such high-bright embodiments, the display is a backlit display having a light filter to provide an electronically controlled spatial pattern of variable opacity and one or more backlights to provide illumination behind the light filter. In some such embodiments the display is an LCD display and the light filter is a liquid crystal light filter. In some embodiments the display is a transreflective display that can be lit by reflected light and/or by backlighting.

According to another aspect of the invention, a mobile display system for publicly showing messages includes an automotive vehicle which carries a publicly visible electronic display and a computer. The computer has: video drive circuitry for generating signals to cause images to be shown on the display, a memory device capable of storing representations of animated display images represented in vector-based form; and programming for enabling the computer to generated animated images from the vector-based animation representations. When a memory device is referred to in this specification, it should be understood than it can include RAM, ROM, flash or other nonvolatile memory, hard disk, CD or DVD ROM, including recordable and/or rewritable CD or DVD ROM, and other memory storage devices now or hereafter known.

In some embodiments, the system includes a radio for conveying digital information to the computer about which messages the computer should cause to be shown on the display, and information including the vector-based animation representations of such messages.

According to one aspect of the invention a system for publicly displaying messages comprise an automotive vehicle having an automotive electrical system including an ignition system and a generator for generating electricity when the vehicles ignition system is on. The vehicle further includes a publicly visible electronic display; video drive circuitry for generating signals to cause images to be shown on the display; and display-power circuitry. The display-power circuitry receives power from the vehicle's automotive electrical system, supplies it to the display, and automatically reduces the power supplied to the display after the vehicle's ignition is turned off.

In some embodiments of this aspect of the invention, the display-power circuitry automatically increases power to the display after the vehicle's ignition is turned back on, if the power to the display has been reduced after the vehicle's ignition was last turned off.

In some embodiments the video drive circuitry includes a computer for controlling the images generated on the display and the display-power circuitry can automatically reduce the poser to the display whether or not the computer is operating. In some such embodiments the video drive circuitry includes a computer for controlling the images generated on the display and the display-power circuitry substantially reduces the power supplied to the display without turning off the computer. Later the computer can be shut down and then the power to it can be cut. In some such embodiments the vehicle further including circuitry which provides power to the computer to turn it back on once the ignition is turned back on.

In some embodiments of this aspect of the invention the display is a backlit display including one or more backlights to illuminate it, and the display-power circuitry reduces power to the backlights. In some such backlit embodiments the backlit display is a high-bright display having backlights capable of providing at least 1000 NITS of illumination before the display-power circuitry reduces power to it. In some embodiments these high bright displays will be LCD displays, but in other embodiments they can include any other types of displays having over 1000 NITs of illumination. In some backlit embodiments the backlit display is a transreflective display which can be lit either by reflected light and/or by backlighting. In some e backlit embodiments, the display-power circuitry makes a first reduction in power at a first time after the ignition is shut off which does not cut off all illuminating power to the backlight. In some such embodiments, the display-power circuitry makes a second reduction in power at a second time, later than the first time, after the ignition is shut off, which turns the backlights off.

According to another aspect of the invention a system for publicly displaying messages comprises an automotive vehicle having the following elements: a publicly visible electronic display; a computer containing programming for causing various messages to be shown on that display; an input device which can be used by an occupant of the vehicle to generate one or more emergency signals; and a connection for supplying the one or more emergency signals to the computer. The computer contains programming to cause it to respond to the generation of an emergency signal by causing an emergency message to be shown on the vehicle's display.

Some embodiments of this emergency signal aspect of the invention further including a radio connected for conveying digital information to the computer about which messages it should cause to be shown on the display and for communicating information from the computer to a remote electronic system; and the computer further contains programming to cause it to respond to the generation of an emergency signal by causing an emergency message to be sent by the radio to the remote electronic system. In some such embodiments, the input device is a switch which generates a single emergency signal; and the computer is programmed to respond to the single emergency signal by causing both the emergency message to be shown on the display and the emergency message to be sent by the radio.

According to one aspect of the invention a rooftop unit, for being carried on the roof of an automotive vehicle is provided. The rooftop unit includes an electronic display having at least 640×480 pixel resolution; a computer, having a video interface, for controlling the images shown on the display; and an electrical connection for receiving power from the electrical system of the vehicle.

Some such rooftop units include a radio for conveying digital information to the computer about which messages it should cause to be shown on the display. Some rooftop units include a GPS device connected to the computer, for providing the computer information about the location of the vehicle, and the computer is programmed to use the location information, in conjunction with information received over the radio, in determining which messages to show on the display.

In some rooftop units, the computer contains programming to generate animated bitmapped images on the display from vectorbased animation representations. The rooftop unit can include a radio for conveying digital data to the computer; and the computer is programmed to generate the animated images from vector-based animation data received over the radio. The rooftop unit can also include a memory device; and the computer can include programming for enabling it to generate the animated image from vector-based animation files stored on the mass storage device.

In some rooftop units include an enclosure in which the display and computer are enclosed and mountings for suspending the enclosure in a position spaced above the roof of the vehicle. These mounting includes vibration isolators, for at least partially isolating the enclosure from vibration of the vehicle roof.

In some embodiments the enclosure includes top, side, and bottom external surfaces and is substantially waterproof over the top and sides surfaces, with holes for ventilation in the bottom surface, which is spaced above the vehicle roof for ventilation. In such embodiments one or more ventilation fans can be placed near one or more of the ventilation holes. The enclosure can include a heat sensor for measuring the temperature inside the enclosure and circuitry for controlling the operation of the fans as a function of the temperature measured by the heat sensor.

In some embodiments the external surfaces of the enclosure extends down below the portion of enclosure's bottom surface containing the ventilation holes on at least substantially three sides, to reduce the tendency of rain water to enter the ventilation holes In some embodiments the rooftop unit includes a radio for conveying digital information to the computer about which messages it should cause to be shown on the display and the radio is enclosed in the unit's enclosure. Some such embodiments the enclosure also holds a geographic location system, such as but not limited to a GPS system, for providing the computer information about the location of the vehicle; and the unit's computer is programmed to use the geographic location information, in conjunction with information received over the radio, in determining which messages to show on the unit's display.

Some rooftop unit further include a connection for receiving an input from an emergency switch that can be operated by an occupant of the vehicle and the unit's computer contains programming to cause it to respond to operation of the emergency switch by causing a predefined emergency message to be shown on the display. Some such embodiments further include a radio for conveying digital information to the computer about which messages it should cause to be shown on the display and for communicating information from the computer to a remote electronic system, and the unit's computer further contains programming to cause it to respond to operation of the emergency switch by causing a predefined emergency message to be sent by the radio to the remote electronic system.

According to another aspect of the invention a vehicle display unit for being carried on an automotive vehicle is provided. This unit could be designed for mounting on a roof, like the rooftop unit described above, or it could be mounted in other locations on or in a vehicle, such as, for example, on the side of a truck or bus. The vehicle display unit includes the following: an electronic display; display drive circuitry for controlling the images shown on the display; an electrical connection for receiving power from the electrical system of the vehicle; an enclosure around the display and the display drive circuitry having ventilation openings; and a ventilation fan located near one of the ventilation openings for moving cooling air through the enclosure.

Some such vehicle display units further include a heat sensor for measuring the temperature inside the enclosure; and circuitry for controlling the operation of the fan as a function of the temperature measured by the heat sensor.

In some such display units the unit's display includes a top, a front side, which is the display surface on which displayed information is to be viewed, and a back side facing in the opposite direction from the front side. In some such units the enclosure includes a cover over both the top and the front and back sides of the display, and one or more fans are positioned to move air in the enclosure up one of the sides, across the top, and down the opposite side. In some such embodiments a cross-flow fan is used to propel air up the one side of the display. In many embodiments the enclosure includes a transparent surface, which can be made for example of a material such as Lexan (made by General Electric Company) that extends over and is generally parallel to the display surface, so as to enable images generated by the display to be viewed from outside the enclosure. In many such embodiments the transparent surface has a mat finish to reduce glare.

In some of the vehicle display units having an enclosure over the sides and top of their display unit, the enclosure includes top, side, and bottom external surfaces, is substantially waterproof over the top and side surfaces, has holes for ventilation in the bottom surface; and has one or more ventilation fans placed near one or more of the ventilation holes. In some such embodiments one of the fans is positioned to suck air into one of the ventilation holes in the bottom of the enclosure; and a filter is positioned to filter water and dirt out of the air before it reaches the fan. Display units having the substantially waterproof top and side enclosure surfaces can further include an air verticalizing grating shaped to verticalize air flow in the vertical direction. Such a grating can be located over one of the unit's ventilation holes to increase the verticality of air sucked up into the hole, so as to reduce the amount of rain which will enter the hole. This has the benefit of reducing the amount of rain water which will enter the unit, since rain water is often traveling with horizontal component of motion relative to a moving motor vehicle. Display units having the substantially waterproof top and side enclosure surfaces can further have a portion of its enclosure surface extend down below the portion of the enclosures bottom surface containing the ventilation holes on at least substantially three sides. This can be done to reduce the tendency of rain water to enter the ventilation holes Some vehicle display units further include a heater positioned to heat the interior of the enclosure; a heat sensor for measuring the temperature inside the enclosure; and circuitry for controlling the operation of the heater as a function of the temperature measured by the heat sensor.

According to another aspect of the invention a rooftop unit for being carried on the roof of an automotive vehicle is provided. The rooftop unit includes three electronic displays and display drive circuitry for driving images on each such display. The three displays are arranged in a triangle having a first corner near the front of the rooftop unit, and two corners nearer the back of the rooftop unit. Two of the displays are side displays, which form the sides of the triangle which join at the front corner, each of which is position to be visible from the front and one side of the vehicle. The third display is a back display, which forms the third side of the triangle and is positioned to be visible from the behind the vehicle.

In some such three-display rooftop units the drive circuitry is capable of driving different images on the side displays than are driven on the back display. In some such units the drive circuitry is capable of driving both side displays with the same video output.

According to another aspect of the invention a rooftop unit for being carried on the roof of an automotive vehicle is provided. The rooftop unit includes an electronic display; display drive circuitry for driving images on the display; an enclosure in which the display and drive circuitry are enclosed; one or more roof protectors having a total of over two square feet of weight distributing surface shaped to fit the three dimensional curved surface of the roof of a vehicle on which the rooftop unit it is to be mounted; and a plurality of mountings supported by the one or more roof protectors for suspending the enclosure in a position spaced above the roof, which mounting includes vibration isolators, for at least partially isolating the enclosure from vibration of the vehicle roof.

In some embodiments a layer of material is mounted between the one or more roof protector to reduce the tendency of the roof protector to scratch the roof of any vehicle it is on.

In some embodiments the mountings include a plurality of rigid mounting elements including shafts extending upward from the roof protectors and rigid mounting surfaces above and below the shaft. In such embodiments the enclosure includes a mounting hole for receiving each shaft and the vibration isolators include elastic material placed around each shaft below, above, and in each such mounting hole, so that the enclosure has elastic material to isolated it from the rigid mounting elements in each of three dimensions.

According to one aspect of the invention a system for publicly displaying messages is provided. The system includes an automotive vehicle carrying a publicly visible electronic display; and a computer, having a video interface, for controlling the images shown on the display; and a radio for conveying digital information to and from the computer including information about which messages it should cause to be shown on the display. The computer includes programming defining an operating system having a set of commands and programming to enable a remote system to have remote access to commands of the operating system over the radio.

In some embodiments of this aspect of the system includes a plurality of such mobile systems, each including one of the automotive vehicles carrying at least the display, the computer, and the radio. The system further including a central system which has one or more computer systems and one or more radios connected to the central system computers to enable them to wirelessly communicate with the computers on the mobile systems through the radios on those mobile systems. The computers of the central system include programming for causing the central system to communicate data to the mobile systems controlling what messages are displayed on the mobile systems; and programming for enabling the computers of the central system to obtain remote access of one or more the computers on the mobile systems.

According to another aspect of the invention a system for publicly displaying messages is provided which comprises an automotive vehicle carrying to following elements: a publicly visible electronic display; a computer, having a video interface, for controlling the images shown on the display; and a radio for conveying to and from the computer digital information, including information about which messages it should cause to be shown on the display, and for transmitting to remote computers information supplied to it by the vehicle's computer. The vehicle's computer includes programming enabling it to communicate, over the radio, to a remote computer information about the status of the computer.

In some embodiments of this aspect of the invention there are a plurality of such mobile systems and the system further includes a central system. The central system includes one or more computer systems and one or more radios connected to the central system computers so as to enable them to wirelessly communicate with the computers on the mobile systems through the radios on those mobile systems. The computers of the central system include programming for causing the central system to communicate data to the mobile systems controlling what messages are displayed on the mobile systems; and programming enabling the computers of the central system to request the information about the status of the computer of a given mobile system.

In some embodiments of this aspect of the invention the programming in a mobile unit's computer causes that computer to initiate a communication over the radio about the computer's status in response to the detection by the computer one or more conditions in its status. This can include such changes in status as a running low on space for storage for messages, not having a message stored on the mobile which the mobile unit is to display, when the mobile unit is about to shut down, when it first is booted up, etc.

In some embodiments of this aspect of the invention the mobile unit's computer's video interface includes screen memory used to drive the display, and the information about the status of the computer includes information about the data stored in the screen memory.

In some embodiments of this aspect of the invention a mobile unit's computer includes a mass storage device; and the information about the status of the computer includes information about how full the mass storage device is.

In some embodiments of this aspect of the invention a mobile unit's computer includes random access memory; and the information about the status of the computer includes information about how much random access memory is in the machine.

In some embodiments of this aspect of the invention a mobile unit's computer includes random access memory; and the information about the status of the computer includes information about how much random access memory in the machine is free.

In some embodiments of this aspect of the invention a mobile unit's computer includes one or more central processing units; and the information about the status of the computer includes information about how busy the one or more central processing units have been. In different embodiments this information can be provided for one or more different periods, such as CPU loading over the last second, last 5 seconds, last minute, or last 5 minutes.

In some embodiments of this aspect of the invention the information about the status of a mobile unit's computer includes information about how much traffic there has been over its associated radio.

In some embodiments of this aspect of the invention a mobile unit's computer include one or more memory devices, for storing display messages which can be displayed by the computer on the display; and the information about the status of the computer includes information about what display messages are stored on the memory devices. A mobile unit's one or more memory devices can include RAM, ROM, flash or other non-volatile memory, hard disk, CD or DVD ROM, including recordable and/or rewritable CD or DVD ROM, and other know memory storage devices In some embodiments of this aspect of the invention a mobile unit's computer includes a network interface which uses the IP protocol to send and receive data packets over the radio. In such embodiments the information about the status of the mobile unit's computer includes information about the IP address of the network interface.

According to another aspect of the invention a mobile display system for publicly displaying messages is provided which comprises an automotive vehicle carrying the following elements: a publicly visible electronic display; a computer, having a video interface, for controlling the images shown on the display; and a radio for conveying digital information to and from the computer, including information about which messages it should cause to be shown on the display. The computer is provided with programming enabling it to communicate over the radio to a remote computer system real time information about the status of the mobile display unit.

In some embodiments of this aspect of the invention the computer system contains programming to select which of a plurality of messages are shown on the display at a given time: and the real time information indicates which message is currently being shown on the display.

In some embodiments of this aspect of the invention the real-time information indicates the current speed of the vehicle.

According to another aspect of the invention mobile display system comprises an automotive vehicle carrying: a publicly visible electronic display; a computer, having a video interface, for controlling the images shown on the display; a radio connected to the computer for conveying digital information to and from the computer, including information about which messages it should cause to be shown on the display.

In some embodiments of this aspect of the invention, the mobile system further includes a sensor for providing a measurement of the temperature inside one of the enclosures; a connection for communicating the measurement to the computer; and programming enabling the computer to communicate over the radio to a remote computer system information about the temperature measurement.

In some embodiments of this aspect of the invention, the mobile system further includes a light sensor for providing a measurement of the amount of light falling on the display from sources other than the display itself; a connection for communicating the light measurement to the computer; and programming enabling the computer to communicate over the radio to a remote computer system information about the light measurement.

In some embodiments of this aspect of the invention, the mobile system further includes a connection for communicating to the computer an indication of the amount of light being emitted by the display and programming enabling the computer to communicate over the radio to a remote computer system information about the amount of light being emitted. The display can be a backlit display having a light filter and backlight to provide illumination for the light filter; and the information about the amount of light being emitted includes information about the amount of power being supplied to the backlight.

In some embodiments of this aspect of the invention, the mobile system further includes a connection for communicating to the computer an indication of whether the ignition system is on or off, and programming enabling the computer to communicate over the radio to a remote computer system an indication of whether the ignition system is on or off.

In some embodiments of this aspect of the invention, the radio includes electronics for generating an indication of the strength of the radio frequency signal which is being received by that radio; the mobile unit's computer receives the signal strength indication; and the computer is provided with programming enabling it to communicate over the radio to a remote computer system information about the signal strength indication.

According to one aspect of the invention a method of displaying messages is provided which includes: carrying a least two publicly visible electronic display at different positions on a moving vehicle, each of which is visible from a different external position relative to the vehicle. The method includes selecting different messages for each of the two different displays as a function of differences between viewers who are likely to see the different displays because of their different position with respect to the vehicle.

The difference between viewers used to make such a selection can include differences in who the people likely to see the different display are and/or differences in the current activity, location, and relative position and/or speed of likely viewers of the different displays.

In some embodiments of this aspect of the invention the multiple displays are carried on the vehicle so that one of them is a side display that can better be seen from a position to the side of the vehicle, and one of them is a back display that can better seen from a position behind the vehicle.

In some such side-and-back-display embodiments the selecting of different messages for each of the different displays includes selecting for showing on the side display messages considered more appropriate for viewing by pedestrians, and selecting for showing on the back display messages considered more appropriate for viewing by drivers of vehicles behind the vehicle carrying the the displays. The selection of messages for showing on the side and back displays can be a function, respectively, of demographic information about pedestrians likely to see the side display and demographic information about drivers likely to see the back display.

As used in this specification the word demographic means information as to overall population, and information as to numbers of different types of people, including virtually any classification of types of people which are useful to those seeking to target messages to desired audiences, including sex, age, income, racial or ethnic background, employment type, location of residence, life style, sexual preference, religion, number of children, dress, prior purchasing information, and behavioral information. We also define demographic information to include information about the current activity, current location, or current context, including: proximity to locations of given types such as given types of stores, businesses, public places, etc; weather; or time of day. We also define demographic to define any other information about people which may be considered useful in marketing products, services, political candidates or view, and the ideas.

In some such side-and-back-display embodiments the selecting of different messages for each of the different displays includes selecting messages more appropriate for rapid viewing on the side display and selecting messages more appropriate for longer viewing on the back display.

Some embodiments of this aspect of the invention need not be limited to vehicles having combinations of side and back displays. In such embodiments the selecting of different messages for each of the differently positioned displays includes making such selection as a function of demographic information about the different populations of viewers likely to see messages displayed from each of the different displays as a function of their different positions relative to the vehicle. In some such embodiments the demographic information about the different populations likely to see the different displays varies for each of the displays for each of a plurality of different geographical locations.

Some embodiments of this aspect of the invention further include providing an on-line site from which remote computers can purchasing over a computer network the right to have messages shown on displays, including enabling on-line purchasers to separately select whether to purchase the right to have a message displayed on one or more displays as a function of their position relative to the vehicle which carries them. Such methods include controlling what messages are shown on which of the vehicle's displays as a function of the purchases made on the on-line site.

According to another aspect of the invention a system is provided for publicly displaying messages which includes an automotive vehicle having two publicly visible electronic displays, including a side display that can better be seen from a position to the side of the vehicle, and a back display that can better seen from a position behind the vehicle, and a computer, having one or more video interfaces, enabling it to cause separate images to be shown on each of the displays.

Some embodiments of this aspect of the invention include a plurality of such mobile systems each carrying a communication interface connected to their computer. These systems further include a central system which has one or more computers; one or more communication interfaces connected to such computers; and programming in such computers. This programming enables on-line purchasing over one or more of the central system's communication interfaces of the right to have messages shown on the displays of the mobile systems, including enabling on-line purchasers to separately select whether to purchase the right to have a message displayed on one or more side displays or on one or more back displays. The central system's programming also enables the central system to communicate data to one or more of the mobile systems to control what messages are displayed by the side and back displays of a mobile system in response to on-line purchases.

In some such embodiments the communication interfaces of the mobile systems and the central system which are used for communication between the central system and the mobile systems are wireless communication interfaces, although in others they need not be.

In some embodiments of this aspect of the invention the computer carried by a vehicle includes programming for receiving information about the vehicle's current location and for successively displaying the names of different cross streets near vehicle's current position on the vehicle's back display as the vehicle moves.

DESCRIPTION OF THE DRAWINGS

These and other aspects of the present invention will become more evident upon reading the following description of the preferred embodiment in conjunction with the accompanying drawings, in which:

FIG. 2 is a simplified representation of a schedule which can be used by the central system of the embodiment of the invention shown in FIG. 1 to help determine which messages should be displayed by mobile units in each of a plurality of geographic zones at each of a plurality of times;

FIG. 8 is a schematic diagram of the multiple streams of display-message content that can be broadcast by the central system in the embodiment of the invention shown in FIG. 6;

FIG. 9 is a highly simplified pseudo-code description of the main loop performed by the controller of the mobile units in some embodiments of the present invention;

FIGS. 10 and 11 are schematic representations of two different embodiments of the display-selection method that can be used by the present invention;

FIG. 12 is a schematic representation of a locator signal that can be used with one embodiment of the present invention;

FIGS. 13–15 are highly simplified pseudo code descriptions of daemons which can used by a mobile unit's controller to Control the generation of locator signals, the transmission messages regarding the input of intended vehicle destinations, and the setting of locator-signal-period values, respectively;

FIG. 16 is a highly simplified pseudo code description of programming executed by the processor of the central system to respond to the receipt of locator signals from mobile units in some embodiments of the invention; and FIG. 17 is a highly simplified pseudo code description of programming which can be used to cause the central system to generate billing.

FIG. 23 is a pseudocode representation of the central system's programming relating to its on-line site according, to one embodiment of the present invention;

FIG. 24 is a pseudocode representation of the central system's geosynchrons selling programming according to one embodiment of the present invention;

FIG. 25 is a pseudocode representation of the central system's geosynchron display interface according to one embodiment of the present invention;

FIG. 26 is a pseudocode representation of the central system's geosynchron selection interface according to one. embodiment of the present invention;

FIG. 27 is a schematic representation of the publicly defined application programmers' interface that the central system's provides to independent programmers to enable them to write software to let remote computers to use the functionality of the central system under independently written program control;

FIG. 28 is a representation of functions provided by the central system's ad selling API in some embodiments of the present invention;

FIG. 29 is a pseudocode representation of the central system's personal message selling programming according to some embodiments of the present invention;

FIG. 30 is a pseudocode representation of the central system's ad response programming according to one embodiment of the present invention;

FIG. 31 is a pseudocode representation of the central system's locator signal response programming which is similar to the programming shown in FIG. 16 except that it responds to the identity, number, and/or closeness of wireless units that are near a given mobile unit for which it is determining the messages to be displayed;

FIG. 32 is similar to FIG. 31 except that in it the central system responds to information about the speed of a mobile unit in determining what messages it should display;

FIG. 33 is a pseudocode description of programming contained in a mobile unit to make use of one or more cameras located on that mobile unit;

FIG. 34 is a pseudocode representation of programming used by the central system to make use of the cameras contained in the central system's fixed and mobile units;

FIG. 35 is programming used by the central system to cause two or more of its displays to perform a synchronized message display;

FIG. 36 is programming used by the central system to cause one of its displays to display a location-varying message;

FIG. 37 is a pseudocode representation of programming on a mobile unit used in the display of a location-varying message of the type described with regard FIG. 36;

FIG. 38 is a pseudocode representation of programming that can be used by a mobile unit to help it accomplish functions related to its use as a taxicab;

FIGS. 39A and 39B are pseudocode representations of programming used by the central system to accomplish functions related to use of mobile units as taxicabs;

FIGS. 40 and 41 are schematic representations of the functionality that can be performed by various embodiments of the invention in capturing and displaying information about traffic or weather, respectively;

FIGS. 51 through 55 illustrate a display device for use in a mobile unit according to some embodiments of the invention which is designed to use sunlight or other external illumination to backlight its display;

FIG. 56 is a fixed display that can be used in some embodiments of the invention to enable sunlight or other external light to help backlight its display;

FIG. 57 is a pseudo code representation of programming which can be used by the central system in embodiments of the invention which pay drivers of mobile units as a function of the earnings from displays shown by their mobile unit; and FIG. 58 illustrates some of the various types of non-commercial programming which can be used in some embodiments of the invention to help draw viewers' attention toward the displays of the invention's system;

FIG. 59 is a schematic representation of one possible publicly defined application programmer's interface which the central system's can provide to independent programmers to enable them to write software to let display units use the functionality of the central system under independently written program control;

FIG. 64 is a schematic representation of a system for controlling the display of messages displayed on mobile display units as a function of position, in which multiple receivers are used to determine the location of the mobile unit;

FIG. 65 is a highly simplified pseudo code representation of one embodiment of programming in the central system used to support the automatic message placement capability of the invention;

FIG. 66 is a highly simplified pseudo code representation of one embodiment of programming contained within an individual display unit for purposes of supporting the automatic message placement capability of the invention;

FIG. 77 is a highly simplified pseudo code representation of the energy conservation scheme executed by the hardware and software of the rooftop box shown in FIGS. 67 and 68;

FIG. 78 is a highly simplified pseudo code representation of programming contained within the rooftop box's computer for energy conservation, temperature control, and status reporting;

FIG. 79 is a highly simplified pseudo code representation of some of programming contained on the central system for monitoring the status of the system's display units;

FIGS. 80, and 81 and 82,illustrates three different types of status reports which can be generated by display units in response to requests from the central system.

DETAILED DESCRIPTION OF PREFERRED EMBODIMENTS

Figure 1:
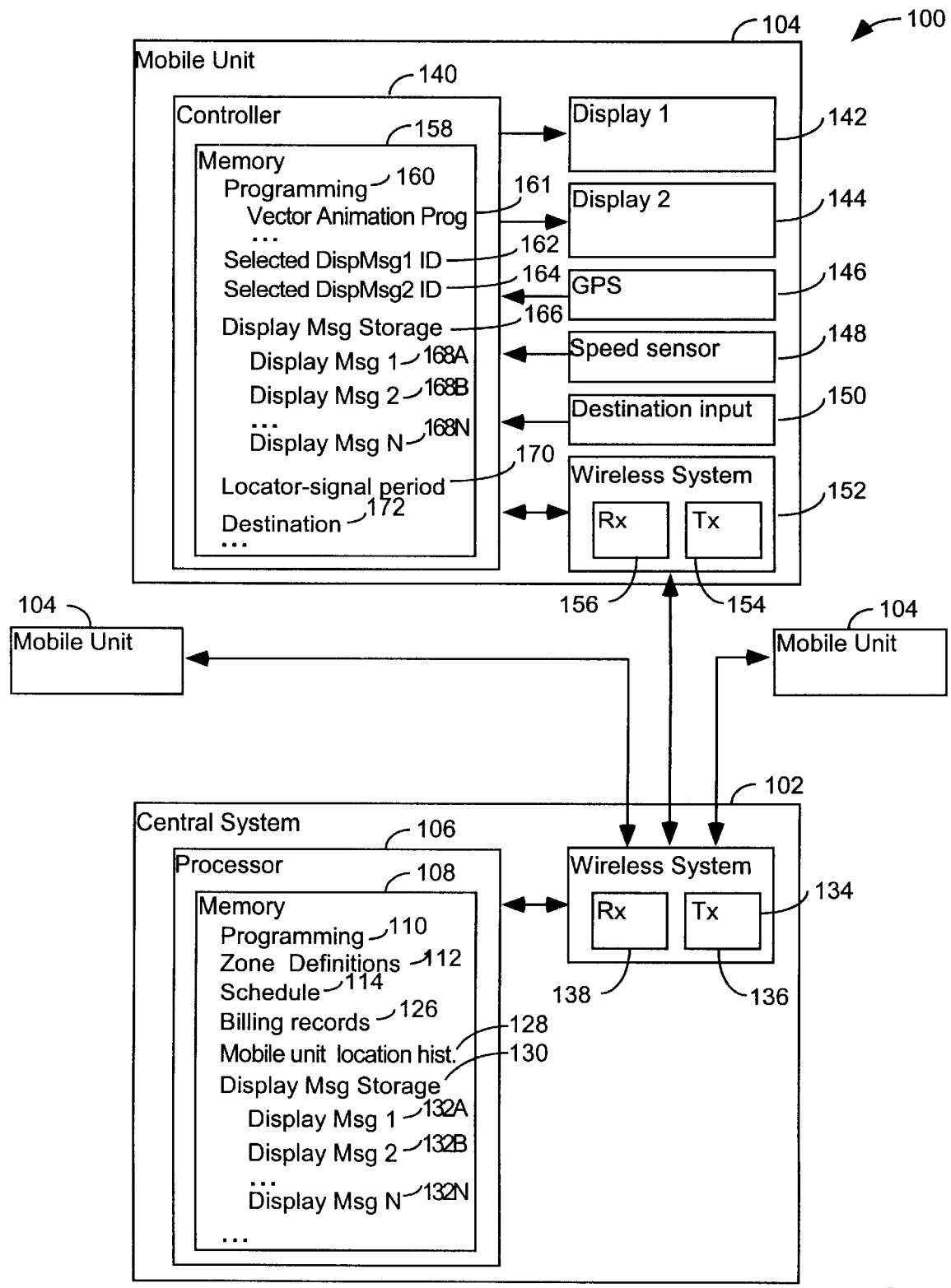
FIG. 1 is a schematic overview of one embodiment of the present invention.
Figure 3:
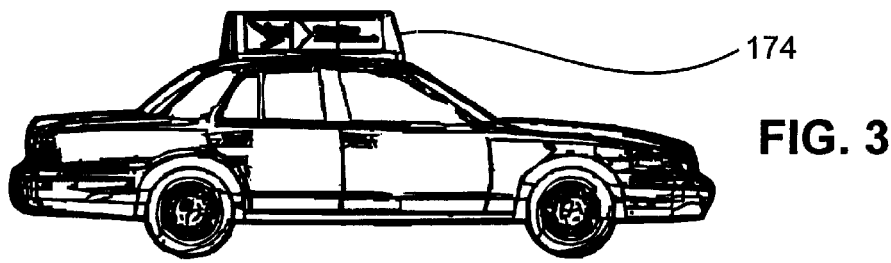
FIGS. 3 through 6 provide, respectively, a side view, two perspective views, and one top view of a mobile unit according to one embodiment of the present invention.
Figure 4:
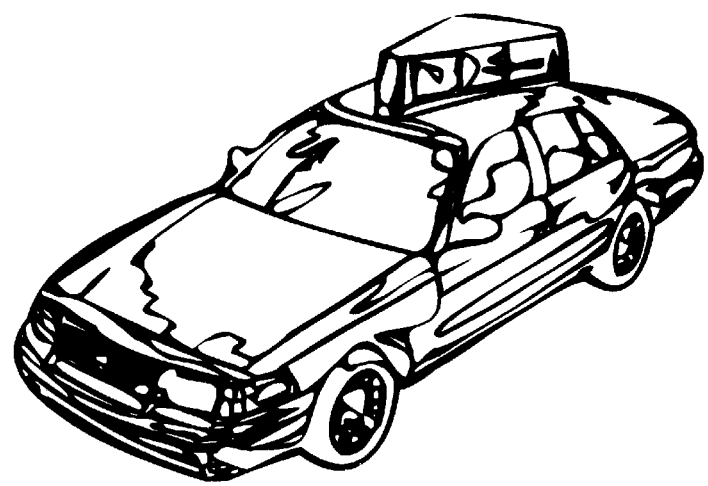
Figure 5:
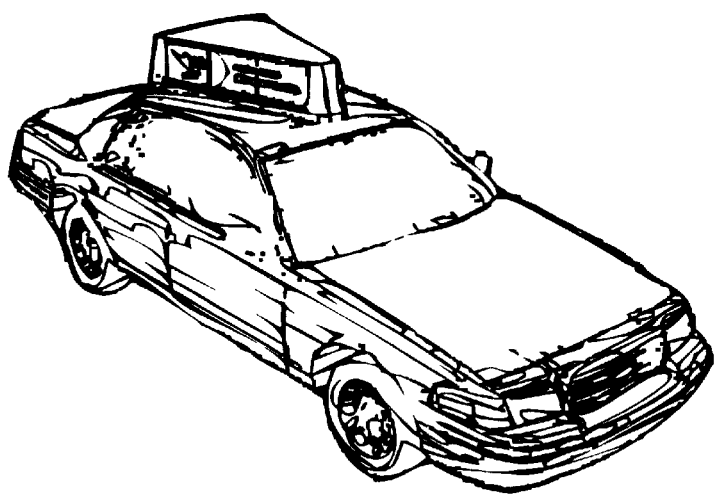

FIG. 1 provides a schematic overview of a system 100 for displaying information on mobile signs according to one embodiment of the present invention. The system 100 includes a central system 102 and one or more mobile units 104 that are controlled by the central system. The central system includes a processor 106 which includes memory 108 that stores programming to control its operation. The processor's memory also includes geographic zone definitions 112 which define the geographic zones in which the system can display different messages. In different implementations geographic zones can be defined differently. In some embodiments they can correspond to zip code or census blocks. In other embodiments they can correspond to the length of a given street along a given block. In some embodiments, zone definitions will tend to remain relatively fixed overtime. In other embodiments zone definitions could be redefined frequently, such as daily, or even hourly, to reflect different geographic areas advertisers have an interest in displaying their advertisements in.

The central system's memory also includes a schedule 114.

FIG. 2 illustrates one possible embodiment of the schedule 114 in which the schedule takes the form of a database table comprised of rows corresponding to record in the database and columns corresponding to individual fields within the records. This table includes a zone column 116 that defines the geographic zone of a given record 124 in the table. The table also includes a time column 118, which identifies the time range during which a given record 124 is to apply. The table further includes columns 120 and 122 that identify the display messages that are to be shown on the separately programmable displays of a given mobile unit in the zone and at the time indicated in the zone and time fields of the record 124 in which they occur. As those skilled in the computing arts will understand, in other embodiments of the invention the schedule 114 can be a virtually any type of data structure capable of indicating which display messages are to be shown by a mobile unit given information that can include the zone in which it is currently located; the current time; the mobile unit's speed; the number and types of displays which the mobile unit has; the number of the other mobile units currently located in the same zone; the number of cumulative minutes the mobile unit or other mobile units have already displayed a particular message (or other messages from the same or other advertisers) in one or more relevant time periods, either in the current zone or in some large number of zones; and any other information which may be relevant to what messages might be desired on a given mobile unit, given its current location.

As is implied by the paragraph above, in some embodiments of the invention, the schedule takes into account how many times one or more messages from a given group of messages have been shown within one or more zones during one or more time periods by one or more mobile units in determining if a given message should be shown by a given mobile unit in a given zone. For example, with such a schedule an advertiser would be able to instruct the system to "Show my message for a total of 1000 minutes total in Wall Street area Monday–Friday 3–5 pm". Another advertiser might request that the system show a set of five different messages for a total of 5000 minutes in four different zones in which it has stores during rush hour over a period of a month. In some such systems the scheduling will attempt to have the desired number of minutes that are shown over a given amount of time distributed relatively evenly across that time period.

As FIG. 1 shows, the central system's memory also includes billing records 126. These records indicate which display messages have been shown at what zones at what times, so advertisers can be billed accordingly. The billing records 126 can also include bills addressable to individual advertisers generated from such information.

The central system's memory also includes mobile unit location history 128, which records information about the current and past location of individual mobile units. This information can be used to project the likely travel of an individual mobile unit and, thus, allow such a mobile unit to more efficiently cache display messages for the geographic zones it is likely to travel in.

In different embodiments of the invention different types of display messages can be used. The display messages used with the invention can vary from simple text messages displayed on the low-resolution text-based displays, to high resolution still graphic images or high-resolution color animated or video messages. The messages can be fixed length messages, similar to TV advertisements, which have a fixed duration, or they can be messages designed to be run continuously for a variable period of time, such as messages with a fixed image or messages with a loop of moving images that is intended to be continuously repeated. The content of the display messages can include not only advertisements, but also other types of messages such as weather and traffic reports (including local traffic reports, such as reports of how many feet till the scene of a traffic jam or the detour), news, public service announcements, and information and entertainment programming.

The central memory also caches display message in a display message storage 130. As is indicated in FIG. 1, this storage or cache area is used to store a plurality of individual display messages 132A through 132N after they have been downloaded from the central system. These cached display messages can be used to increase the speed with which mobile units can display selected display messages by preventing the need for the mobile unit to download each such message at the time the mobile unit is instructed to display it. Such caching also has the benefit of decreasing the amount of communication traffic required by the system, since it often enables messages which are shown multiple times to be downloaded only once.

The central system shown in FIG. 1 further includes a wireless system 134 for transmitting and receiving wireless messages to and from individual mobile units. The wireless system includes both a transmitter 136 and a receiver 138. As will be understood by those skilled in the arts of radio-frequency communication, in many embodiments of the invention, the transmitter and receiver of a wireless system will commonly share many components. The wireless system 134 can be any sort of wireless transmitter currently known or hereinafter invented. In many embodiments of the invention, however, the wireless system 134 will be a cellular phone or a wireless data communication system. In such embodiments, many of the components of the wireless system will be part of wireless systems provided by one or more third party phone companies.

In the embodiment shown in FIG. 1 each of the mobile units 104 includes a controller 140; a first and second separately controllable display 142 and 144, respectively; a global positioning system ("GPS") 146, a speed sensor 148 capable of determining the speed of the mobile unit; a destination input device 150, such as a keyboard, enabling a user of the mobile unit to input information defining a desired destination for the mobile unit; and a wireless system 152 which includes a transmitter 154 and a receiver 156 communicating with the central system 102. The controller can be a relatively powerful computer system capable of running a major operating system, such as Microsoft's Windows or Windows NT, Unix, or Linux, as smaller computer capable of running smaller operating systems such as those which are often used with embedded controllers.

The displays 142 and 144 can be virtually any type of display capable of showing an electronically encoded image including, for example, liquid crystal, LED, gas plasma, projection display, electronic ink (of the type being developed by Eink Corporation, and similar technologies), electronic paper (such as Gyricon, being developed by Xerox PARC, and similar technologies), and cathode ray tube displays. In some embodiments of the invention, the separately controllable displays 142 and 144 might actually be two separate parts of a single display. In many embodiments of the invention, such as those shown in FIGS. 3–6, FIGS. 42–43, FIGS. 45 and 46, it is preferred that the displays 142 and 144 be at least a VGA resolution display having at least 640×480 pixels. In fact, in the embodiments of these figures the side displays 142 are each comprised of three separate VGA or better resolution displays which are ganged together to form one display, and the back display 144 is formed of two separate VGA or better resolution displays which are ganged together to form one display. In other embodiments of some aspects of the invention, a mobile unit's display need not be formed of such high resolutions display, nor need they be formed of such ganged displays.

FIGS. 3 through 6 provide various views of one embodiment of the mobile unit 104. In this embodiment the mobile unit is a taxicab and most of the components identified within the box labeled 104 in FIG. 1 are contained in a car-top, or rooftop, unit 174 shown in FIGS. 3 through 6. In this embodiment the mobile unit's first separately controllable display 142 is actually two displays, one located on each of the longer two sides of the triangularly shaped car-top unit 174. The mobile unit's separately programmable second display 144 corresponds to a smaller display unit that occurs in the back-facing, shorter side of the triangularly shaped car-top box. Such a rear-facing display can display separate content from the side-facing displays, since its content could be tailored to the audience of drivers rather than pedestrians. It should be noted that the vehicle associated with a mobile unit need not be a taxi. In fact, it could include buses, trains, trucks, privately owned passenger cars, boats, airplanes, blimps, and virtually any other type of vehicle.

The mobile unit's controller 140 contains memory 158 that includes programming 160 which controls its operation. It also stores display message IDs 162 and 164, which identify the display messages that are currently to be shown on the mobile unit's two displays 142 and 144. The controller's memory also stores a cache of display messages in the display message storage 166. This cache includes a plurality of display messages 168A through 168N that have been cache after having been downloaded by wireless transmission from the central system 102.

In some embodiments of the invention this display unit's programming 160 includes programming 161 for generating animated video output from vector-based representations of animation. By vector-based animation representations, we mean digital representations which defines animation in terms of one or more patterns each of which can be assigned moving positions relative to a display screen, and at least some of which are defined as scalable geometric shapes. This use of vector-based animation has the benefit of enabling animated, relatively high-resolution images to be generated on a display unit from files or other collections of data that are relatively compact. This reduces the amount of time and bandwidth required to download such messages from the central system, and it reduces the amount of space required to store a plurality of such animated images in the display unit's display message storage area.

In some embodiments of the invention, the mobile unit's controller's memory further includes a locator-signal period variable 170, which indicates the length of time that should occur between the generation of successive locator signals. Such locator signals transmit information about a given mobile unit's status and location to the central system. In some embodiments, the mobile unit's memory also stores a destination variable 172, which records information input about an intended destination for the mobile unit's vehicle which has been input into the destination input device 150.

Figure 7:
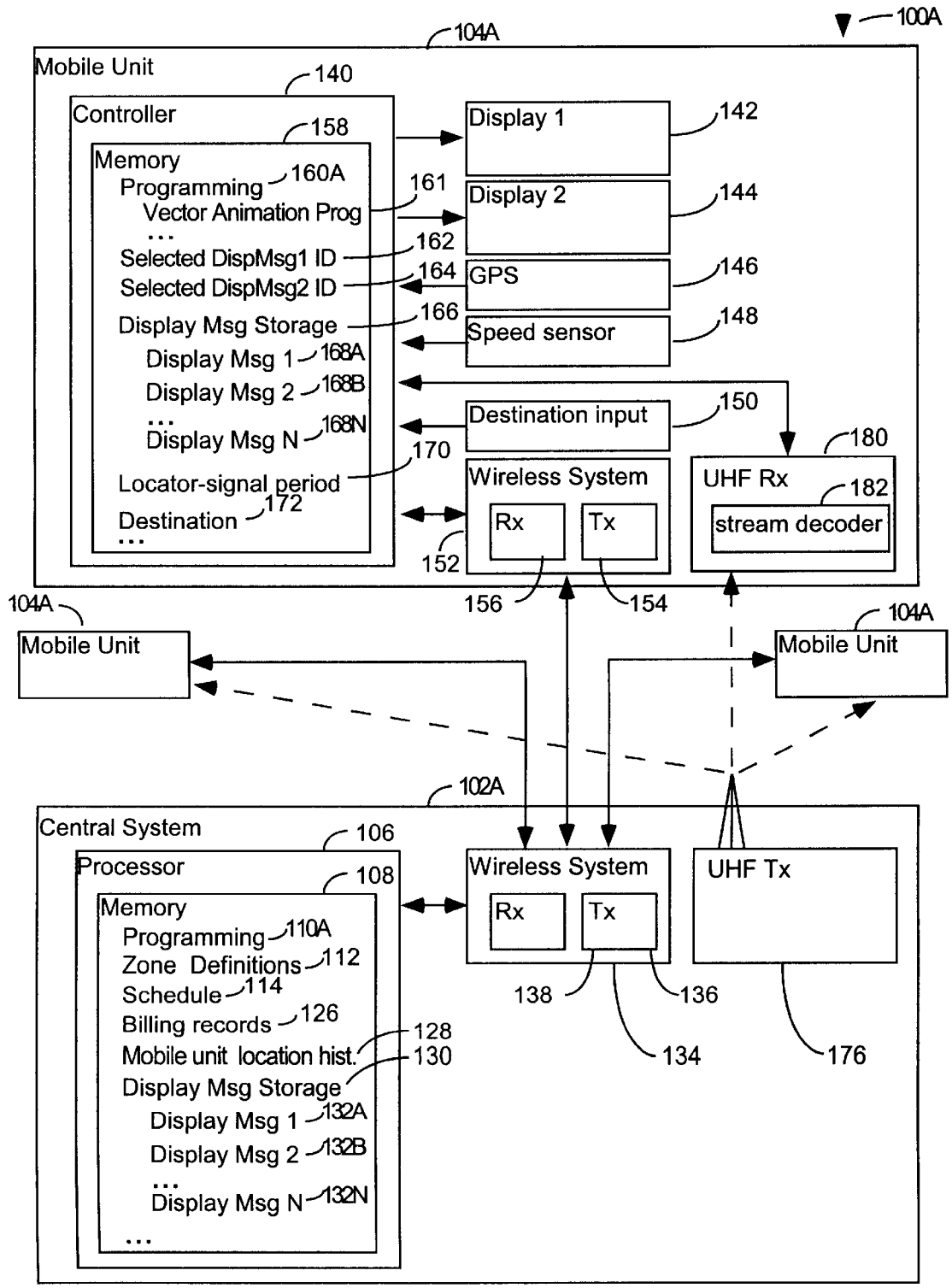
FIG. 7 is a schematic overview of an alternate embodiment of the present invention that uses a UHF transmitter to communicate the content of display messages to its mobile units.

FIG. 7 illustrates an alternate embodiment of the invention's system for displaying information on mobile signs. This embodiment is identical to that shown in FIG. 1 except for the fact that its central system includes a broadband transmitting system, such as a UHF transmitter 176, which can be a licensed UHF television station, and except that its mobile units 104A include a corresponding broadband receiving system, such as a UHF receiver 180 and a stream decoder 182. In this embodiment of the invention, the UHF transmitter transmits multiple streams of data of the type shown schematically in FIG. 8.

As is indicated in FIG. 8, the data transmitted by the UHF transmitter is comprised of a plurality of data streams 186. Each of these streams includes a plurality of messages 132 of different length which occur at successive times. As will be described below, the central system transmits to each mobile unit an indication of which of the messages contained in one of its data streams the mobile unit should display live, and which of such messages the mobile unit should cache. Such control information is sent through the wireless transmitter 136 shown in FIG. 7 in many embodiments of the invention. In some embodiments of the invention, such instructions are included in one or more of the UHF data streams themselves. As those skilled in the communication arts will appreciate, there are multiple methods by which one or more data streams can be encoded on a high frequency transmission signal such as those generated by UHF transmitter's.

FIG. 9 describes some of the programming 160 associated with the mobile units. In particular, it describes a main loop 186 that the controller repeatedly executes during normal operation. The major function of the portion of the main loop shown in FIG. 9 is to wait for, and to respond to, messages from the central system 102 shown in FIG. 1. When such a message is received, step 188 causes the steps 190 through 222 in FIG. 9 to be performed. In other embodiments, other programming structures besides a main loop can be used. For example, the main loop could easily be replaced with an event driven architecture where the repeated polling is replaced with an interrupt service routine to dispatch events.

Step 190 reads the message that is been received from the central system to determine its type. If the message is a display-selection message, step 192 causes steps 194 through 214 to be performed; if it is a caching message, step 216 causes step 218 to be performed; and if it is a locator-signal-period message, step 220 causes step 222 to be performed. Although not described in this specification, other types of messages can be sent from the central system to mobile units.

If a message received from the central system is a display-selection message, steps 194 through 214 will be performed.

Step 194 performs a set of steps 196 through 210 for each of the separately controllable displays of the mobile unit. In the embodiment shown in FIG. 1 each mobile unit has two separately controllable displays. In some embodiments the mobile unit will only have one controllable display and in yet other embodiments it might have more than two.

For each separately controllable display message, step 196 tests to see if the content of the display message identified in the display-selection message for the current display is contained in the display-selection message, or not. This difference is illustrated with regard to FIGS. 10 and 11. FIG. 10 shows a display-selection message 224 in which selected messages are represented only by their IDs. FIG. 11 shows a display-selection message 224A that is identical to the message 224 except that in it the content of the selected messages is included within the display-selection message. As can be seen by comparing FIGS. 10 and 11, both messages include a header 226; a mobile unit ID 228, which identifies the particular mobile unit to which the display-selection message is addressed; and, in some cases, a locator-signal period 234, which identifies the length of time which the mobile unit should wait between transmitting the locator signals that inform the central system of the location of the mobile unit.

Returning to FIG. 9, if the step 196 finds that the received display-selection message is of the type shown in FIG. 11, which includes the contents of selected display messages, it will cause step 198 to read that content and show it upon the associated display 142 or 144.

If the test of step 196 is not met, i.e., if the display-selection message does not contain the content of its selected display messages, then step 200 tests to see if the selected display message is stored in the mobile unit's cache memory 166 shown in FIG. 1. If so, step 202 will cause the content of the selected message to be read from memory and shown on the associated display.

If the display-selection message identifies the selected message as part of a broadcast data stream 186 of the type shown in FIG. 8, step 204 will cause steps 206 and 208 to be performed. Step 206 will cause the data stream receiver 182 shown in FIG. 7 to receive the identified display message, and step 208 will cause the identified display message to be shown on the corresponding display of the mobile unit in real-time. The steps 204 through 208 are only applicable to embodiments of the invention of the type, such as that discussed above with regard FIG. 7, which have live messages broadcast to mobile units through a data channel or stream other than data-selection messages transmitted from the central system's wireless system 134.

If none of the tests contained in step 196, 200, or 204 have been met for the current display-selection message, then step 210 will cause the controller to send a locator signal to the central system indicating that the mobile unit does not have the selected message. In many embodiments, the central system will respond by sending the contents of that message to the mobile unit or by instructing the mobile unit to display another message.

If a display-selection message includes a locator-signal-period value 234 of the type indicated in FIGS. 10 and 11, step 212 of FIG. 9 will cause step 214 to write that value into the location-signal-period variable 170 shown in FIGS. 1 and 7. This value will then be used by the mobile unit to control the frequency at which it will generate the locator signals that inform the central system of its location.

If the message received by the main loop of the mobile unit's controller shown in FIG. 9 is a caching message, step 216 will cause step 218 to cache the display message identified in the caching message. In most embodiments of the invention, a caching message will either include the contents of any that it indicates are to be cached, or, when used with embodiments of the invention having one or more broadcast data streams, such as, for example, the embodiment discussed above with regard FIG. 7, it will contain sufficient information to enable the mobile unit's broadcast receiver and stream decoder to select the desired message from a broadcast data stream, so that the messages' content can be stored in the caching memory 166.

If the message received by the new mobile unit's controller is a locator-signal-period message, step 220 will cause step 222 to store the locator-signal-period value received in that message in the locator-signal-period variable 170 shown in FIGS. 1 and 7.

FIG. 12 is a schematic representation of a locator signal message generated by some embodiments of the present invention. As is been stated above, the locator signal is generated by a mobile unit to inform the central system of the mobile unit's location. The locator signal 240 includes a header 242; a mobile unit ID 240, which enables the central system to know the identification of the mobile unit generating the locator signal; and GPS coordinates generated by the mobile unit's GPS unit 146 shown in FIGS. 1 and 7, so as to inform the central system of the mobile unit's location.

In the embodiment shown in FIG. 12, the mobile unit can also use locator signals to communicate other types of information with the central unit. For example, in the embodiment shown in FIG. 11, the locator signal 240 includes the IDs 248 of each of the display messages currently shown on the separately controllable displays of the mobile unit. This information is transmitted to the central system so it can verify that the display messages it has instructed the mobile unit to show have, in fact, been shown for their desired duration. The locator signal 240 of FIG. 12 also includes the vehicle speed 250. This speed information enables the central system to more accurately calculate the frequency at which the mobile unit should generate locator signals, so as to best enable the central system to determine when a mobile unit crosses into a new geographic zone. The speed information can also be used to determine the nature of the content to be displayed. For example, when a vehicle is moving, fixed or slow moving content can be displayed. When the vehicle is stopped, dynamic content including full motion video can be shown.

The messages 252 and 254 shown in FIG. 11 are only sent to the central system when the mobile unit has a need to do so. The information 252 informs the central system that the mobile unit does not have the contents of a selected display message that is to be shown, as would occur if step 210 of FIG. 9 were performed. The locator signal will include the information 254 if the user enters a new desired destination for the mobile unit through the destination input 150 shown in FIGS. 1 and 7. This is a feature which would most commonly be used in embodiments of the invention in which the mobile units are taxis or other vehicles hired to take people to selected destinations.

FIGS. 13 through 15 illustrate daemons used by the mobile unit's controller to help perform various tasks. In other embodiments of the invention other programming techniques besides the use of daemons can be used to accomplish their function, including, for example, interrupts, multiple threads, separate hardware to respond to individual events, and many other known techniques.

FIG. 13 describes the locator-signal daemon 260. This demon tests to see if the time since the last transmission of a locator signal by the mobile unit equals the locator-signal period. If so, it causes step 262 to transmit a locator signal 240 of the type described above with regard to FIG. 12. Among other things this enables the central system to identify the location of the mobile unit.

FIG. 14 illustrates the mobile unit's vehicle-destination input demon 264. This demon tests to see if the user has input a new desired destination for the mobile unit's vehicle in the destination input 150 shown in FIGS. 1 and 7. If so, it causes step 268 to send a locator signal to the central system including an intended destination field 254 of the type shown in FIG. 12. This information as to the intended destination of the vehicle helps the central system determine what message the mobile unit should cache, and can also be used to help the mobile unit determine the locator-signal period to be used by the mobile unit.

FIG. 15 illustrates the mobile unit's speed-monitoring daemon 270. This daemon includes a step 272 that reads the vehicle speed as generated by the speed sensor 148 shown in FIGS. 1 and 7. Step 274 tests to see if the vehicle's speed or direction has changed by more than a certain amount, and, if so, causes step 276 to vary the locator-signal period accordingly. For example, if the vehicle slows down, the locator-signal period can be increased in proportion to the decrease in speed. If the vehicle's speed increases, the locator-signal period will be increased accordingly. Such changes in the locator-signal period are made because the frequency with which the mobile unit needs to inform the central system of its location, in order to enable the central system to accurately determine when the mobile system makes a transition from one zone to another, varies as a function of the mobile unit's closeness to such a zone boundary and on its direction and velocity.

FIG. 16 illustrates the part 280 of the central system's programming 110, shown in FIGS. 1 and 7, which is dedicated to responding to locator signals from mobile units.

This programming includes a step 282 that causes steps 284 through 316 to be performed if a locator signal is received from a mobile unit. Step 284 associated a geographic location with the mobile unit that sent the locator signal. In embodiments of the invention in which the locator signal 240 is of the type shown in FIG. 12, the locator signal includes both the mobile unit ID 244 and GPS coordinates 246. In that case, step 284 merely associates in its memory the GPS coordinates 246 with the mobile unit's ID 244 contained in the locator signal. In some embodiments of the invention, however, the locator signal itself does not actually encode the coordinates of the mobile unit, but instead merely includes the mobile unit ID. In such embodiments, as is described below with regard to FIG. 64, the location of the mobile unit is determined by the wireless system 134, such as by detecting the relative signal strength with which the locator signal is received by various receivers in the wireless system, by determining the relative delay with which the locator signal is received by various receivers in the wireless system, or by any of other methods by which the location of a radio signal can be determined which is either currently, or hereafter known.

Once the central system has associated a geographic location with the mobile unit that sent the locator signal that has been received, step 286 determines in which geographic zone the location associated with the mobile unit occurs. The geographic zone's defined by the zone definitions 112 shown in FIGS. 1 and 7 can be of varying size. In most embodiments, however, the zones defined by the zone definitions 112 will be larger than the resolution of the location associated with mobile units in step 284.

Next step 288 tests to see if the display messages which the field 248 of the locator signal indicates are being shown on its associated mobile unit are different than those identified by the last displays-selection message sent to the mobile unit. If so, step 290 indicates this difference in the billing database, so that advertisers will not be billed for the display of advertisements which were ordered by a display-selection message, but which were not in fact shown.

The next step 292 tests to see if the mobile unit is in a geographic zone for which different display messages should be shown than those indicated by the field 248 contained in the locator signal that has been received. If so, steps 294 through 298 are performed. Step 294 selects the display messages to be displayed by the mobile unit based on the current zone in which the mobile unit is located and the current time, by reference to the schedule 114 described above with regard to FIG. 2. Step 296 sends a display selection message to the mobile unit through the wireless system 134, identifying the selected display messages that are to be shown by the mobile unit. Then, step 298 records the zone, time, and display messages associated with its display-selection message in the billing database 126 shown in FIGS. 1 and 7.

After steps 292 through 298 have been performed, step 300 records information about the location of the mobile unit derived from the current locator signal in the mobile unit's location history 128, shown in FIGS. 1 and 7. As stated above, this information is used to help determine the current speed of the mobile unit, as well as its particular travel patterns, so the central system can help the mobile unit to more intelligently cache messages associated with geographic zones through which it is likely to travel.

Next, step 302 causes steps 304 through 310 to be performed if the central system is using the variable frequency locator signals.

Not all embodiments of the invention need to use variable frequency locator signals. The use of such variable frequency locator signals, however, enables the system to achieve a higher level of accuracy at determining when a mobile unit crosses into a zone for which different display messages should be shown, using a given level of locator signal communication traffic. It does this by causing individual mobile units to vary the frequency with which they generate locator signals as a function of their closeness to geographic zone boundaries, their speed, and their direction. In such a variable frequency system, when a mobile unit is approaching a zone boundary the frequency at which it transmits locator signals is increased. When the mobile units stop moving or travel at a very slow speed, and are not close to a zone boundary, the frequency at which it transmits locator signals is greatly reduced. The net effect is to greatly reduce the amount of locator signal traffic that is required to achieve a given degree of accuracy with regard to determining when mobile units cross-zone boundaries.

If such a variable frequency locator signal system is being used, step 304 shown in FIG. 16 determines, from the locator signal, a distance from the mobile unit to the boundary of its current geographic zone. In some embodiments, this distance will be the closest distance from the mobile unit to a boundary of a geographic zone. In other embodiments, this distance will be the closest distance from the mobile unit to the boundary of the geographic zone in the direction in which the given mobile unit is traveling. Next, step 306 calculates the length of time before the mobile unit is likely to reach the boundary of its current geographic zone, given the distance determined in step 304 and the speed of the vehicle. Next, step 308 calculates a locator signal period based on the length of time determined in step. Finally, step 310 sends a wireless locator-signal-period message to the given mobile unit containing the locator-signal. As is described above with regard to FIG. 9, this will cause steps 220 and 222 of FIG. 9 to set that locator-signal period 170 shown in FIGS. 1 and 7. If the central system is sending a display-selection message to the given mobile unit at approximately the same time that it desires to send a locator-signal-period value to the mobile unit, it can include the locator-signal period in the display-selection message, as is indicated by the field 234 in FIGS. 10 and 11.

If the locator signal that has been received by the central system includes an intended destination designation 254 of the type shown in FIG. 12, step 312 will cause steps 314 and 316 to be performed. Step 314 selects a subset of display messages that are appropriate for a mobile unit to cache given its current location and the intended location identified by the field 254 shown in FIG. 12. Then step 316 sends a wireless message to the mobile unit informing it to cache the selected subset of display messages. In some embodiments of the invention, the caching message sent by step 316 will actually include the content of the display messages that are to be cached within it. In other embodiments of the invention, the caching message will identify messages that are to be received and cached from another communication channel, such as from one of the broadcast data streams 186 shown in FIG. 8, which can be broadcast to the mobile units, such as by the UHF transmitter 176 shown in FIG. 7.

FIG. 17 illustrates bill generation programming 320 that can be executed by the central system. This includes programming 322 which causes the central system to generate billing records for individual advertising clients which indicate the amount of each such bill as a function of the number and length of displays of those advertiser's messages which have been shown on the system's mobile units. In many embodiments of the invention the amount billed to individual advertisers is not only a function of the number of displays which have been made of their messages, but also as a function of the location and time at which such messages have been shown.

Figure 18:
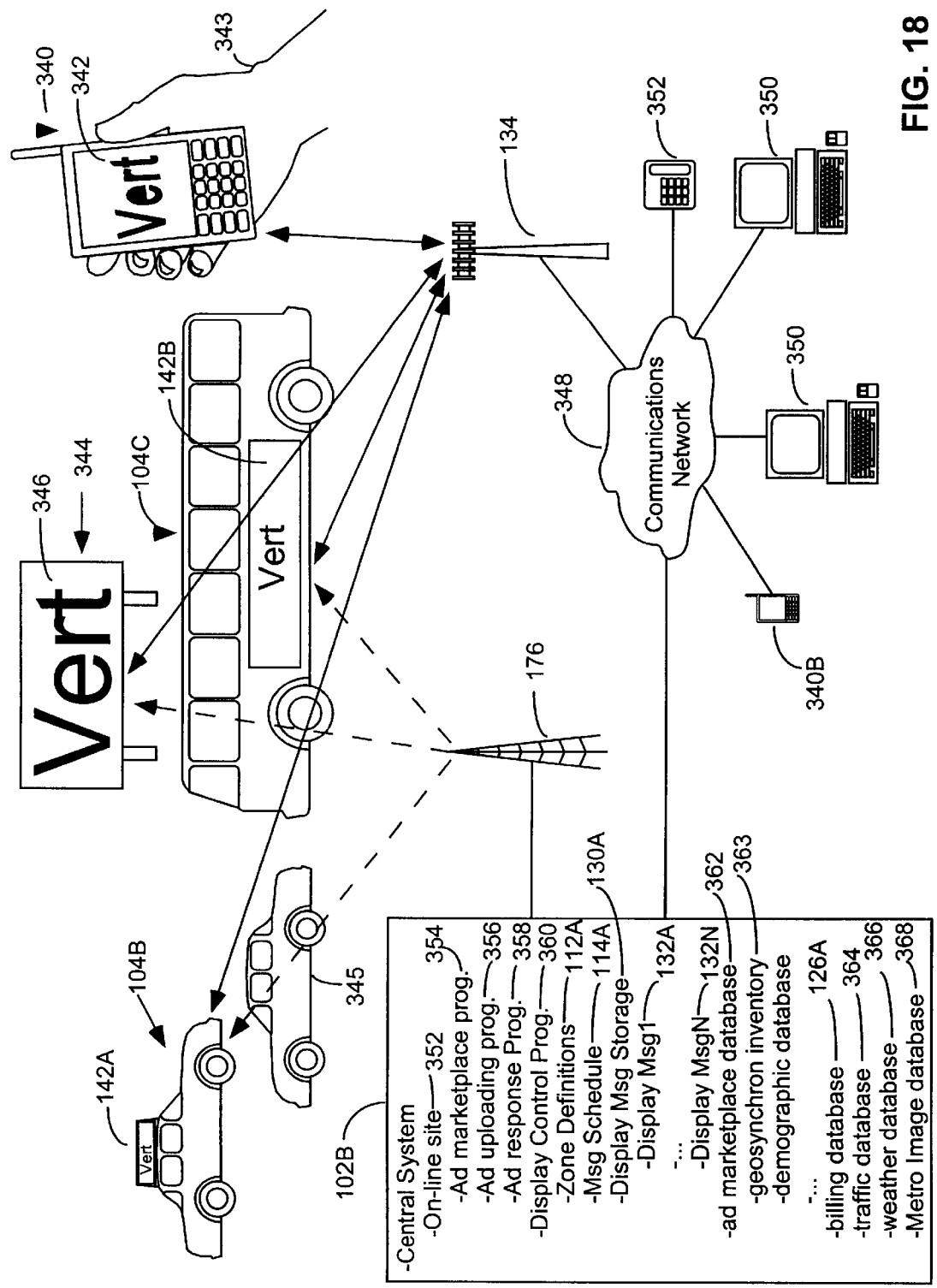
FIG. 18 is a schematic representation of an display system according to one embodiment of the invention which controls the display messages on mobile, fixed, and portable displays, and which enables users, advertisers, and advertising sellers to access and interact with a system over a computer network.

FIG. 18 illustrates another embodiment of the invention. In this embodiment, the central system 102B controls the display of messages upon more than just mobile display units, such as the cab mobile unit 104B and the bus mobile unit 104C, shown in FIG. 18. It also controls the display of messages upon one or more fixed display units, such as the fixed display 344 shown in FIG. 18, and upon one or more wireless portable computing devices, such as the personal digital assistant (PDA) 340 shown in FIG. 18.

The central system 102B is connected through a computer network to a wireless transmission system 134, indicated by an image of a cellular antenna tower shown in FIG. 18. Through this wireless system the central system can communicate with the various display units and portable computing devices shown in FIG. 18. As stated above with regard to FIGS. 1 and 7, the wireless system 134 used by the central systems of various embodiments of the invention can be either a separate transmitter and/or receiver dedicated to the use of the central system or a wireless system operated by a third-party wireless data communications provider, such as a cellular phone and data network. In the embodiment of the invention indicated in FIG. 18 the wireless system 134 is of this latter type, although in other embodiments it need not be.

In many embodiments of the invention, shown in FIG. 18, the central system also has the capability to communicate with at least some of its display units through a UHF transmitter 176 similar to that described above with regard to FIG. 7.

The computer network 348 shown in FIG. 18 is intended to represent a generalized communication network, which can include telephone, wireless, and data communications, including in many embodiments a network of computer networks, such as the Internet. The central system 102B is connected to the network 348 not only for the purpose of communicating with its display units through the wireless system 134, but also for the purpose of communicating with other types of devices, such as one or more external computer systems 350; one or more other types of computer devices, such as the PDA 340B; and/or one or more telephones 352. The central system 102B uses its connections with such devices to enable people to purchase, and control the content of, messages displayed by the system; to interact with and respond to the system's messages and display units; and to enable users to interact with various forms of information stored in the central system.

The central system 102B of FIG. 18 includes an online advertising e-commerce site 352. In many embodiments of the invention this will be a World Wide Web site. This advertising e-commerce site includes advertising marketplace-programming 354 to enable users to purchase the right to display advertising on the systems various display's during one or more geosynchrons. A Geosynchron is a given combination of one or more times, locations, and other condition. The central system 102B also includes advertising uploading programming 356 to enable users to upload over the communication network 348 advertisements which they desire to be shown during given geosynchrons which they have purchased the rights to. The online site 352 also includes advertising response programming 358 which enables people who have seen messages displayed on the system's various display screens to interact with such display's.

The central system also includes display control programming 360, which is somewhat similar to the display control programming 110 and 110A described above with regard to FIGS. 1, 7, and 16. It also includes zone (or geon) definitions 112A, a message schedule 114A, and display message storage 130A that correspond to the zone definitions 112, the schedule 114, and the display message storage 130 shown above in FIGS. 1 and 7. A geon is a location used to define a geosynchron.

The central system 102B further includes an advertisement marketplace database 362, which stores information, including a demographic database 1150 used in the operation of the central system's advertising marketplace site; a billing database 126, which is similar to the billing records 126 described above with regard to FIGS. 1 and 7; a traffic database 346, which stores information about motor vehicle traffic flows derived from locator signals and other information generated by the system's mobile and fixed units; a weather database 336 derived from weather information obtained from the system's mobile and fixed units; and an image database 368 containing images of one or more metropolitan areas in which the central system 102B is located, which is derived from cameras located on various of the system's mobile and fixed units.

Figure 19:
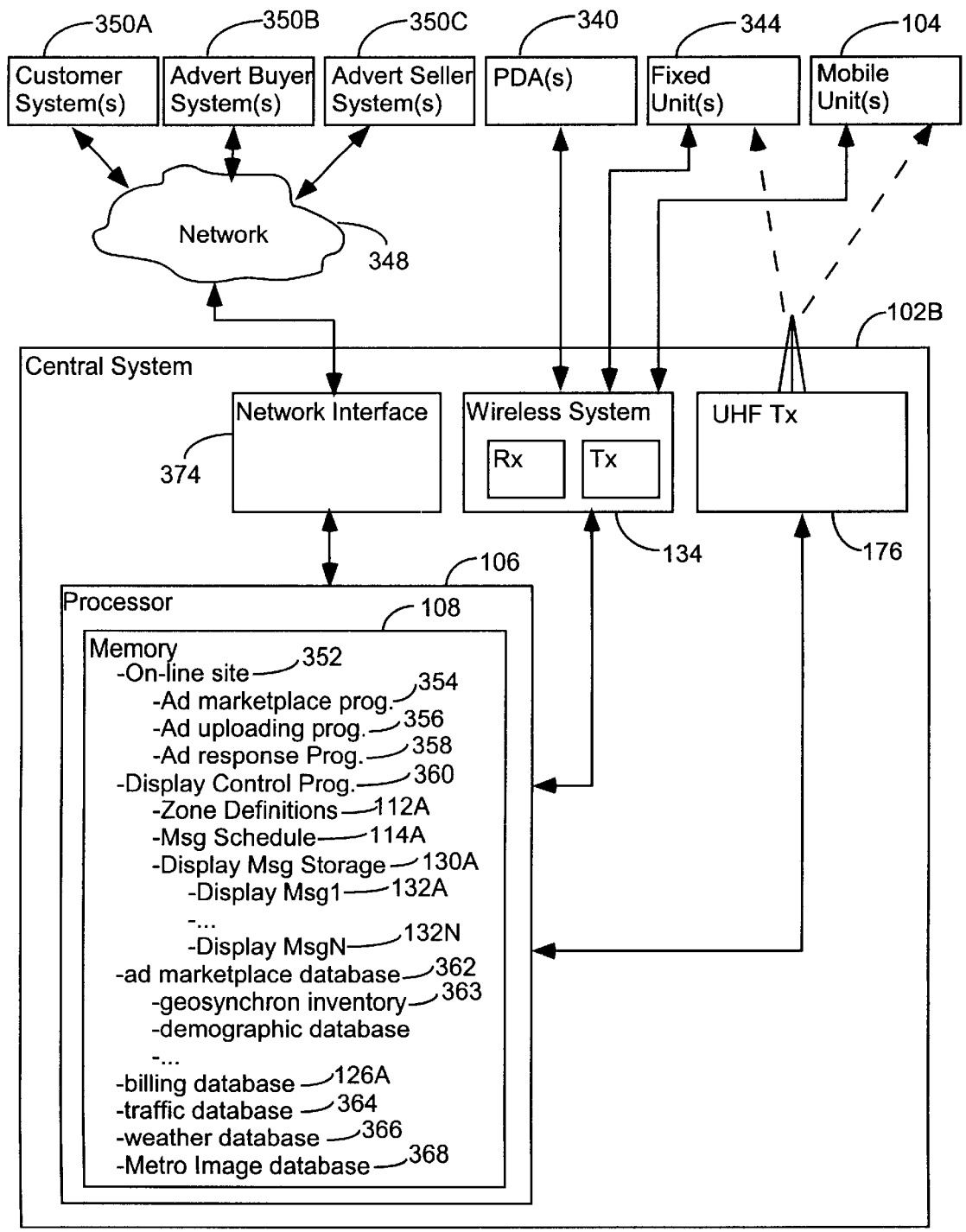
FIG. 19 is a schematic representation of the system shown in FIG. 18 illustrated in a form more similar to that of FIGS. 1 and 7.

FIG. 19 is an alternate representation of the system shown in FIG. 18 that has a form more similar to that of the diagram in FIGS. 1 and 7. In FIG. 19 some of the computer systems 350 are labeled as consumer computers 350A, some as advertising buyer computers 350B, and others as advertising seller computers 350C. A single computer can function as any one of these types of computers, depending on its use. An advertising buying computer 350B refers to a system that is being used by an advertiser, or someone acting on behalf of an advertiser, to obtain information about the placement of advertising or to place advertisements through the system. An advertising seller computer 350C refers to a system that is being used by those who wish to sell, through the central system, advertising availabilities on displays that they control. They could be the operators of the central system, or third parties who control fixed, mobile, or portable displays which can be controlled by the system. A consumer system 350A refers to a computer that interacts with the central system for purposes other than those relating to the selling or buying of advertisements. The only other element shown in FIG. 19 which is not explicitly shown in FIG. 18 is the network interface 374, which represents any type of network interface capable of interfacing with one or more computers of the central system to the network 348.

Figure 20:
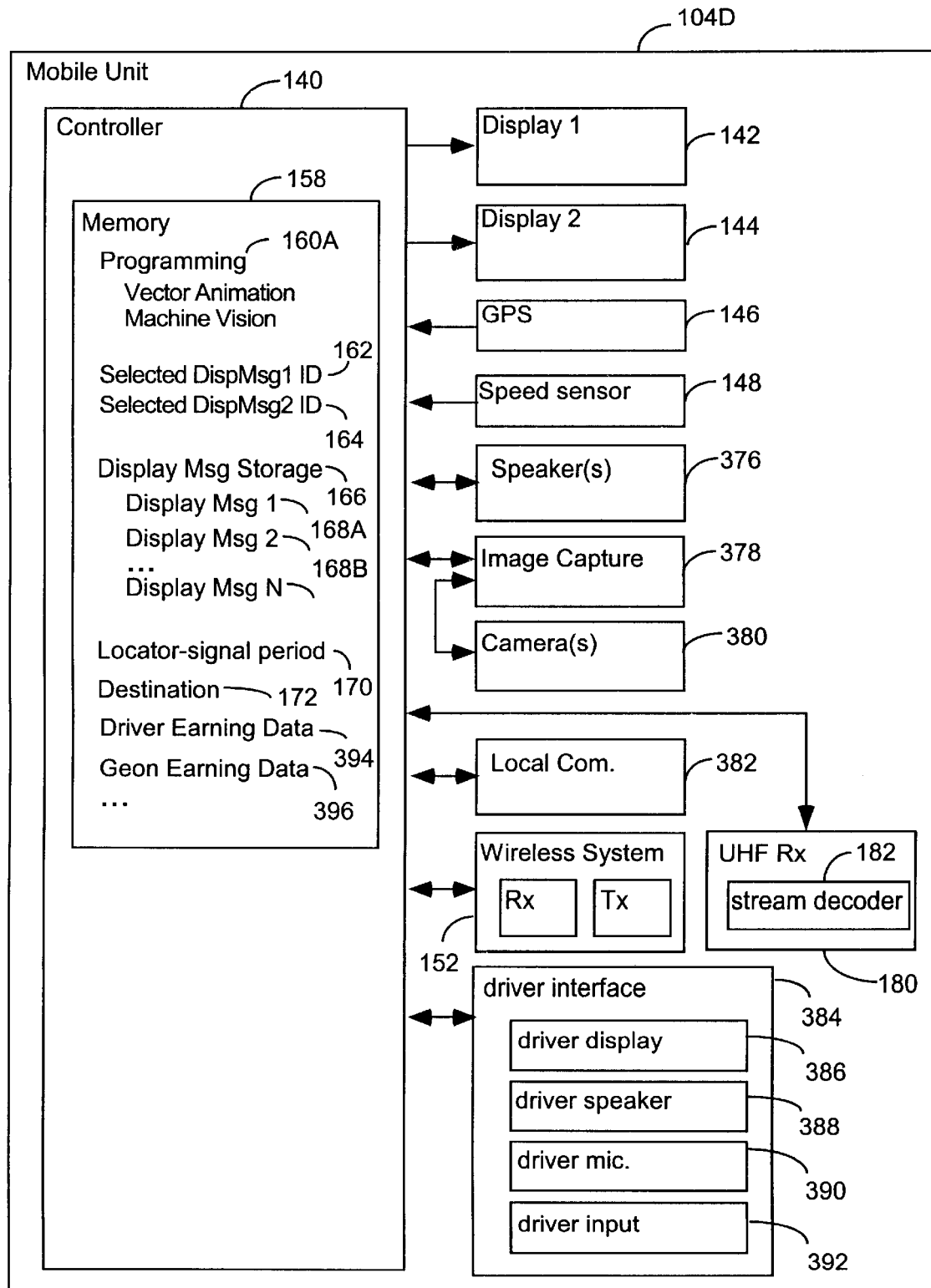
FIG. 20 is a block diagram of a mobile unit according to one embodiment of the present invention.
Figure 21:
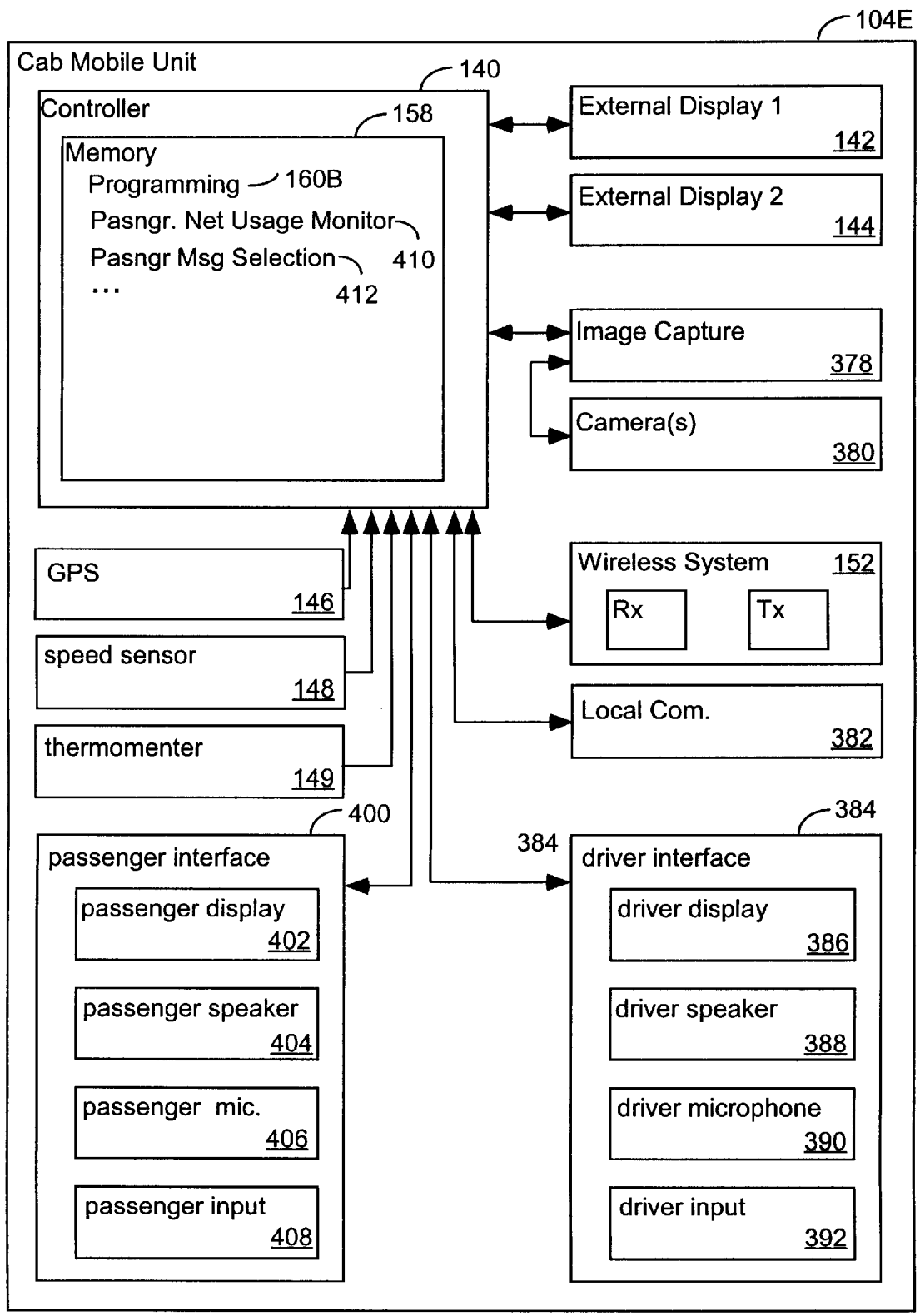
FIG. 21 is a schematic block diagram of a mobile unit designed for use as a taxicab according to another embodiment of the invention.
Figure 22:
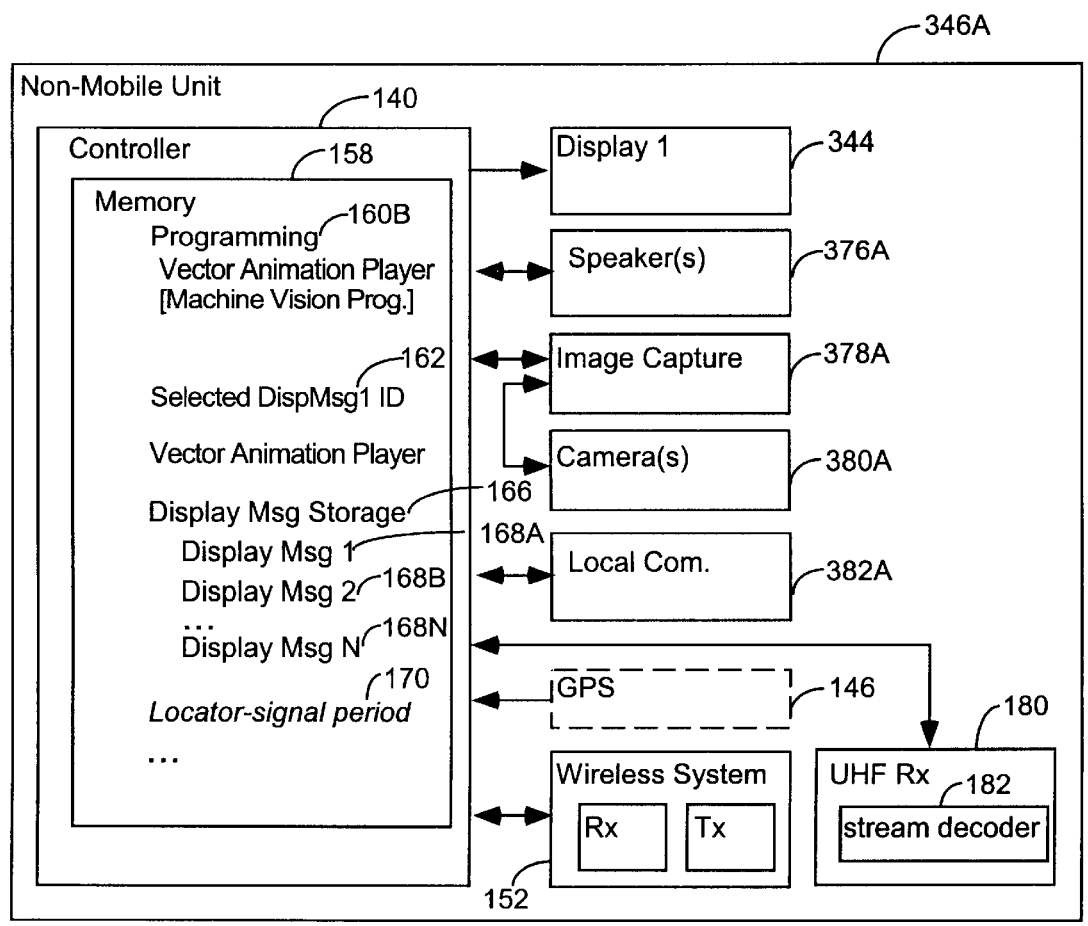
FIG. 22 is a schematic block diagram of a non-mobile, or fixed, display unit according to one embodiment of the present invention.

FIGS. 20, 21, and 22 represent various types of display units that can be used with the system shown in FIGS. 18 and 19.

FIG. 20 represents a mobile display unit 104D that is similar to the mobile display unit shown in FIG. 7, except that FIG. 20 illustrates more of the possible features that the invention's mobile units can contain.

The mobile unit 104D includes multiple external displays 142 and 144; a global positioning system 146; a speed sensor 148, which can be, for example, the speedometer of the vehicle or part of the GPS system; a wireless system 152; a UHF receiver 180; a controller 140; and a memory 158, all of which are similar to the similarly numbered elements shown in FIG. 7.

In addition, the mobile unit 104D of FIG. 20 includes one or more speakers 376 that can be used to generate sound to accompany messages shown on its displays 142 and/or 144, when appropriate. For example, it might be appropriate to generate sound in conjunction with the display of messages when the mobile unit is stopped or traveling at a low speed. In such cases, it would be relatively easy for people near the mobile unit to hear its audio messages even if they are played at a relatively low, and thus non-offensive, volume. At other times the speakers 376 can be used to generate much louder audio messages, enabling the mobile unit to operate as a sound truck that can generate images as well as sound. The speakers 376 can be used to generate audio which is synchronized with a sequence of still or moving images shown on its display, or can be used to display audio messages which are not so synchronized.

The mobile unit shown in FIG. 20 also includes one or more cameras 380 and an image capture device 378 for communicating between the one or more cameras 380 and the controller computer 140. Although in some embodiments of the invention one or more of the cameras 380 can be cameras using chemically developed film, in many embodiments they will be electronic cameras, either digital still image cameras or video cameras. In many embodiments of the invention video cameras will be used, since they can capture moving images, which are often more interesting to the eye. As will be explained below in more detail, the mobile unit's camera can have many uses, including recording information about the potential audience for a mobile unit's messages at various locations and at various times; recording information about traffic at various locations and various times; recording images for real-time display on the mobile unit's display screens; and recording images of the one or more metropolitan areas in which the mobile unit travels for the purpose of creating a visual database of such one or more metropolitan areas.

The mobile unit shown in FIG. 20 further includes a local communication device 382 that is capable of communicating directly with local communication devices of the same type that are relatively close to the mobile unit. The local communication device 382 can be any type of communication device capable of performing such communication. This includes infrared communication devices, and various radio-frequency wireless communication devices, such as communication devices complying with the Bluetooth communications standard.

As will be explained in greater detail below, the purpose of the local communication device 382 is to enable people or devices in the vicinity of the mobile unit who have compatible local communication devices to directly communicate and interact with the mobile unit.

The mobile unit of FIG. 20 also includes a driver interface 384 that includes a driver display 386, one or more driver speakers 388, a driver microphone 390, and a driver input 392.

The driver display 386 is a display located where the driver of the mobile unit can easily read it, such as on the dashboard of the mobile unit's vehicle. Although the driver display can be of virtually any display time, in many embodiments it will be a bitmap display, such as an LED, a liquid crystal, a gas plasma, a CRT, or an electronic ink display. The driver display can be used for many different purposes.

In embodiments of the invention in which a driver is paid money as a function of the amount of money earned by the messages shown on the mobile unit the driver is operating, the driver display can be used to display information informing the driver of the amount of money he is currently earning, the amount of money he has earned over a given period of time, and where to drive to earn the most money.

Figure 63:
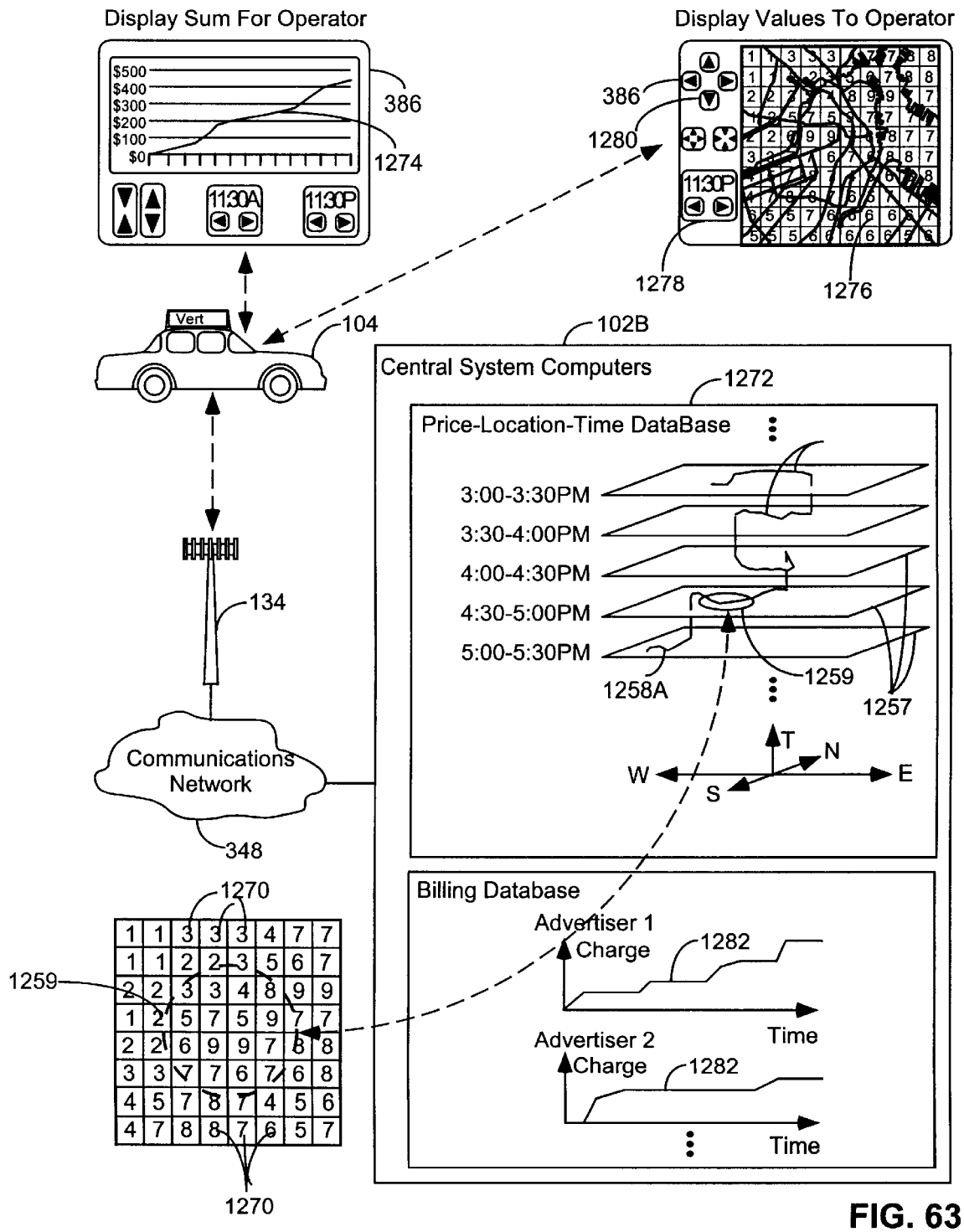
FIG. 63 is a schematic representation of an aspect of the invention which involves associating different values with the display of messages at different locations and times and calculating a sum of such values corresponding to the locations and times through which one or more vehicles has traveled and using such a sum to charge an advertiser or credit a vehicle operator.

In some such embodiments the driver display will show a map of various locations color-coded to indicate the relative earning potential associated with driving through each of them at various points of time, as is shown in FIG. 63.

In embodiments of the invention where the mobile unit is a taxicab or similar vehicle for hire, the driver display will have many uses relating to taxi cab functions.

In many embodiments, the driver display provides the driver with information about the best route to get between two locations. In some embodiments, the display can be used to give directions, such as by displaying the driver's location on a map and indicating on the driver's display where the driver is to take turns. In embodiments of the invention in which images captured by the mobile unit's cameras are compiled into a virtual image of the city, the driver display can be used to show the driver pictures of important locations along a route or the appearance of a desired destination.

The one or more driver speakers 388 are provided to enable the computer 140 to provide audio output to a driver. For example, the driver speaker can be used to inform the driver when he or she is approaching locations in a route at which he or she should make turns. In taxicab embodiments, the driver speakers can be used to enable the driver to receive instructions or information from the dispatcher (whether it be a human or a computerized system) without having to take his or her eyes off the road. The driver speaker can be used for any other purpose for which speakers are used to interface to drivers of automobiles, including providing news, traffic, and weather information.

The driver input 392 includes one or more input devices such as a keyboard, pointing device, or touch sensitive screen on the driver display, which enable the user to input information into the computer 140. This can be used to enable the user to enter a desired destination to which the mobile vehicle is to travel. If the mobile unit is a taxicab, the driver input can be used to enable the user to enter a desired destination as well as the status of the cab, including whether or not the cab is off-duty, has just taken a fare, or is driving to pick up a fare. The driver input 392 is also used to enable a driver to perform any other interactions that he or she may so desire to do with the computer 140.

The driver microphone 390 is used to enable a user to talk to the computer 140 and/or to the system as a whole. The computer 140 can record audio of speech spoken by the driver as well as audio occurring in the cab. In many embodiments either the controller 140 or the central system will have speech recognition capability to enable spoken input from the driver to be converted into text or commands.

In the embodiment of FIG. 20, the memory 158 of the mobile unit's controller 140 includes programming 160 which contains many of the aspects of the programming 160 shown in FIGS. 1 and 7 discussed above. This memory also stores selected message IDs 162 and 164, display messages 168A through 168N, a locator-signal period 170, and a destination 172, as described above with regard to FIGS. 1 and 7. In addition, it stores driver earning data 394 which enables the driver display 386 to provide a driver with information of his earnings based on the amount of money his or her mobile unit has made displaying messages at various geosynchrons, that is, at various combinations of time and place and other possible conditions which the system uses to control the display of messages on its display units. The memory 158 can also include a geosynchron earning database 396, which contains information that can be displayed on the driver display 386 to help a driver decided the earning potential associated with driving through different locations at different times under different conditions.

FIG. 21 illustrates a mobile unit 104E that is similar to the mobile unit 104D of FIG. 20, except that, in addition, it includes a passenger interface 400 including: a passenger display 402, a passenger speaker 404, a passenger microphone 406, and a passenger input 408. The mobile unit of FIG. 21, like that of FIG. 20, can be used as a taxicab or other vehicle used for hire. Its passenger interface 400 would be particularly useful in such vehicles, since it would provide information and entertainment to such passengers. The mobile unit of FIG. 21 also includes a thermometer 149 which can be used to sense the temperature of the air outside the mobile unit. The mobile unit shown in FIG. 21 does not include the UHF receiver 180 shown in FIG. 20, although in other embodiments it could.

The passenger interface 400 can be used for different purposes. It can be used to enable passengers to surf the Internet, and or send and receive e-mail. It can also be used to provide the passenger with paid audio and visual programming, or with audio and visual programming paid for by advertising. In many embodiments providing the passenger with paid audio and video programming, the mobile unit's controller 140 includes programming 410 which keeps track of the passengers usage of the passenger interface and charges him accordingly. The amount of this charge can be added to the taxi fare calculated for the passengers' trip. The amount of the taxi fare and any charges for the use of the passenger interface can be displayed on the driver interface display 386 as well as on the passengers' display 402.

In some embodiments of the mobile unit, shown in FIG. 21, advertising messages are shown on the passenger display 402 and/or sounded on the passenger speaker 404. In such case the content of such messages can be selected by the system in response to conditions such as the location of the mobile vehicle, the destination of the passenger in the mobile vehicle, the time of day, day of the week, or date of the month, and other factors, such as information which the passenger has entered on the passenger interface 400. Such message selection can be performed by software 412 contained in the mobile unit's controller 130, or computers of the central system can select it.

FIG. 22 illustrates components of one embodiment, 346A, of a non-mobile unit 346 of the type illustrated in FIG. 18. This embodiment of a non-mobile unit includes a single display screen 344. In other embodiments, the non-mobile unit can have two or more displays, such as, for example, a display on each of two opposite facing sides. The non-mobile unit further includes one or more speaker's 376A. These speakers can be used like the speakers 376 described above with regard to FIG. 20 to provide audio to accompany messages shown on the display 334, or audio containing separate messages from those shown on that display.

The non-mobile unit of FIG. 22 also includes one or more cameras 380A and image capture electronics 378A to enable the mobile unit to record audience, traffic, and weather information for use by the overall system. Like the cameras 380 described with regard to FIG. 20, the cameras 380A can also provide images to networked users of the central system of the camera's view at the current time; provide images which can be shown on the non-mobile unit's display 334 in real-time, if desired; and can, when combined with visual recognition software, enable the non-mobile unit to respond to the people in its view, including responding to looks, gestures, or other behaviors by such people, and/or to derive information about the audience for its one or more displays at different times.

The non-mobile unit further includes a local communication device 382A similar to the local communication device 382 described above with regard to FIG. 20. This device enables the non-mobile unit to interact with people and electronic systems in its locale, which have similar local communication devices. The non-mobile unit further includes a wireless system 152 to enable it to receive messages providing it with instructions as to what messages to display as well as other instructions. In some embodiments, the non-mobile unit will include a UHF receiver 180 to enable it to receive message content and other data transmitted to display units of the overall display system by a UHF transmitter.

Many embodiments of the inventions non-mobile units will not include a global positioning system 136, since the non-mobile units normally will only have one fixed location that only has to be entered into the system once when the mobile unit is positioned at a given location. But in some embodiments, non-mobile units may actually contain positioning systems 136 because such systems are relatively inexpensive, the would automatically determine the location of a non-mobile unit, and they would automatically correct for any changes in the location of the non-mobile unit or its electronics, were they ever to be moved. In such embodiments, the non-mobile unit might actually transmit locator signals, although the frequency at which such signals were transmitted could be very low because of the fixed nature of such units.

FIG. 23 is a highly simplified pseudo-code representation of the programming 420 associated with the online advertising site 352 shown in FIGS. 18 in 19. In many embodiments of the invention, the site will be a World Wide Web site, but in other embodiments it can be other types of online sites, such as, for example, ones connected to a private virtual network. As shown in FIG. 23, this site includes programming 422 that allows a user to cause a plurality of different things to happen. In a web-based embodiments of this aspect of the invention, the e-commerce site downloads web pages which provide an interface allowing a user on a client computer with a browser to select many of the user options provided by the e-commerce site by of pointing and clicking with a computer pointing device, such as a mouse.

As indicated by numerals 424 through 432, this interface enables a user to obtain information about the system's features, how to purchase advertising on the system, how to respond to advertisements on the system, and how to participate in contests and promotions which the system uses to encourage viewing of and interaction with its display units.

As indicated by numerals 1152, the interface provides a geosynchron-selling interface to customers. This interface allows a customer to perform the following functions on-line.

It allows users to examine geosynchrons on a user navigable time-location map, as indicated by numeral 1154. It allows them to search for geosynchrons by various user-selected criteria, as indicated by number 1156. It allows the selection or deselection of one or more geosynchrons shown in the time-location map or in the results of searches by criteria, as indicated by numeral 1158. It allows users to add or subtract selected geosynchrons from a selected group, and to select, add, or subtract geosynchron groups, as is indicated by numerals 1160 and 1162.

The selling interface allows users to purchase or bid for selected geosynchrons, as indicated by numeral 1164. It allows users to select auto-placement of messages, which if selected causes the system to automatically display messages according to user selected criteria, as indicated by numeral 1164 and 1166. The interface also allows users to upload advertisement message, including text, bitmapped, bitmapped-animations, vector-based animation, and real-time feed messages, as indicated by numerals 1170 and 1172. If the user selects real-time feed upload, the central system will download the received message content for showing on one or more of the systems displays in real time.

The sales interface allows a user to select or reselect which uploaded message are to be shown in a set of one or more geosynchrons a user has purchased, as indicated by number 1174. It also allows users to sell or resell geosynchrons, as indicated by numeral 1176. This enables third parties who have display units that interface with the system to sell the right to display messages through this e-commerce site. It also enables those who have purchased geosynchrons to turn around and to try to sell them on the system, if for some reason they decide not to show messages on such purchased geosynchrons. The users can set or vary prices for such resales, creating a third party market for geosynchron display rights.

The interface also allows users to track the showing of messages in purchased geosynchrons, as indicated in numeral 1178, and it allows them to track the showing of auto-placement messages, as indicated in numeral 1180. This informs them of when and where given messages have been shown, the cost associated with such displays, and, in some embodiments, information about the actual audience for the display, such as one or more images taken from the display at the time a message was shown indicated the area in which people could see the display or information which has been derived from such images by use of machine vision.

As indicated by number 1181, the on-line e-commerce site contains programming for automatically billing customers as a result of the time and place at which their messages are shown.

As indicated by numerals 436, the interface of FIG. 23 allows users to see a record of the messages that have been shown in a selected location at a selected time, and to read, obtain more information about, or otherwise interact with a selected one of such ads. This feature would often be used by the members of the audience who remember having seen a given message in which they are interested displayed at approximately a given location at approximately a given time. This interface will allow them to search the database for advertisements based on the time and location at which they were shown, so as to allow users to find a given message they are interested in and to allow them to interact with such an advertisement, when found, such as by clicking through to the web site of its advertiser, by obtaining more information on the product or service described in the message, or receiving a coupon associated with the message.

As indicated by the numeral 438, the central system's online site also allows users to see traffic information collected from mobile units, with the ability to see that information for given location and given periods of time. For example, if a person wanted to know how heavy the traffic was on a given roadway at 4 PM on average workday evenings, he or she would be able to go to this database and obtain this information for many of the locations served by display units associated with the online site. In many embodiments of the systems the traffic database will also incorporate information from sources other than the display system's own display units, such as government sources reporting on current traffic conditions, or local newspaper, radio, and/or TV organizations that have traffic information. The data in this traffic database can include not only image records of traffic at various locations and times, including the current time, but also statistical information which has been manually or automatically derived from such images, as well as information derived from locator signals generated by mobile units, and information derived from speed sensors on such mobile units.

As indicated by the text associated with numeral 440, the interface 422 allows users to see weather information collected from display units, including the ability to see information for a given location at a given time. This enables a user to see what the weather is like at various locations within one or more metropolitan areas served by the system. For example, if there is a big downpour in the region where a given user is located, the system can be used to determine how widespread the downpour is and to determine its motion, so as a better calculate how long it will be before the downpour will end. As with the traffic information database, in many embodiments the system's weather database will include data from sources other than the messaging system's fixed and mobile display units, such as information from the national weather service and from local media organizations.

As indicated by the numeral 441, the central system's online site includes an interface enabling users to navigate a visual image of the city, both by location and time. Although this visual database may include only 2-D images in some embodiments, in many others this visual database will be comprised of 3-D images derived from 2-D images taken by cameras located both on mobile and fixed units. As is well known in the art of image processing, it is possible to drive 3-D images of a scene from multiple 2-D images of it. This process can be used to create a virtual city composed of the many images taken by the system's mobile and fixed display units. Furthermore, the system can include images of the city at various times of day, various times a year, or it various times over a period of years to make the virtual city seem even more alive.

Preferably users are able to navigate to given locations in this virtual 3-D city or metropolitan region in multiple different ways, including: identifying specific addresses; by driving through its by means of virtual travel; by selecting one or more locations from an aerial or satellite view and then selecting to see that locale at a street level view; and/or by selecting various advertisers or other prominent locations within the metropolitan area and selecting to see how they appear within the virtual city. Organizations, such as stores, public transportation authorities, and museums can cooperate with the central system's Internet site by provide 3-D images of their own interiors, which could be linked into the visual database so that they could be navigated in as part of the 3-D space represented by the visual representation.

This 3-D virtual city can have many uses. To name just a few: In some embodiments it will be used to provide directions over the central system's Internet site, as indicated by the numeral 442. In some embodiments, it will be used to help users find the locations of advertiser's businesses. In some embodiments, its software content will be sold or licensed by the central system to other businesses, such as web site. In some embodiments, it will be used as part of video games. And, in some embodiments, it will be used by tourist bureaus for the one or more metropolitan areas it displays.

As indicated by the numeral 443 in FIG. 23, the central system's Internet site enables users to select to see current images from the one or more cameras on the central system's display units. In many embodiments, this interface enables users to see a representation of the current location of the system's individual local and fixed units and to select from which one or more of them they wish to see current images. This feature will be helpful for people who want to see what the current weather is like in a given location, as well as for those who want to see how many people are out and about in any given part of town, and what those people look like.

As indicated by the numeral 444 in FIG. 23, the central system's site preferably also includes an interface enabling users to upload content for noncommercial displays on the central system's various displays. Such an interface can help increase audience participation and interest in the display system, as well as provide interesting non-commercial content for its displays. For example, the system might allow people to upload pictures of their babies as part of a cutest-baby contest, or upload jokes as part of a funniest joke-of-the-day contest.

FIGS. 24A and 24B provides a more detailed illustration of one embodiment of the geosynchron-selling interface 1152 described above with regard to FIG. 23. It describes some of the programming 446 which can be used by the part of the central system's Internet site that enables advertisers, or those working on behalf of advertisers, to buy advertising rights on the display system. This programming includes steps 448 through 506.

If the user selects a particular geosynchron display through the use of a geosynchron display interface, steps 448 and 450 will cause the central system's computer to generate and show to the user the particular display of a selected set of geosynchrons.

FIG. 25 illustrates the geosynchron display interface 508 that enables users to select such a geosynchron display. As indicated by the numeral 510, it enables a user to select a plurality of different options.

As is indicated by the numeral 512 and 514, it enables a user to select to see available geosynchrons according to their associated type of display, such as fixed displays; mobile displays, including taxi or bus displays; or portable computer devices, such as PDA's; or the location of a vehicle mounted display relative to the vehicle it is mounted on. Once geosynchrons associated with one or more of such display types, including side and back vehicles displays, have been displayed, a customer can select have one or more of its messages shown on one or more of such displayed geosynchrons, as described above with regard to numerals 1182, 1184 and 475 through 482 in FIGS. 24A and 24B.

As indicated by the numerals 516 and 518, the interface enables a user to select the type of geosynchrons to be displayed based on how they are sold, such as by auction or by fixed price.

As indicated by numerals 520 and 522, the geosynchron display interface enables users to select the display of geosynchrons based on the particular class of rights associated with each displayed geosynchron, including: whether the geosynchrons are to be uninterrupted for a given length of time, or composed of one or more time slices occurring over a given length of time; whether the geosynchrons relate to a personal announcement, as opposed to a commercial announcement; whether the geosynchrons are display timelimited, which means that the user is only willing to pay for up to a given dollar amount for displays in the time period and location identified by the geosynchrons; whether the geosynchrons relate to the right to use display time left over after other geosynchrons having higher priority, such as display-time-limited geosynchrons, have had their right to be displayed; whether the geosynchrons are being placed for sale in a secondary market, that is, are being sold by an advertiser rather than by the operators of the central system itself; and whether the geosynchrons relate to the sponsorship of other non-commercial program content, such as a news, time, weather, traffic, contests, or other types of non-commercial programming which can be sponsored on the display system.

As indicated by the numeral 524, the geosynchron display interface enables a user to select the time of the geosynchrons he or she wants to be displayed. In many embodiments, this includes one or more slider controls that allow a user to rapidly define different time periods or time durations.

As indicated by numeral 526, the interface also lets users specify one or more locations of the geosynchrons he or she wants displayed. This can be done by navigating on a map and changing the scale of view. It can also be done by enabling a user to enter, if desired, a distance from such a given location, class of locations, given event, or class of events.

As indicated by numerals 528 through 548, the geosynchron display interface enables a user to specify a color scheme to be used in a geosynchron display. As indicated by numeral 532, it enables a user to specify that the displayed geosynchrons be colored according to their respective values of one or more different types of demographic information, such as, for example, household income, population, traffic, or other types of available demographic information. As indicated by numeral 534, the user can select to color displayed geosynchrons by the amount of mobile unit traffic and or display time that has historically occurred in equivalent geosynchrons for the same location in the past.

As is indicated by numeral 536, users are given the option of having geosynchrons colored by their price. When displaying fixed price geosynchrons, this would mean having them colored by their fixed purchase price. When displaying geosynchrons to be purchased at auction, the price color would be that associated with the current bid price. In most embodiments, if the user has selected to view geosynchrons over a time period that spans multiple geosynchrons for a given location, the price display, or other colored value displayed, will normally be an average over the selected time range. Alternatively, a user could use a time slider of the type described above with regard to numeral 524 to see how the color value associated with a geosynchron at a given location varies over time.

As indicated by numeral 538, a user can select to see geosynchrons colored by the identity of the parties that have purchased them. Preferably, the user is given the ability to color geosynchrons by the class of advertiser that has purchased them. Preferably, this would relate not only to geosynchrons which have been purchased but not yet displayed, but also to geosynchrons displayed in the past, including geosynchrons occurring at a specific time in the past, as well as those occurring in the past during some repeated time, such as for example, evening rush hour between four and six PM. In some embodiments, if the user has been authorized by one or more other parties to see which geosynchrons they have purchased, the user is allowed to see geosynchrons colored by those other advertiser's identity. This feature will be particularly useful where different parties are engaged in a cooperative advertising campaign. It will allow one advertiser to see the locations and times at which the other advertisers with whom it is cooperating have been displaying or are planning to display advertisements so that it can place advertisements that will complement such purchases.

As is shown by line 540 of FIG. 25, the geosynchron display interface enables a user to see geosynchrons colored by the degree to which those geosynchrons have been found to match a user specified set of criteria by the geosynchron selection interface described below with regard to FIGS. 26A and 26B. As indicated by numeral 542, the geosynchron display interface also allows users to select to color geosynchrons by any other criteria that can be used for the selection of geosynchrons in the geosynchron selection interface of FIGS. 26A and 26B.

As is indicated by the numeral 548, the geosynchron display interface enables users to select to see geosynchrons colored by whether or not they are selected as belonging to one or more geosynchron sets which have been defined by the user. This, for example, enables a user to see on a map the location of various sets of geosynchrons he or she might have selected by various means.

As indicated by the numerals 550 and 552, the geosynchron display interface enables users to select various display schemes including schemes which display geosynchrons on a map of one or more different selected scales, and those that display them in one or more different list formats.

As indicated by numeral 554, the geosynchron display interface enables users to open, edit, and save a geosynchron set. As is described below, when a user displays a geosynchron set, he or she is able to select one or more individual geosynchrons within it using known graphical user interface selection techniques. The user can select to save one or more geosynchrons so selected at a given time as such a geosynchron set. Once such a set has been saved it can later be opened. A geosynchron set can be edited, such as, for example, by changing its time to a different day, week, or month; by adding or deleting geosynchrons; or by adding or subtracting geosynchron sets. This is handy, because it enables an advertiser who has taken the trouble to define a geosynchron set for a given period of time to later rapidly edit that set definition for reuse at a later time.

As indicated by numerals 556 and 558, if the user selects to show geosynchrons with current settings determined by the controls indicated by numerals 512 through 554 in FIG. 25, then the system will generate a geosynchron display according to those selected settings. This corresponds to steps 448 and 450 described above with regard FIG. 24A. In many embodiments, the system will automatically generate and redisplay such geosynchrons every time the user changes in individual setting. But in situations in which the generation of a new display would be time-consuming, it is desirable that the user be given the option to delay the generation of a geosynchron display until the user has had a chance to make all the settings desired for that display.

If a user selects one or more geosynchrons in a geosynchron display generated by the system in step 558, step 556 enables a user to select to do any of the following things to the selected geosynchrons: to deselect it, as indicated by numeral 564; to see demographic information associated with the selected one or more geosynchrons, as indicated by numeral 566; to see images from the mobile units recorded during corresponding geosynchrons in the past, as indicated by numeral 568; to see statistical, geographic, 3-D, or other data extracted from cameras on mobile units during corresponding geosynchrons in the past, as indicated by numeral 570; to buy or bid on the selected geosynchrons, as indicated by numeral 572; to re-offer the selected one or more geosynchrons for sale if the user currently owns those geosynchrons, as indicated by numeral 574; and, if the selected geosynchrons are expired, meaning they have been used, and if they are owned by the current user, the current user can select to see actual images recording during the display of messages during that geosynchron, if available, and to select to see statistics about the audience during that display, if available, as is indicated by numerals 576 through 580.

In some embodiments of the invention, step 578 enables a user to see recorded images made during the display of their messages shown in synchronism with a playback of their display messages to enable them to see which portions of their advertisements drew what responses from their audience.

The interface of FIG. 25, for example would allow a customer to use control 566 to see selected demographic information on geosynchrons for one or more place-time combinations selected with controls 524 and 526. The use could specify whether to see such demographics associated with geosynchrons for side or back displays using the control indicated by numerals 512 and 514, which in many inbodiments would allow the customer to see the different type of demographic information labeled Pedestrian and Driver in FIG. 62, respectively. This user could then use this different demographic for side and back displays for one or more locations in choosing which messages to display aat which times on side and back displays. Returning to FIG. 24A, the central system's selling programming 486 includes steps 1182 and 1184 which allow a user to select a geosynchron from the location-time map or from lists produced in response to display selections or search results.

The selling programming also includes steps 452 and 454, which respond to a users selection of a set of geosynchron selection criteria by searching for and then generating a ranked list or map showing geosynchrons that match or best match that set of criteria.

FIGS. 26A and 26B provides a description of the geosynchron selection interface 582, which describes its steps in greater detail.

As indicated by the numeral 584 in FIG. 26A, the geosynchron selection interface provides a plurality of controls which enable a user to make one or more weighted value selections for each of the criteria, or parameter types, indicated by the numerals 586 through 638. In many embodiments, the weighting system allows a user to make a given criteria mandatory, that is to require that all geosynchrons selected will have to meet that criteria. For example, if a user selects a mandatory weighting for an ad display device type 586 being of the "back" type, only geosynchrons for back displays, such as the displays 144 shown in FIGS. 3 through 6, will be returned for any exact match or best match search.

As indicated by the numerals 586, 590, and 594, respectively, the geosynchron selection interface enables a user to select desired values for an ad device type, a sales type, and an ad type, corresponding to similarly named types described above with regard to FIG. 25.

The time profile control 614 shown in the geosynchron selection interface enables a user to select one or more separately weighted time periods for the set of geosynchrons to be selected. Preferably the interface allows users to select time periods by date and time, as well as by repeated time classifications such as day of the week, day of the month, work days, weekends, holidays, rush hour, and nearness in time to a given event or one of a given class of events, such as sports events, concerts, or festivals. In one relatively simple embodiment of the invention, a separate geosynchron is defined for each corresponding geographic zone, or "geon", at every successive half-hour interval. In other embodiments, more complex time schemes are used, including those that display different messages in different time slices over a given time period.

The location profile control 616 allows the user to define location criteria in multiple different ways. As indicated in 620, a user can define location criteria by various types of locations including: residential areas; entertainment venues; educational venues, such as universities; parks; government buildings; selected tunnels and bridges; business districts; tourist areas; art galleries; restaurants; movie theaters; 24-hour stores; toll booths; high traffic areas; airports; taxi stands; subway stops; various specified types of stores; various named businesses: and any other location types which have been made selectable by the interface. The user can also select locations by other methods, such as by the town or city they occur in, by geon's having locations corresponding to a predefined geosynchron set, or by a predefined set of geon's. Other methods of specifying geosynchrons can include by nearness to a given location or class of locations, such as nearness to schools, or nearness to airports, or nearness to stores bellowing to a given merchant.

As indicated by the numerals 600 through 612, the geosynchron selection interface enables a user to select a plurality of different types of demographic profile criteria to be used for the selection of a geosynchron set. As indicated by 604, this includes, just to name a few, the population of residents of the area of the display, including the age, education, income, education, language, ethnic group, behavioral or psychological characteristics, and sex of the population, if available, for the selected geosynchrons.

As indicated by 606, the selectable demographic criterion includes parameter values for the audience likely to see messages during the selected geosynchrons. This is different than resident demographics since it is based on estimates of not who lives in a location, but instead the characteristics of people who are actually likely to be able to see the display. This demographic information would reflect the characteristics of people who come into or travel through a given area at a given time. These characteristics include total number of people, and/or averages or numbers of different types of people classified by demographic categories such as age, education, size, income, education, behavioral and psychological characteristics, the type of vehicle they are driving, and their sex, if that information is available. The audience information can also include demographic information which reflect not only who are the people likely to see a display at a given time or place but what they are doing at that time (such as walking, driving, sitting, etc., and their likely relationship to the display, such as their closeness, their speed, their speed relative to the display, their orientation relative to the display, and the amount of time they are likely to have to see the display.

As indicated by numerals 608 through 612, the demographic criteria also include such information as the average household value for the geosynchrons, the average retail sales of the geosynchrons, and the number of employees in the geosynchrons.

As indicated by the numerals 624 through 627 of FIG. 26B the geosynchron selection interface enables a user to define criteria relating to the price of desired geosynchrons.

This includes criteria specifying that the selected geosynchrons be in a specified least or most expensive percentile of the geosynchron pool. The user can also select that the selected geosynchrons be over or under the running average price for the region; that the geosynchrons' price be less than or greater than a specified dollar amount and that the geosynchrons have a small or high price fluctuation. As indicated by numeral 627 the user can also specify a total price limit for a group of geosynchrons that are to be searched for. This allows the system to seek to best match a user selected set of criteria, while keeping the total price at or below a given limit. Other price parameters could also be used, and the selection of price parameters provided could vary depending upon whether or not the user has selected to show geosynchrons purchased at a fixed price or through an auction.

As indicated by numerals 628 and 630, the geosynchron selection interface enables a user to specify criteria for the selection of geosynchrons relating to closeness in time or space relative to named events, such as sporting events, entertainment events, or other events likely to be relevant to advertisers, either by event type or by event name.

As indicated by numerals 632 and 634, the geosynchron selection interface enables a user to specify criteria for desired geosynchrons relating to the advertisers that have bought equivalent geosynchrons in the past, or who currently own unexpired geosynchrons. Preferably, the interface enables the user to identify such advertisers by name, by business type, by business-size, by location, or by individual advertiser ID. As stated above, in most embodiments of the invention, a user will not be able to find the identification of geosynchrons which have been purchased by individual advertisers unless those advertisers have granted permission for such information to be displayed about them.

As indicated by numerals 636 and 638, a user is also able to use set logic to define a set of geosynchrons to be selected based on the definitions of previously defined geosynchron sets, including the addition and/or subtraction of such sets, as well as the editing of sets, such as to change a predefined set to relate to a later time.

As indicated by the numerals 640 through 650, the geosynchron selection interface enables a user to select whether the search is to return only geosynchrons which exactly match the customer selected criteria or those which best match it, as indicated by number 641. It allows them to select to run the actual search or matching programming that finds the exactly matching or best matching geosynchrons and generates and displays the resulting geosynchron set, as indicated by numeral 642. As indicated by numeral 644, the interface enables a user to name and save a geosynchron set or group generated by the steps 642; to open or save a previously defined set of geosynchron selection parameters previously defined by use of the controls 586 through 638, as indicated by numeral 646; to remove geosynchrons from a geosynchron selection set, as indicated by 648; and to add, subtract, or perform other set logic operations upon geosynchron sets, as indicated by 650.

FIG. 27 is an abstract illustration of one possible embodiment of the optimization programming 652 that can be used by the step 642 to seek a set best match geosynchrons. It includes a step 653 which define a multidimensional space as function of the customer selected criteria used in the search and weights associated with those criteria respectively, which either have been selected by the customer or by default. Next in step 654 it finds the distance between one or more points in that space representing values of customer selected criteria and one or more points represented by each of a plurality of geosynchrons, is indicated by criteria values associated with those geosynchrons, such as by a demographic and/or other databases. Then in step 655, it select a set of one or more best scoring geosynchrons that comply with the price limit, if any, selected by the customer.

Returning now to FIG. 24A, steps 456 and 458 of the central system's advertising selling programming enables a user to select a set of auto placement criteria, which will cause the system to automatically show a given set of one or more customer specified messages at times and locations selected by the system according to such criteria.

As indicated by the steps 460 and 462, if a user selects to estimate the price of a selected set of geosynchrons, those steps will display the distribution of probable prices for that set of geosynchrons based on the price for message displays in its individual geosynchrons, either at the fixed price or current bid price, and based on past message display-time patterns for those geosynchrons.

This step enables a user to estimate the likely cost for a geosynchron based on the amount of display time it is likely to have, based on past history. As described above, in the embodiment being described, users are charged based on the amount of display time for their messages within a given geosynchron. In this embodiment, users are able to place in upper limit on the amount of display time they're willing to pay for within a given geosynchron. It should be understood that many other schemes can be used to pay for displays in a geosynchron, given the fact that the amount of time spent in that geosynchron is usually not known in advance and can very widely.

If the user selects to place a geosynchron that it owns for sale, step 464 of FIG. 24A will cause steps 466 through 470 to be performed. Step 466 provides the user with an interface allowing it to identify its advertiser ID; a geosynchron ownership ID of the geosynchron being sold; and an asked price for the geosynchron if fixed-price selling is to be used, or the starting bid, minimum price, and closing time, if an auction is to be used for the sale. If the user provides proper information in step 466, step 468 will cause step 470 to record the offer and place the geosynchron in the system's geosynchron database for sale along with other geosynchrons currently available for sale within the system.

If a party who wishes to sell display availibilities uses the system to place one or more geosynchrons for sale for the first time, step 471 causes steps 472 through 474 to be performed. Step 472 provides the user with an interface that allows the user to enter information defining the geosynchron and the terms under which it is for sale. Such information could include the ad display device type, the sales type, the add type, the time, and location (all as defined with regard to FIG. 25) associated with the geosynchron, as well as an identification of the party owning or controlling the geosynchron's display devices and the price or other terms under which the geosynchrons is available for sale.

Step 473 tests to see if the system has received proper information from the user to define the geosynchrons and how it is to be sold, and, if so, it causes step 474 to record the offer for sale of the central system's ad marketplace database, and it places the geosynchron in the central system's geosynchrons inventory 363, shown in FIG. 19.

As was stated above with regard to FIG. 19, an advertiser seller can either be a person working for the central system who is offering geosynchrons on displays owned or controlled by the central system for sale, or can be a third party offering for sale geosynchrons on displays which the third party owns or controls. In fact, in some embodiments of the invention, the entity which owns the central system may not, in fact, own any of the displays used with the system and may merely act as intermediary for selling, buying, and/or controlling the selection of messages to be displayed in geosynchrons involving such third party displays as a function of time, location, or other conditions.

If a user selects to purchase a fixed-price geosynchron, then step 475 causes steps 476 through 478 to be performed. Step 476 tests to see if the purchase is authorized, and, if so, it causes steps 477 and 478 to be performed. Step 477 records the advertising purchase in the central system's billing records, and step 478 sends the advertiser a geosynchron ownership ID entitling it to identify one or more desired messages to be shown in the geosynchrons in the central system's message schedule.

If a user, or the purchase optimization program described above, selects to bid in an auction for a geosynchron, then step 479 will cause steps 480 through 484 to be performed. Step 480 tests to see if the bid being made is higher than the current highest bid for the geosynchron, and, if so, it records the requested bid as the currently highest bid and it records the requester's advertiser ID in association with the geosynchron in the central system's marketplace database. Then, step 484 returns an indication to the user indicating whether or not the bid was successful.

If the user requests to see the current bid on a geosynchron being auctioned, step 486 will cause step 482 to display information on that current bid price.

If the time for closing bidding on one or more geosynchrons is up, step 490 will cause steps 492 through 496 to be performed. Step 492 causes a loop comprised of steps 494 and 496 to be performed for each geosynchron whose bidding has just closed. In this loop step 494 declares the current highest qualified bidder to be the winner for the geosynchron in its records, recording the winning price as the price of the geosynchron, and step 496 sends a message to that winner informing it that it owns the geosynchron. This message includes a geosynchron Ownership ID which enables the winner to exercise rights as owner of the geosynchron, including the right to determine what one or more messages are to be displayed during it and the right to resell the geosynchron, as indicated above with regards to steps 472 and 476.

Numerals 498 through 506 of FIG. 24B illustrate steps that are performed by the advertisement selling programming of the central system to associate prices with fixed-price geosynchrons being offered for sale by the system. As indicated by these numerals, the programming can automatically fix the price of geosynchrons based on a plurality of factors including: auction prices for comparable geosynchrons, as indicated by 500; the percent of similar geosynchrons which it sold at various prices, as indicated by 502; the demographics, display traffic, viewer traffic, auction prices, click through on the system's websites for ads shown in similar geosynchrons, time, and other relevant attributes associated with the geosynchron, as indicated by the numeral 504; and by human set prices which have been entered into the system by its operators.

One of the ways in which the system can automatically set appropriate prices for geosynchrons, given the possibly greatly varying interest for different types of geosynchrons at different times, is to mix auctioned and fixed-price selling of geosynchrons for similar times, or for times which are time sliced with the fixed-price geosynchrons to be sold. The system could use changes in auction prices for similar geosynchrons to indicate that a change in fixed-price should be made for such geosynchrons.

Another way to automatically set prices for geosynchrons is to have the system automatically vary the price for similar geosynchrons over time so as to automatically develop a demand curve for such geosynchrons, and based upon such a demand curve to automatically pick prices which are likely to maximize profitability.

As indicated in FIG. 28, in some embodiments of the invention, the central system's advertisement selling site will have a public, or open, API, or application programmer interface, to enable third party software designed to run on clients of the site to automatically interface with its programming. There are many known methods for enabling programming running on a client computer to interact with programming running on a server computer. Any of these known methods, or any such method developed in the future, can be used to give the central systems advertising selling site an API with which third party programming running on client computers can interact.

FIG. 28 represents some of the functionality of one such API 674. It is to be understood that in other embodiments of the invention different sets of API functions could be provided.

The API of FIG. 28 includes multiple functions designed to interface to aspects of the central system's geosynchron selling programming described above with regard to FIGS. 24 through 27. For example, the selectGeosynchrons function 675, shown in FIG. 28, is designed to enable third parties client software to interface with the functionality provided to users through the geosynchron selection interface 582, described above with regard to FIG. twenty-six. Although not shown in FIG. 28, the API preferably also includes the capability for interfacing with the functionality of the geosynchron display interface 508, shown in FIG. 25, as well as the purchase optimization interface 652, shown in FIG. 27.

The bidForGeosynchron function 676 of FIG. 28 enables a user to place a bid for a given geosynchron. The showCurrent GeosynchronBid function 677 enables a third party program to find the current value of the highest bid for a given geosynchron. The uploadad function 678 enables an authorized user to upload an advertisement message for storage in the display message storage area 130 of the central system, which is shown in FIG. 18. The pickAdForGeosynchron function 679 enables an advertiser, who has a geosynchron ownership ID indicating he has the right to determine the one or more messages to be displayed during a given geosynchron, to associate an ad ID, which has been returned by a previous performance of an uploadAd function 678, with that geosynchron. The getGeonForCensusBlock function 680, the getGeonForCoordinates function 631, and the getGeonForAddress function 682, respectively, return the identification of a Geon corresponding to a given census block, to a given set of coordinates, and to a given address. As stated above, a geon corresponds to one or more geosynchron's location, independently of time or other conditions. The getGeosynchronForGeon function 683 returns the geosynchronID of the geosynchron associated with a given geon at a given time. The getInfoOnGeosynchron function 684 returns a set of information on a given geosynchron defined by the info form field.

The getInfoOnGeon function 685 is equivalent to the function 684 except that it relates to a geon rather than to a geosynchron. The getAccountInfo function 686 enables an advertiser to get information about their current account in one or more form specified by the info form field. The resellGeosynchron function 687 enables a user to place a geosynchron for which it has the geosynchron ownership ID up for resale within the system. The getGeosynchronDisplayInfo function 688 enables an authorized advertiser who had ownership of a geosynchrons at the time it was displayed to obtain information about that display. This information can include, among other items: the length of time the advertiser's messages were shown during the geosynchrons; which of one or more possible messages were actually shown; the time durations during which each was shown; video shot by the display unit's camera during the display; and/or demographic information or statistics which have been automatically extracted from such video by visual recognition techniques.

As indicated in FIG. 59, in some embodiments of the invention, the central system has a public, or open, API, or application programmer interface, to enable third party software designed to run on display units that operate under the control of the central system.

Having such a publicly available programmers interface could be used by operators of the central system to increase the availability and cost competitiveness of display units capable of showing its messages. For example, it is possible that the owners of the central system would not own all, or any, of the message showing system's display units, but instead would share a portion of earnings generated by such display units with their operators, as is discussed below with regard to FIG. 63. In such a case having an openly defined interface between the central system and display units would increase the likelihood that a market place with multiple vendors would develop to provide display units.

FIG. 59 is a highly schematic partial representation of one such possible interface 1220 is shown. It includes two classes of messages, the messages 1222 which define communication from the central system to a display unit, and the messages 1230 which define communication from the display unit to the central system.

The message definition 1124 defines a message from the central system for telling a display unit the IDs of message to display, similar to the display-selection message shown in FIG. 10. The message definition 1226 is a caching message for instructing a mobile unit to cache the content for a specified set of messages. The locator signal period message 1128, defines a message in which the central system tells a display unit how often it is send locator signals of the type described above in FIG. 12.

Among the definition of messages to be sent by a display unit to the central system are locator signal messages of the type shown in FIG. 12.

FIG. 29 displays programming 694 which the central system's Internet site can use with regard to the selling of personal messages, such as birthday, anniversary, graduation, wedding, death, and or birth announcements or messages or pronouncements of love. In some embodiments of the invention, there need not be a distinction between such personal messages and advertisements associated with business concerns. But in some embodiments it might be desirable to have special software dedicated to special types of ads, including such personal messages, classified ads, or the traditional personal ads associated with those looking for people to date or marry.

In the personal message selling programming of FIG. 29, if a person selects to purchase a personal message, step 695 causes steps 696 through 703 to be performed.

Step 696 provides an interface to users enabling them to either upload the message desired to be displayed, or to select to compose and/or edit a personal message. If the user selects to compose and/or edit a personal message, then an interface will be provided which enables the person to produce a greeting in a manner somewhat similar to that provided by current Internet greeting card sites such as that operated by BlueMountain.com. In many embodiments the interface will either include software to decrease the likelihood of messages that contain obscenities or which would otherwise be offensive, or provides mechanisms for one or more humans to review such messages before they are shown, so as to ensure that they are not offensive.

Step 697 provides an interface to allow users to see information associated with various personal announcement geosynchrons, such as the price of such geosynchrons, their demographics, and their audience. This interface can include many of the features provided for the purchase of commercial advertisements described above.

Step 698 provides an interface allowing users to see the location and destination, if available, of mobile and fixed display units near one or more given locations which have personal announcement geosynchron availabilities. This is useful for people who want to show a personal message near a fixed display at any point in the future, and is likely to be useful to people who want to show a personal message via mobile displays in the near future.

Step 699 provides an interface allowing a user to select the one or more geosynchrons in which his or her personal message is to be displayed.

As indicated by numeral 700, the user can select to have the message displayed at a selected fixed time, location, and duration. If the location of the geosynchrons is that of a fixed display, the message will be shown on that display at exactly the selected time and duration. If the geosynchron is one for mobile units, the message will be displayed by one or more mobile units that travels through that geosynchron's location during the selected time duration.

As indicated by numeral 701, the user can select that the message be displayed automatically upon proximity to a given wireless device, provided the wireless device is of a variety that can be used to automatically indicate its own location to the system. For example, this would enable a person to send a personal message to a person who normally carries such a portable device with them when the person is in close proximity to one or more display units. In some embodiments, the system can be programmed by the person ordering the public display of such personal message to automatically have a private message sent to the recipient of the message, such as to his or her wireless phone or PDA, to notify him or her to look at the public message, and/or to provide other information in association with the message, such as voice information synchronized with the visual display.

As indicated by the numeral 702, the user can select to have the personal message triggered at an exact time and location indicated by a user command, such as by a message sent from the Internet, from a phone, or from a wireless device such as an i-phone or a PDA. For example, this will enable a person who is eating in an outside restaurant with a date to indicate the time at which she or he wishes a fixed or mobile unit in a desirable location to display her or his personal message to her or his date.

As indicated by numeral 703, the programming of FIG. 29 also provides an interface for billing the user for a personal message, such as by charging the cost of the message to a credit card.

FIG. 30 represents programming 705 in the central system to enable it to respond to people who have seen messages shown on its display units. As indicated by step 706, and the steps below it, the software includes programming to enable it to respond differently to different types of ad response messages. Such ad response messages can be sent by multiple types of devices, including, for example, wireless data devices, wireless telephones, landline phones, Internet devices, or local communication devices of the type discussed above with regard to the local communication devices 382, shown in FIGS. 20 through 22.

If the central system receives an ad response message specifying the time and location of an advertisement the person sending the ad response message is interested in, step 718 will cause steps 719 and 720 to be performed. Step 719 records the time and location of the message being responded to. Then, step 720 sends the client device which sent the message the identification of, and an interface enabling the user to select one of, a plurality of messages shown near the location and time indicated, as well as a standard ad response interface. The standard ad response interface enables user to send another ad response message specifying a different time and place associated with the display message he or she is interested in responding to, as well as links to other aspects of the central system's network site. If there has only been one message shown near the time and place specified in the ad response message received, the system will respond accordingly.

In many embodiments of the invention, the time and location associated with such an ad response can be determined automatically without the need for the individual sending such a message to enter such information. For example, if users of certain types of wireless devices transmit messages to the central system when they see the display of a message in which they are interested, the central system will automatically be able to determine the approximate time of the advertisement in which they are interested by the time of the receipt of the message and the approximate location of the message by the automatic location sensing features which are provided by certain wireless networks. This makes it easy for users to respond to any display message they see merely by contacting one address, whether it be a phone number, a web address, or other network address.

If a message received from a client system is an ad selection message generated when a user selects one of the plurality of display messages sent back to him by step 720, step 721 causes steps 722 through 724 to be performed. Step 722 records the user's selection of the desired message. This information is used not only for developing statistics about user responses, but also for the purpose of billing merchants for advertisements that have been responded to. Then step 762 responds to the selection of a given message by transmitting to the client device that has sent the ad selection message the selected message's associated user response.

As indicated by numerals 764 through 780, this response can include additional information about the selected message; an instant messaging message which can create a chat box for communication between the user and the central system or the advertiser of the selected message; an electronic coupon which entitles the user to free products or services or discounts on such products or services in association with the message; a map to the advertiser's store (or to the advertiser's nearest store in some cases); a direct connection or a link to the advertiser's web site; a phone connection to the advertiser; audio associated with the selected message; an interface to enable the user to select from any of the above options; and links to other aspects of the central system's Internet site.

As indicated by steps 725 and 726, if the central system receives a coupon redemption message from a merchant, information such as the identity of the merchant, the coupon ID, and the time will be recorded for bookkeeping and statistical analysis purposes. In some embodiments of the invention, merchants will be billed for the redemption of any coupons distributed by the system.

It is not necessary in all embodiments that coupon messages be reported to the central system in order for users to receive the savings associated with them. But many advertisers desire to pay for advertisements based on their effectiveness, and a user's conversion of an electronic coupon would provide an effective means for showing the effectiveness of the system's advertisements. In some embodiments of the invention the central system will actually credit money to a user's credit card account when a coupon redemption message is received from a merchant. This can be done to decrease the chance that merchants will fail to report the redeeming of coupons.

If the central system receives a "shown me" request, step 746 causes steps 748 and 750 to be performed. Step 748 tests to see if the location of the requester can be identified with sufficient accuracy, such as through the location capability which is built into some wireless systems, and, if so, whether or not the display system's message schedule allows the display of a "show me" image. If so, step 750 causes the local display unit's camera 380 or 380A, of the type shown in FIGS. 20 through 22, to take a picture of the location associated with the source of the request and to display it on one or more of its display screens.

If the system has available gesture recognition software, it can be programmed to have its cameras point toward and zoom in on individuals in the identified location who are waving at the display or making some other gesture or behavior toward the display which indicates that they are the person who has generated the "show me" request.

The purpose of this "show me" feature is to encourage people to look at and interact with the systems display units. In some embodiments of the invention, if the system knows the identity of the owner of the device sending the "show me" request, it can label the image with that name, such as by showing an image of the requesting person with text such as "Hi, John Smith".

In many embodiments of the invention, the display control programming 360, shown in FIG. 18, controls which messages are to be shown by a given mobile unit based on more than just the location and time. The other factors which can be taken into account in determining which messages should be displayed can include the identity of, the number of, and or the closeness of wireless units whose location and identity can be automatically detected by a wireless network; speed or other operating characteristics of the mobile unit upon which the display is to be made; weather conditions; the number of people in the audience; the occurrence of certain events near the location of the display, such as and accident, fire, traffic jam, sporting event, entertainment event, etc.

FIG. 31 illustrates a portion of the central system's locator signal response programming in one embodiment of the invention which is similar to the programming described above with regard to FIG. 16, except that it has been modified to take into account the presence of wireless units near the location of a display unit in determining which messages should be shown on that unit. All of the portions of the programming 280A are identical to the corresponding portions of the programming 280 shown in FIG. 16, except for the portions that are shown in FIG. 31. In FIG. 31 the programming includes an additional step 790, which obtains information from a wireless network about the identity, number, and/or closeness of wireless units near the location of a given mobile unit to which the central system is responding. In some embodiments of the invention, the step 790 will only be taken if the schedule currently allows for messages at the current location of the mobile unit that depend on the nearby presence of wireless devices.

Then, step 292A tests whether or not the mobile unit is in a geon, or geographic zone, for which a different display message should be shown than those which the locator signal indicates that the mobile unit is currently displaying, or if the identity, number, and or closeness of wireless units near the mobile unit indicates that a different message should be shown. If this is the case, then step 294A selects the display message to be shown by the mobile unit based on the sound, current time, and identity, number, and closeness of wireless units identified in the area. It does this by referring to a message schedule 144A of the type shown in FIG. 18. This message schedule indicates which messages are to be shown at which geon's at which time under different conditions relating to the identity, number, and or closeness of nearby wireless units.

The programming of FIG. 31 will enable a display unit to display messages that are addressed to one or more particular individuals whose wireless units are detected near it. For example, such messages could include the name of such an individual or even perhaps a picture of him or her. Also, the subject matter of messages can be altered to reflect the identity of one or more people whose wireless devices have been detected near the given display unit. Furthermore, the visual characteristics of the displayed message can be altered based on the distance of such people from the display unit. Thus, if the wireless devices detected are located far from the display a message with large images and letters could be used, whereas if they are close to the display a message containing smaller image features and text could be shown.

FIG. 32 is similar to FIG. 31 except that in it the central system's locator signal response programming 280B takes into account information about the speed of the mobile unit in step 792 and uses that information in steps 792B and 794B in selecting which display messages are to be shown on the mobile unit. In some embodiments of the invention, information about the relative difference between the speed of a given display unit, whether be fixed or mobile, and people in its potential audience could be used instead of just the speed of the display itself. For example, the unit or fixed display might alter the messages it is displaying based on the speed of traffic going by it. Such relative speed can be determined by multiple methods, such as by use of a display unit's cameras, or by determining the speed of wireless units that are traveling past the display unit inside passing vehicles.

In other embodiments of the invention which operate more like the mobile display system described in the Cohen patent, in which decisions about which messages are shown in which geographic zones at which times are made by computers on mobile units themselves, other factors such as the identity, number, and or closeness of wireless units near a mobile unit, or the speed or other operating conditions of a mobile unit can be used by such a mobile unit itself in deciding which messages should be displayed at what times. In many such embodiments of the invention, the central system would normally send down multiple messages for a given geosynchron and the mobile unit itself would decide which of these various messages were to be display at a given time and place.

FIG. 33 illustrates some of the programming 794 which can be used by the controller of a mobile unit that contains one or more cameras 380 of the type shown in FIGS. 20 and 21.

Figure 60:
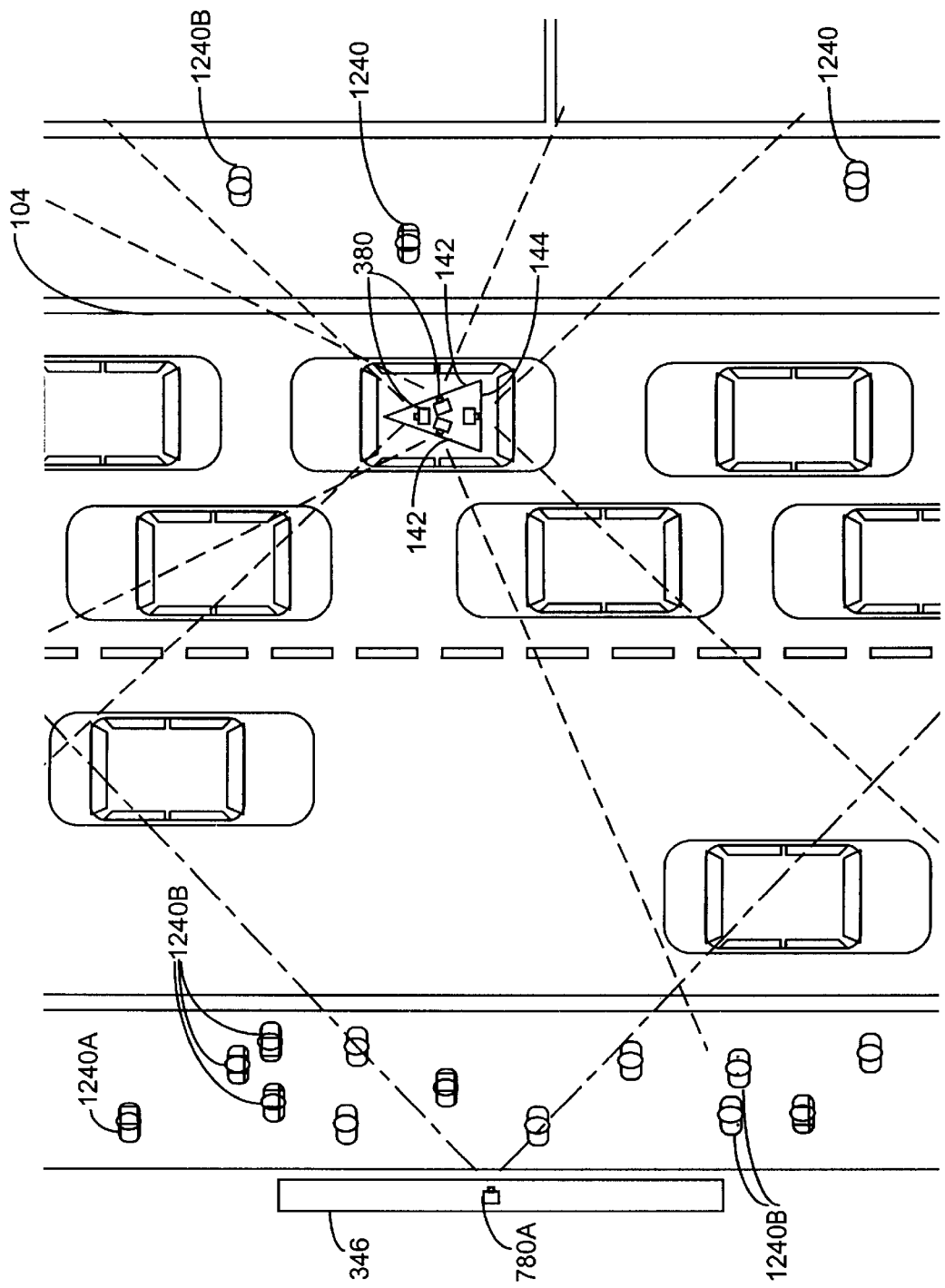
FIG. 60 illustrates how one or more cameras can be associated with both mobile and fixed display units for purposes of deriving images which can be used to collect information about traffic, weather, and the potential audience for a display unit's messages.

FIG. 60 shown how the cameras 380 mounted on mobile display units 104 and a camera mounted on a fixed display unit 346 can be used to derive image information. In the embodiment shown in FIG. 60 the mobile display unit has a set to box similar to that shown in FIGS. 3–6, having two longer side displays 142 and one shorter back display 144. It has a camera 380 positioned to see the potential audience for each such display, and a front pointing camera as well to get a better view of on-coming traffic and weather in the direction in which the vehicle is traveling. The fixed display unit has a camera 380A that is positioned to see people how can see its display, as well as to monitor traffic and see the weather.

This programming includes a step 796 that uploads images from the camera to the central system. In many embodiments only selected images will be uploaded and they will be compressed before being uploaded to reduce communication bandwidth requirements. In some embodiments of the invention some or all of this uploading will be performed when a mobile unit is parked for the night through means of a landline connection, such as a cable modem, DSL, or other wired data connection to the central system. Most current wireless transmission standards still provide very low bandwidth. But, it is technically feasible to build high bandwidth wireless systems today, and within several years it is expected that widely available wireless networks will provide a sufficiently high bandwidth to enable mobile units to upload real-time still and video images to the central system.

Step 398 of FIG. 33 uses comparison with one or more portions of the 3-D metropolitan image created by the system to help the computers on the mobile unit more accurately recognize what parts of the image its cameras are capturing correspond to cars and people, which, of course, are not normally part of the permanent 3-D model. This helps a system perform audience and traffic counts since it makes it easier to determine which parts of an image correspond to people, to cars, and to the relatively constant aspects of a given street location. The comparison of video being captured by the unit's camera with the system's video database also reduces the amount of information that needs to be uploaded, since in many instances much of the information being imaged is already contained in the system's visual database. With current technology, it would be expensive to store a detailed visual database of an entire city within a mobile unit, but within five to ten years all or a significant part of such a database should fit within one hard drive. Also, within several years standard wireless network bandwidth will be high enough to enable the central system to download to a mobile unit the portions of a city's visual database as needed for such comparisons. At the present, it would be possible to store a portion of a city's visual database on a mobile unit for purposes of such comparison.

As indicated by steps 799 and 800 in FIG. 33, if the unit receives a "shown me" request, either directly from a local communication device, or indirectly through the central system, the mobile unit will cause its camera to take a picture of the location associated with the device generating a request, as described above with regard to steps 746 through 750 of FIG. 30.

As indicated by steps 800 and 804, if the mobile unit receives a message from the central system instructing it to take a picture of a given location from a given angle and at a given zoom setting, it will do so. Such messages might be generated by the central system, if it is been requested by users of the system to obtain pictures of specific locations in a metropolitan area, or if the central system desires particular information to improve its image database of the metropolitan area.

As indicated by steps 806 and 808, if certain specific conditions are met, the mobile unit will show images recorded by it's one or more cameras on its display screen. Normally these will be live images, but they can also be previously recorded images. One of the conditions, which can give rise to the display of such images, is that of a "show me" request described above with regard to steps 799 and 800. Camera images might also be shown on the units display to draw attention to the display or as part of contests that provide incentives to persons who wave or display designated signs toward a mobile or fixed unit with a camera. Rewards might be as small as a zoomed close-up of the person waving, and or might be as large as a significant prize.

As indicated by step 810, in some embodiments of the invention the computer on a mobile unit might compare the image being derived from its one or more cameras against 3-D projections from the systems 3-D model of the metropolitan area to help the mobile unit determined its exact position. Such a system can be used in conjunction with, or independently of, other locating systems, such as the GPS system 146, shown in FIGS. 20 and 21. When operating in a location for which the central system already has a good 3-D image model, this will enable the system to determine very accurately the mobile unit's location. It also has the advantage of being able to operate in locations where GPS signals are difficult to receive, such as in tunnels or in the shadows of some buildings.

Step 1200 includes the use of vision recognition software or hardware to extract image information from a vehicle's camera images. As indicated by numeral 1202 this image information can include estimates of audience information, such as information about number, type, distance, relative speed, and activity of any people in an area near each display, as well as the make, model, and year and relative speed of any vehicles in such views. In FIG. 60 the some of the people 1240 which are represented symbolically in that figure have cross-hatching (numbered 1240A) and some have dots (numbered 1240B) to represent how the cameras associated with displays can have views of different types of people. Current vision recognition is good enough to recognize people in images, to recognize expressions on faces, to recognize size of people recognized, their distance from camera (particularly if multiple cameras or other range finding equipment is provided) to estimate skin color, and to perform many other tasks which are valuable in classifying potential audiences for displays.

As indicated by numeral 1204 the image information extracted by machine can include estimates of traffic information based on the number, speed, and relative speed of vehicles. As indicated by numeral 1206 the extracted image information can include estimates of weather characteristics. Once such information has been extracted, it can be uploaded to the central system where it can be used to derive or add to demographic, traffic, and weather databases.

As indicated by numerals 1210 and 1212, if autoplacement is in use, such as the auto-placement discussed below with regard to FIGS. 65 and 66, the audience, traffic, or weather information derived from images can be used to select which display message to show as a function of customer selected criteria.

FIG. 34 represents programming 812 relating to the use of the system's cameras that is performed by the central system. It should be understood that in different embodiments of the invention a different distribution of the functionality shown in FIGS. 32 and 33 can be made between the computers of local display units, such as fixed and mobile units, and the computers of the central system,.For example, in some embodiments of the invention vision recognition can be performed at the central system, although this has the disadvantage of requiring a relatively large bandwidth for the upload of information, or the requirement of low resolution or low frequency image uploads. In some embodiments of the invention, information can be derived from uploaded images by human vision recognition rather than machine recognition.

As indicated by step 814, the central system will record images or image information uploaded from mobile and fixed display units and, preferably, records the time and location of each such recording. These recordings are used to provide historic information about traffic, weather, and audiences at given locations and times, as is described below with regard to FIG. 34's step 1216. It can also be used for preparation of the system's 3-D graphics model of the metropolitan area.

As indicated by step 816, the system uses 2-D -to-3-D software to create or update a 3-D model of the metropolitan area based on images uploaded in step 814. In many embodiments, this process removes moving objects if possible, and updates the 3-D model to take into account changes in the metropolitan scene, such as the construction of new buildings.

The cost of storing a 3-D image of large metropolitan area is currently inexpensive enough to make it practical. For example, a fairly high resolution 3-D image of the length of every street in a 40 mile by 40 mile metropolitan area having a street every 500 feet in both the north-south and east-west directions should take no more than 10 terabytes, which cost no more than several hundred thousand dollars in storage costs at year 2000 prices. The cost of hard disk storage is expected to continue to drop sharply for years to come, meaning that by approximately the year 2010 it is expected that 10 terabytes will fit on one hard drive.

In many embodiments of the invention, such a 3-D map of the city would be labeled with other information, such as the location of important buildings, bridges, tunnels, airports, train stations, subway stops, sports stadiums, street names, and street addresses. The integration of this data with such a 3-D map would create very valuable content that could be licensed or sold by the central system to third parties.

Also, such a database could draw users to the central system's own website. This could generate profit through advertising on the website itself, as well as by drawing the attention of advertisers and audiences to the system's outdoor displays.

Such a 3-D map of the city can be used to give people visual directions on how to get to given places, including drivers of the systems mobile units. It can be used to provide virtual travel through a given metropolitan area, which can be helpful to enable tourists, people who are considering moving to given metropolitan area, and those who are looking for housing, to learn about the various parts of such an area. The virtual image can also be used to record changes to the metropolitan area over time.

As indicated by step 818, the programming on the central system can use visual recognition software to estimate the number of people in the vicinity of the given display and record them as audience estimates for the geosynchrons corresponding to the locations and times at which the pictures are taken. Such information can be used to help advertisers estimate which are desirable locations to advertising given times, and can be used by the system to help determine the prices which are to be charged for various geosynchrons. In addition such statistics can be supplied to advertisers to let them see what the actual audiences were for the display of their advertisements in various geosynchrons.

As indicated by step 820, if visual recognition has not been performed by the display unit uploading image information, the central system can use visual recognition programming or hardware to estimate the number of vehicles, the speed of vehicles, and other traffic conditions at a given time and place, and record them in the central system's traffic database. Of course, visual images of the traffic themselves can also be stored in the traffic database. This database enables the drivers of the system's mobile units to find more effective routes at various times and places, and provides valuable media content, which can be sold by the central system, which can be used to attract audiences to its website, or which can be displayed on the outdoor displays of the system.

As indicated by step 822, the central system uses visual recognition software to estimate weather conditions and record conditions in a weather database that is associated with the time and location in which such images were recorded. In addition, visual images of the weather can be stored in this database. Like the information in the traffic database, the information in the weather database can be used to help drivers of the system's mobile units; can function as valuable media content which can be sold or licensed by the central system; can be used to attract audiences to its website; and/or can be displayed on its outdoor displays.

As indicated by steps 823 through 838, the programming of the central system can use visual recognition to vary the messages shown by its mobile units' displays based on different conditions determined from images derived from the systems' cameras, including: estimations of the number people who can see the display; estimations of the speed of vehicle or nearby vehicles; estimations of the age, sex, race, social class of people around the display; estimations of current weather conditions; and estimations of current lighting conditions.

As indicated by steps 838 through 842, the central system can use vision recognition techniques to detect the behavior of persons in the vicinity of one of its displays, including behaviors relative to the display, and respond accordingly to such behaviors which indicate recognition by a person of the display or attention toward it. Such behavior could include waving toward the display, pointing ones hand toward the display, pointing ones head toward the display, having one's eyes looking toward the display, or making a specified gesture which the system has informed people will cause the system to respond to them. If the system detects such behavior from a person in its images, step 842 can respond by giving such a person a reward, if they identify themselves, such as through use of a wireless device, or if the display is a fixed display by entering information on an input device associated with that display, or by later contacting the system's website and providing photographs which correspond sufficiently to the images of them taken by the display's camera. As indicated by step 842, when the system detects a person making a particular behavior toward it, such as looking at or waving at the system, the display can show a picture of that person. Also as is indicated in step 843, the system can record the person's sign of recognition toward the display for statistical purposes, such as showing advertisers the number of people who look at or respond to the system's display.

As indicated by step 844, the central system responds to input from users of the system—whether they be operators of the central system or users making such requests over the central systems' Internet site—requesting that given images be taken in given locations by instructing mobile units in such locations to take such images, including, in some embodiments, a description of the angle and zoom desired of the given location. If this is done, it will cause steps 802 and 804 of the mobile unit to respond by taking the desired image once the unit is in the desired location.

FIG. 35 illustrates the central system's programming 846 for synchronizing displays between multiple different display units. If the current location of two display units is close enough to be seen by the same people, and if other conditions, such as scheduling and location conditions, are right, then step 848 causes steps 850 through 858 to cause a synchronous display to take place. The display units involved can be multiple mobile units, one or more mobile units and one or more fixed units, or two or more fixed units.

If these conditions are met, step 850 instructs the displays which are close to each other to display a message in synchronism.

As indicated by steps 852 and 854, if the message to be displayed in synchronism is designed for simple synchronism, the central system merely instructs the involved local displays to display the message at the same time.

As indicated by steps 856 and 858, if the message is designed for ping-ponging, the system will instructs the various local displays involved to display the message in a ping-ponging manner where first one display shows part of the message and then another display of the group display another part of the message. Although not shown in FIG. 35 other types of synchronous displays can be used. For example, when two cabs belonging to the system cross each other in traffic they could send each other a "salute", such as one in which both cabs blink the central system's company logo at an increasingly rapid rate until the two cabs pass each other, at which point a synchronized climactic message can be shown advertising the central system's company and capabilities. Another form of synchronous display is, if two or more mobile units are traveling one behind the other, a synchronized message display method could be used which could have successive mobile units carry successive parts of a sequential message. Furthermore, different types or techniques of synchronous display could be combined in the display of one synchronous message.

The purpose of such a synchronized displays is to capture the attention of potential viewers toward the display system and the messages it shows. In some cases, the synchronized messages will be advertisements for the system itself. In other instances, advertisers will pay for such synchronized messages. In other embodiments of the invention, the control of synchronized messages could be controlled directly by the computers on one or more local display units themselves.

FIG. 36 illustrates programming 860 in the central system for showing location varying messages. A location-varying message is a message, such as an advertisement for a store, comprised of one or more different possible successions of images that are selected or timed by software in response to changes in location of the mobile unit showing such a message during its display.

As indicated in FIG. 36, if the central system detects that the location of a mobile unit is close enough to a specific location for the display of a location varying message, and if other conditions, such as availability for such a message in the message schedule, allow the display of such a message, steps 862 and 864 will instruct the mobile display to show a location varying message appropriate for that specific location.

FIG. 37 illustrates programming 866 in a mobile unit for displaying such a location-varying message. This program includes step 867 that respond to an instruction from the central system to display a given location varying message by causing steps 868 through 872 to be performed. Step 868 starts the display of the message. During this display a loop 867 causes steps 870 and 872 to be repeatedly performed. Step 870 continues to obtain information about the mobile unit's current location. Step 872 responds to such information about the mobile units location by varying the display of successive images in the location-varying message as a function of such changing location information.

In some embodiments of the invention, the location varying messages will be animations, such as vector-based animations created using Flash or Shockwave programming provided by Macromedia, Inc. of San Francisco, Calif., or programmable video, which vary the image displayed in response to software commands. Such location varying messages can be used, for example, to count down the distance to a particular location, such as advertiser's store. In other instances, such messages might include images which have a moving pointer which points at a given location as a mobile unit drives past it. Such location-varying message can be quite effective at drawing attention toward a particular location, such as an advertiser's store. If a store location has a fixed external display, it would be possible for a mobile unit passing that display and the fixed display to both show a location varying messages which varies as a function of the motion of the mobile unit, using one of the forms of synchronism described above with regard to FIG. 35.

In some embodiments of the invention, the mobile unit makes the decision as to whether or not to display a location-varying message, rather than the central system. This would be particularly true of embodiments of the invention, such as those described in the Cohen patent, in which mobile units determine which messages they are to show at which time based on a message schedule and geographic zone map which they carry with them.

FIGS. 38, 39A, and 39B illustrate additional programming that can be used by a mobile unit and a central system for a system in which mobile units function as taxicabs. When this specification refers to taxis or cabs, it is also meant to include other vehicles that are hired to take persons to selected destinations such as limousines, or hired vans or buses.

FIG. 38 illustrates some of the specific additional programming 874 which can be used by cab mobile units.

If the driver inputs a new destination for the vehicle into a driver input of the type 392 shown in FIG. 21, step 875 causes steps 876 and 877 to be performed. Step 876 indicates the new destination on the driver's display 386 shown in FIG. 21 (and in some embodiments, on an external display of the taxi cab unit). Step 877 transmits the new destination to the central system.

If the driver enters a new status into the driver input 392 shown in FIG. 21, such as whether the vehicle is off-duty, traveling to pick up a fare, or traveling with a fare to the fare's desired destination, then step 878 will cause steps 879 through 890 to be performed. Step 879 will indicate the change in status on the driver's displayed 386 shown in FIG. 21 (and, in many embodiments, on some sort of external display associated with a mobile unit). Then, step 890 will transmit the status change to the central system.

If a fare is being earned by the cab, step 891 will cause step 892 to display such fare information on the driver's (and, in some embodiments, the passenger's) display, and step 893 will transmit that fare information to the central system.

If the driver signals a given emergency type by providing input into the driver input 392 shown in FIG. 21, depending upon the type of emergency, steps 896 through 902 will send a message to the central system and police station indicating the mobile unit's vehicle ID, the driver's name, and the type of emergency; turn on one or more audio listening devices, such as the driver and passenger microphones 390 and 406 shown in FIG. 21, and record and/or broadcast such information to the central station or police station. This step can also record and/or broadcast images from the mobile unit's cameras. Such recording and/or broadcasting is performed to help record what is happening in the emergency, and if somebody is at criminal fault, to help record who that person might be. Such recording and/or broadcasting can also be used to discourage further criminal behavior by causing both the driver and passenger displays and speakers to sound alarm and generate messages stating that video and audio record is taking place. In some types of emergency's step 902 will respond by having the external display on a mobile unit show a message appropriate for the emergency type. For example, if the emergency type indicates that the mobile unit's driver is being robbed or physically threatening, the external displays could flash, and if the cab has an external speaker it speaker can sound and alarm which would tend to draw attention to the cab and scare any potential assailant away.

FIGS. 39A and 39B indicate additional programming 904 that can be used by the central system when units are used as taxis. As indicated in steps 906 through 912, each time the central system receives information on the location of a cab, such as from a locator signal of the type described above with regard to FIGS. 9, 12, 13, and 16, the system will record in a cab database this location along with the cab's ID and the current time. Then it will update the representation of the cab's location in a cab location display that is available both to those who might wish to hire a cab over the Internet, and to those who operate the cab system.

If the central system receives information on a new destination for a taxi in response to steps 875 through 888 of FIG. 38, then step 912 will cause steps 914 through 918 to be performed. Step 914 records the new destination' into the cab database, along with the ID of the cab that sent the message and the current time. Step 916 calculates one or more of the best routes to the destination, considering factors such as the cab's current location, the time, current traffic information, the history of traffic at similar times in the past, advertising demand at various locations, and the cost and time associated with various routes. Then, in step 918, the central system transmits one or more of such routes, with the calculated time cost and earnings, to the cab for display to the driver on the driver display 386.

As indicated by steps 920 and 921, if the central system receives information on a change in a cab's status, as a result of the operation of steps 878 through 890 of FIG. 38, it will record that information into the cab database with the cab's ID and the current time. Then it will update the representation of the cab's status in the cab location display that is available both to those who might wish to hire a cab over the Internet and to those who operate the cab system.

As indicated by steps 922 and 923, if the central system receives information about a cab fare that is being earned or that has been paid, this information is recorded in association with the ID of the cab and the current time in the cab database.

As indicated by numerals 924 through 932 in FIG. 39, the central system aggregates from information recorded in its cab database information on such topics as the productivity of individual drivers, the productivity of individual locations, traffic flows at given locations and times, and current availability of cabs.

As is indicated by steps 934 through 938, the central system calculates from information in its cab database information about the best place for a cab to wait for passengers based on the number of pickups and the destination of those pickups at various locations at various times in the past and also based on information recently entered into the cab database by various cabs.

As indicated by numerals 940 through 944, if a driver in a cab uses the system to request information on where to wait for pickups, the system calculates information on the best place for the cab to wait to pick up a passenger given the cab's current location and given information calculated in steps 934 in through 938, and then sends that information to the cab, for display on the cab's driver display 386 or more for announcement on the driver speaker 388, both of which are shown in FIG. 21.

If the central system receives a request to see the location of cabs in a given area, such as from potential fares accessing the central system over the Internet, step 946 and 948 will send out an image showing the current locations of cabs in that vicinity from information in the cab database. This information may be sent out either in graphical, mapped, or list form.

If the central system receives a request, such as over the Internet from a potential fare, for an estimate of how long it will take for a cab to reach a given location to make a pickup, steps 950 through 954 will calculates an estimate of that time based on the location of available cabs or of cab which will soon be available, the location of the requested pick up, current traffic and weather information, and historical traffic information for the locations involved. In some embodiments, the estimate will include a range of probable times with the probabilities of different values in the range being set forth.

As indicated by steps 956 through 960, if the system receives a request, such as over the Internet, for an estimate for how long it will take for a cab, once it picks up a fare to travel from one location to another at a given time, the system automatically calculates how long such a trip is likely to take given the current traffic and weather information and given historical traffic information for the locations involved, and then sends this information to the requester. As with the request for information about how long it will be for cab to pick a fare up, the estimate could include a range of estimated travel times with a probability associated with each such time.

If the system receives a request, such as from over the Internet, to see historical information on how long it takes to go from one location to another by cab, step 962 and 964 will send out a page in response to that request enabling a user to obtain historical information from the cab database about the length of time for such trips in the past at various selected times and weather conditions.

As shown in FIG. 39B, if the central system receives a request to pick up a fare at a first location for a trip to a second location as soon as possible, step 966 will cause step 968 through 984 to be performed. Step 968 determines which, if any, cabs are free or are likely to be free soon and their locations from the cab database. Then, a step 970 calculates the likely time for the closest of such cabs to reach the first location. Then, step 972 calculates the likely time of a trip from the first location to the second location, taking into account current traffic and weather conditions and past historical traffic information. Then, step 974 sends the user information on such cab time calculations and asks the user if she or he wants to commit to booking such a cab trip.

If the user selects to do so, step 976 causes steps 978 through 984 to be performed. Step 978 informs the driver of the expected fare and confirms that he or she will take it. If the driver confirms that he will take the fare, step 980 will cause steps numeral 982 and 984 to be performed. Step 982 sends a message to the cab to change its status display to show that it is currently booked to pick up a passenger and records that change of status in the central system's cab database as well. Then the system sends the passenger a message that the cab has been booked with a booking URL that allows the passenger to track the status of the cab on the central systems Internet web site. In some embodiments of the invention the passenger's credit card account could be billed at this time.

As indicated by steps 986 through 922, if the central system receives a request to find the status of a booked cab, such as one using the URL mentioned above with regard to step 984, the central system will query to the cab database to find a location of its book cab, with an estimate of the time for the cab to get from its current location to the pick up location, and then it will send the requester information containing such an estimate, such as, for example, a map showing the pick up location, the location and speed of the booked cab, and the estimated time of arrival. In some embodiments of the invention, the system might actually query the driver of the cab to see if he agrees with the estimate of his arrival time before any such message is automatically sent to the person requesting the cab status.

FIG. 40 illustrates certain functionality, 994, of the overall system, including both mobile units and the central system, relating to the recording and use of traffic information that is found in some embodiments of the invention.

As indicated by numeral 996, this functionality includes having multiple mobile units, each with one or more external displays, that report on their own location at successive points in times. Other information besides the mobile unit's locations can also be reported, including information obtained from cameras, speed sensors, or other electronic sensing equipment located on each mobile unit.

Once this information has been uploaded to the central system, such as over a wireless network, step 998 causes the central system to record such information relating to vehicle position, time, and speed. If the uploaded information does not explicitly include the vehicle's speed, that information can be calculated overtime by measuring the amount of distance between the locations at which a given vehicle make successive reports of its location. As indicated by the numeral 1000, the central system repeatedly calculates the speed of traffic flows at multiple locations from the information it has recorded in step 998 and from other information which is available to it, such as from other sources of traffic information.

As is indicated by step 1002, the central system transmits the traffic information it calculates in step 1000 to mobile units. Then, in step 1003, the mobile units display this downloaded information about such traffic flows at multiple locations on their own external displays. It should be understood that the steps of FIG. 40 could be repeated continuously in an ongoing manner. Such traffic information can provide an interesting and valuable source of programming content for use by a mobile message display system to help draw visual attention toward its outdoor displays.

FIG. 41 is similar to FIG. 40, except that it relates to a system of mobile units which obtain, and then upload to a central system information they sense about the weather in their own locale, and then receive information back from the central system about weather over a larger geographic area, which they then displayed on their external displays.

Figure 42:
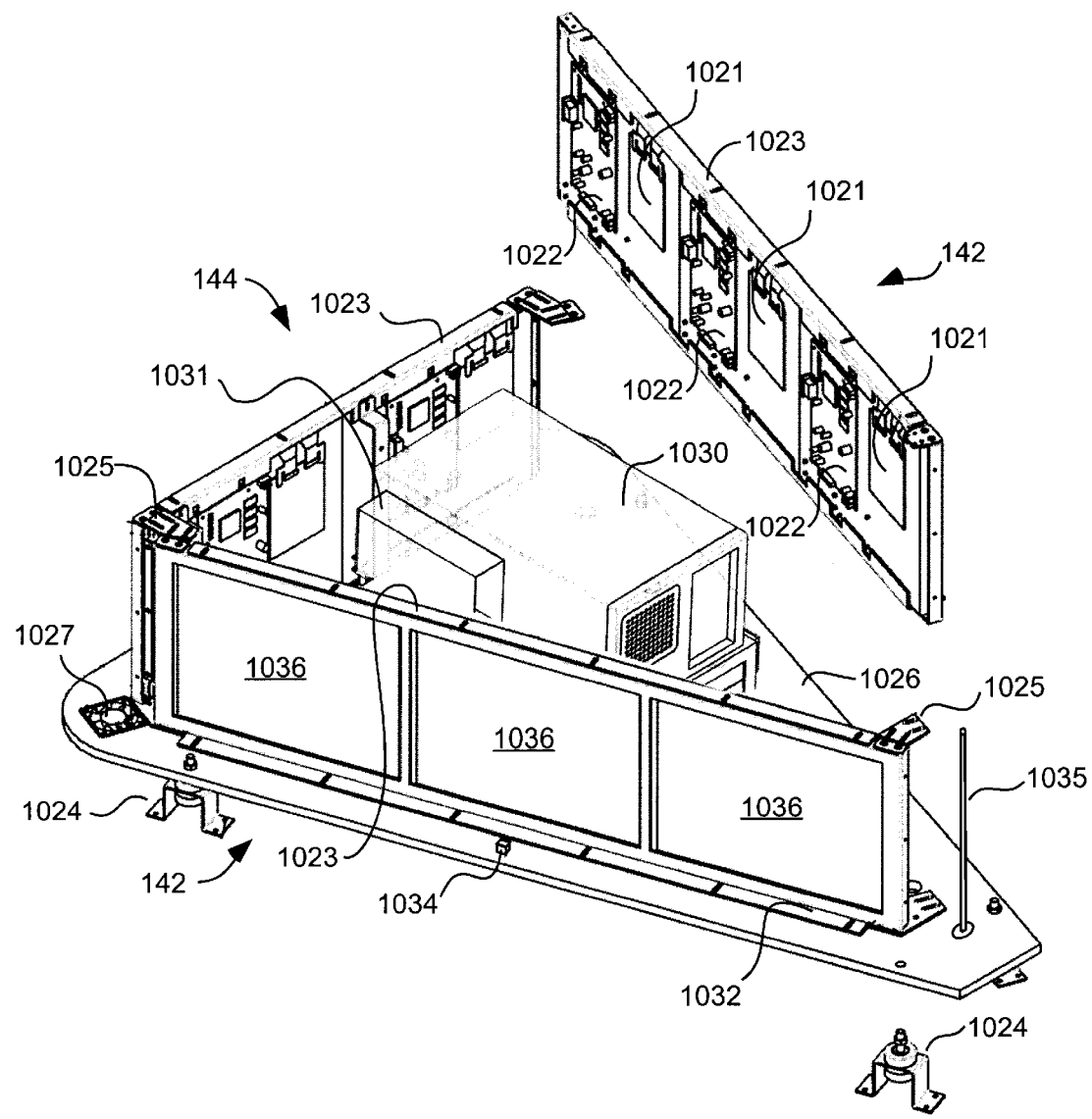
FIGS. 42 and 43 are diagrams of components used in a car-top box to provide some of the functionality necessary to convert a motor vehicle into a mobile unit for use with many embodiments of the invention.
Figure 43:
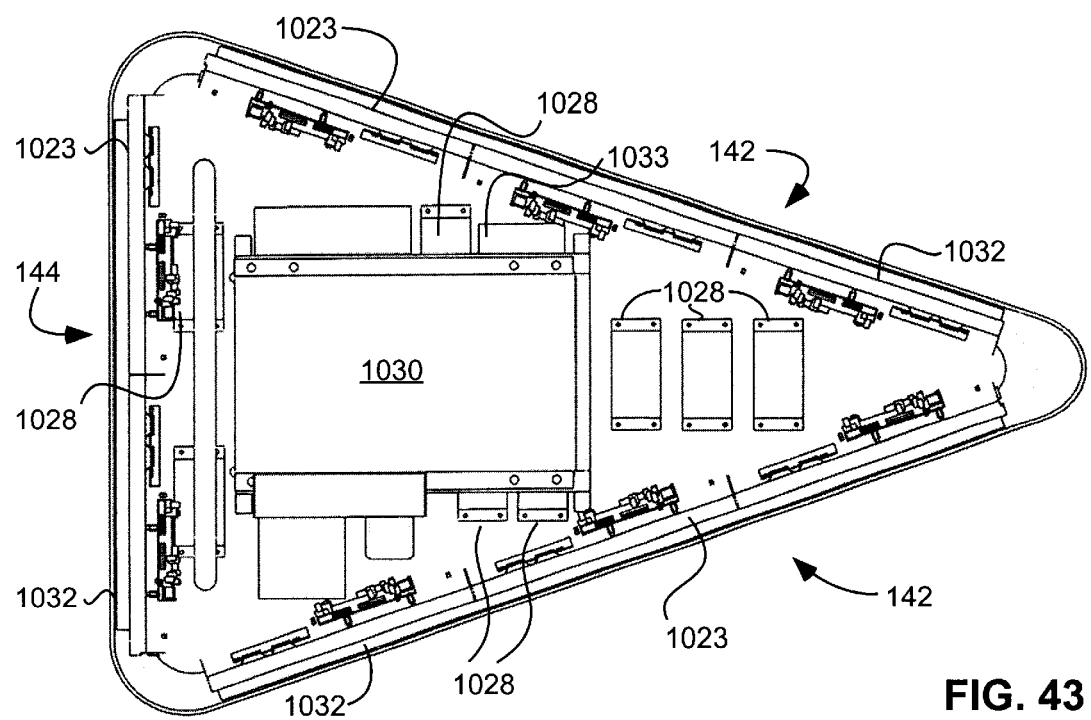

FIGS. 42 and 43 provide views of one embodiment of a car-top, or rooftop, box 174 that can be used to provide many of the components necessary to convert a standard motor vehicle into a mobile unit for use in a mobile messaging system of the type described above. This car-top box, when covered by its plastic external shell, which is not shown in FIGS. 42 and 43, has the appearance shown in FIGS. 3 through 6.

The car-top box 174 includes a plurality of components mounted upon a base 1026, which in turn is mounted on the roof of a motor vehicle through isolation mounts 1024. These isolation mounts are important because they decrease the amount of vibration that the rooftop box receives during the travels of the vehicle to which the rooftop boxes attached, and, therefore, they significantly decrease vibration damage to the components of the unit 174.

Figure 6:
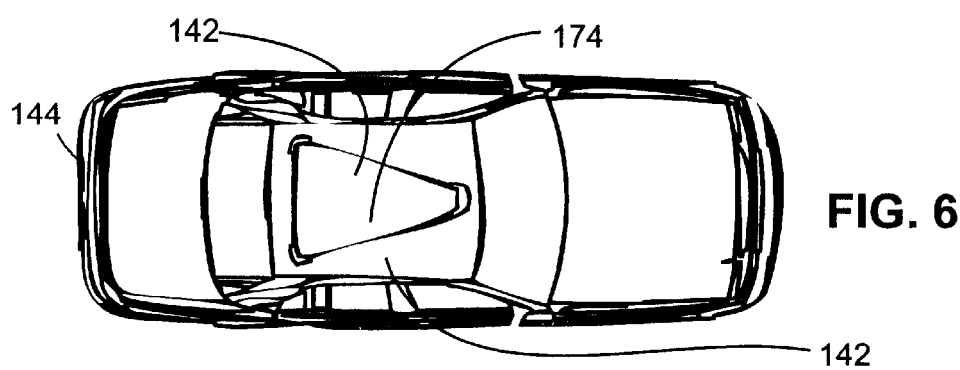

The rooftop box includes three separate displays, including two displays 142 shown in FIG. 6 on its two long triangular sides and one shorter display 144 on its shorter, back side. The two side displays 142 are each ganged displays made of three individual LCD display panels 1036, shown in FIG. 42, grouped together to operate as one display. The back display 144 is a ganged display made from two individual LCD display panels 1036 grouped together to operate as one display. The multiple LCD display panels 1036 of each display are held in place by a frame 1023. The bottom side of each frame includes a support flange 1032 that includes holes through which bolts can be used to secure the frame and the LCD panels it supports to the base 1026 of the car-top box.

Each LCD display panel has an associated LCD driver board 1021 that drives the pixels of that display. Each such display also includes a video display board 1022 that receives as an input video signals generated by a computer video display board and provides as an output signals that drive the LCD drive board 1021. At each of the three corners of the triangle formed by the three displays 142 and 144, a corner bracket 1025 is used to connect the panels. In some embodiments of the car-top box a ventilation fan 1027 is provided to cool the electronics in the car-top box. However, is been found that such a ventilation fan is not necessary in all environments.

The car-top box is provided with an industrial grade computer 1030 that corresponds to the mobile unit controllers 140 shown in the mobile unit block diagrams of FIGS. 1, 7, 20, and 21. A wireless CDPD modem 1031 is provided which corresponds to the wireless system 152 shown in the mobile unit block diagrams. An antenna 1035 is provided for the wireless modem. A global positioning receiver 1033 is provided which corresponds to the GPS receiver 146 shown in such diagrams.

An ambient light sensor 1034 is provided for each gamged display 142 or 144 at a location on the side of the rooftop box in which that display is located. Each such light sensor is positioned so that it will be under a transparent window in the rooftop box's plastic cover, so as to enable the ambient light sensor to sense the amount of external light falling on its associated display. Information from this light sensor is used to control the amount of brightness applied to the florescent backlights that are part of the each of the display panels 1036. The system includes a backlighting inverter 1028 associated with each of its eight individual LCD display panels.

Figure 44:
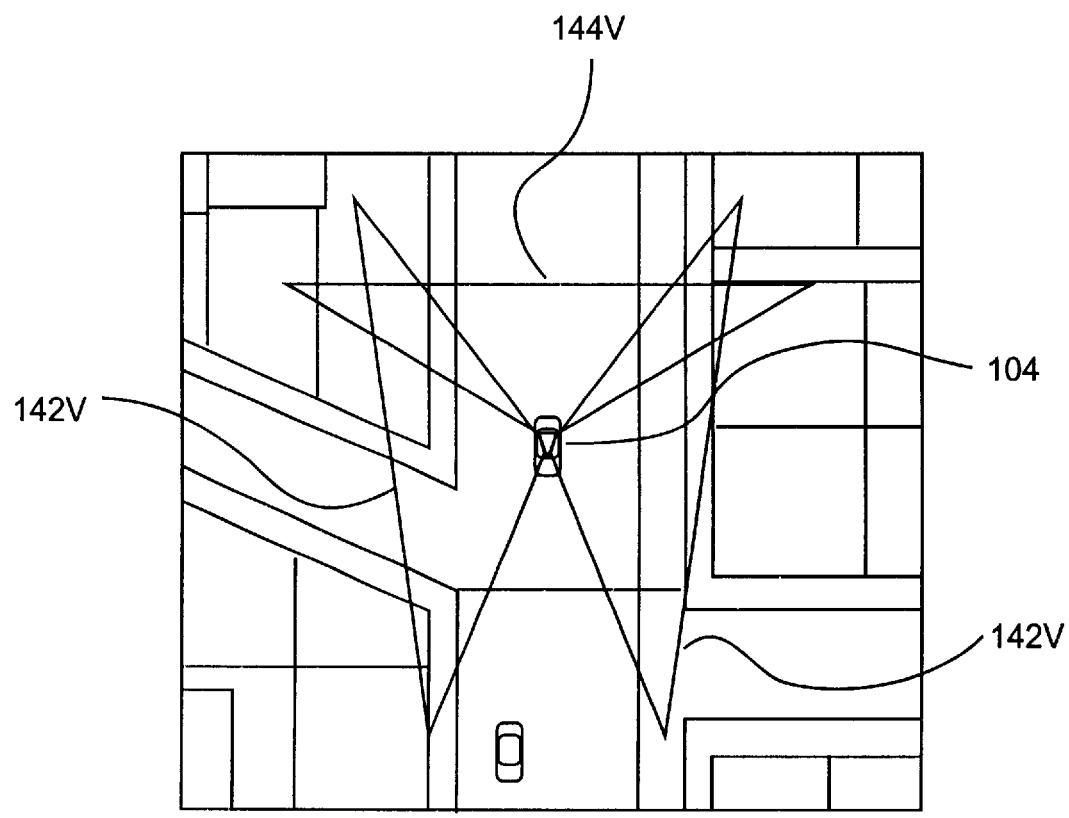
FIG. 44 is a diagram illustrating the field of view that a car-top box, such as that shown in FIGS. 42 and 43 as well as in FIGS. 3 through 6, provides.

FIG. 44 illustrates one of the advantages of a car-top box having a triangular set of displays as is shown in FIGS. 42 and 43. This advantage is the field of view such a rooftop box provides for its displays. In FIG. 44, a top view of a mobile unit 104, similar to that of FIG. 6, is shown slightly above the center of that figure, with the mobile unit's vehicle pointing in a downward direction in the figure. Emanating from the location on the roof of this mobile unit corresponding to its rooftop box 174 are three triangular shaped areas that correspond to the zones of view of each of the mobile unit's three displays 142 or 144. At the mobile unit's sides are two zones of view 142V each associated with one of the mobile unit's two side displays 142. Emanating from the rear of this vehicle is a zone of view 144V associated with its back display 144. As can be seen from FIG. 44, this combination of three displays provides views from all directions except those in front of the mobile unit, in which location the displays might prove most distracting to oncoming drivers.

In other embodiments of the invention, differently shaped triangular car-top boxes can be used to provide a similar advantage. For example, all three sides of a triangular car-top box could have similar sized displays, which would have the advantage of making it computationally easier to have all three displays show the same message when so desired.

Of course, in other embodiments of the invention, a car-top box can use a shape other than a triangular one for its displays. For example, it could just have two opposing displays having a longest dimension, which runs parallel to the length of the vehicle upon which it is mounted. In other embodiments, the car-top box could have four displays, each located along one side of a rectangular shape, so the mobile unit would have one display visible from each of its front, back, and two sides.

Figure 45:
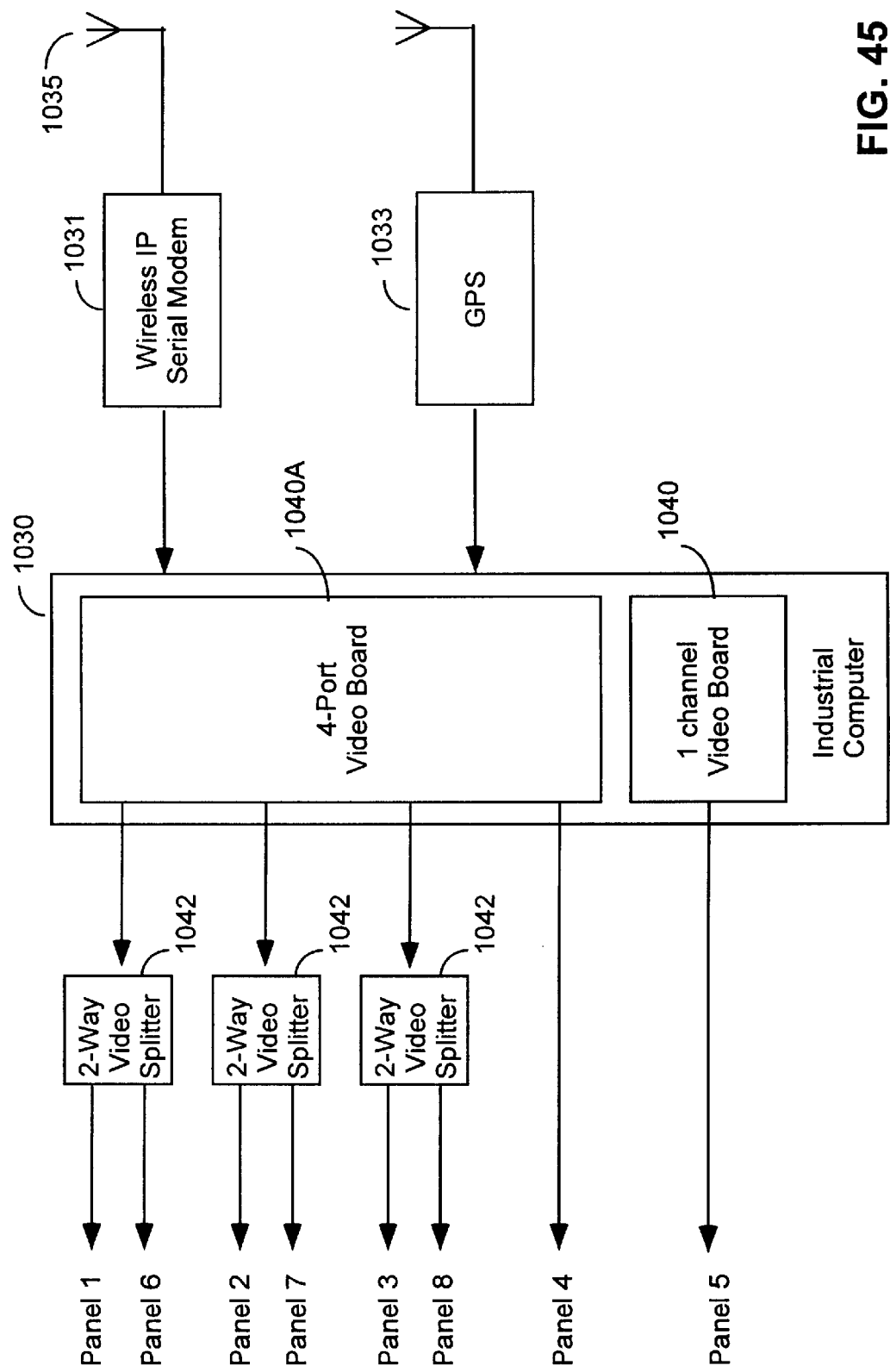
FIGS. 45 and 46 are schematic block diagrams of the circuitry of many of the components shown in FIGS. 42 and 43.
Figure 46:
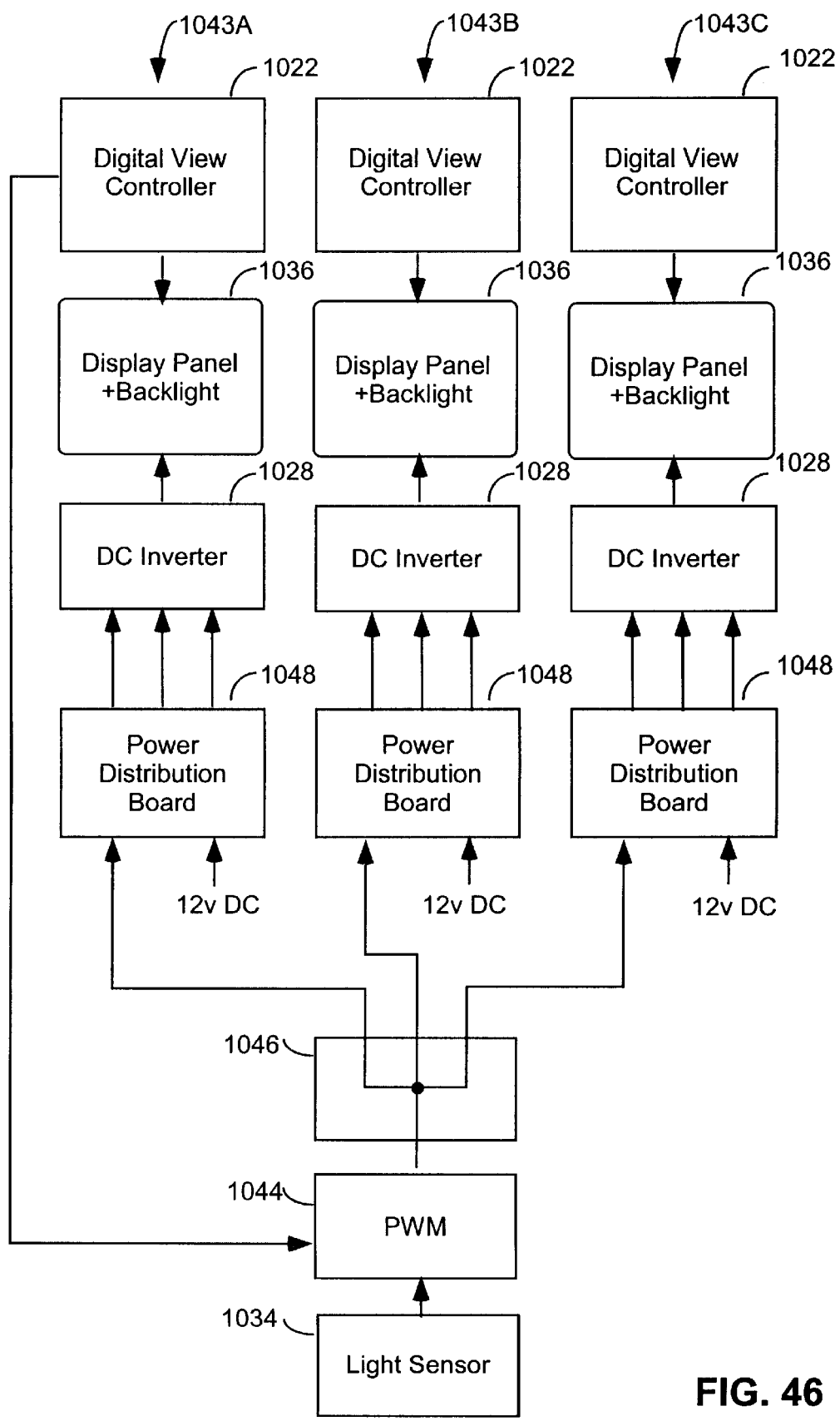

FIGS. 45 and 46 are block diagrams illustrating some of the components of the car top box shown in FIGS. 42 and 43.

FIG. 45 shows that the GPS receiver 1033 is connected to an antenna that is built into its package to receive GPS signals and is also connected through a communication port to the computer 1030. It also shows that the CDPD wireless modem 1031 is connected to the antenna 1035 to receive and transmit wireless transmissions and that this modem is connected through a communication port with the computer 1030, so as to send data it receives from the wireless network to the computer, and to transmit to the wireless network data it receives from the computer.

As shown in FIG. 45 the computer 1030 includes five video ports, three of which are used to drive three of the panels associated with each of the side displays 142, and two of which are used to drive the two displays of the rear display 144 shown in FIGS. 42 and 43. As shown in FIG. 45, the three video outputs that go to the two displays 142 go through a two-way video splitter 1042 for the purpose of splitting each such video output into two identical video signals, which are sent to corresponding LCD panels on each of the two displays 142.

FIG. 46 illustrates a block diagram of the electronics associated with each of the video displays 142. Since each of the video displays 142 includes three separate LCD display panels 1036, the block diagram in FIG. 46 includes three separate branches labeled 1043A, 1043B, and 1043C associated with each such display. In the rear display 144, which contains only two LCD display panels, only two branches corresponding to 1043A and 1043B are used.

The digital view controller, or video display board, 1022 associated with each LCD display panel 1036 receives one of the split video outputs produced by one of the splitters 142 shown in FIG. 45 from either the video 1, video 2, or video 3 lines shown in FIG. 45. As stated above each such video display board 1022 receives a video input produced by video board of the computer 1030 to represent the portion of its associated displays image which is to be shown by its associated LCD panel, and then converts that video signal into signals which are used to drive an LCD display panel 1036 through an LCD driver board 1021, which is represented as part of the Display Panel and Backlight unit 1036 in FIG. 46.

Much of the circuitry shown in FIG. 46 relates to control of the backlighting associated with each display panel. Because the car-top box is designed to be used outside in lighting conditions that can range from the darkness of a moonless night to the brightness of the midday sun, the rooftop box has a flexible and powerful system for backlighting its display panels. Each of the three ganged displays has a separate light sensor 1034 of the type shown in FIG. 42 to sense the amount of light shining on its side of the car-top box. The output of this sensor is fed to a pulse width modulation circuit 1044 that controls the power supplied to the backlighting in the displays associated with the light sensor 1034. The output of the pulse width modulator 1044 passes through a distribution circuit 1046 which splits its pulse width modulation output into three separate paths, one of which is supplied to the power distribution board 1048 associated with each LCD display panel 1036. Each power distribution board 1048 filters the 12-volt power supplied by automobile electric system, and passes the pulse width modulation signal on to the input of the DC inverter 1028. This inverter produces a 2000-volt output that has the same duty cycle as the pulse width modulation signal supplied to it. The output of this DC inverter is used to drive the florescent backlights of the display 1036 at varying levels of brightness depending on the duty cycle of the 2000 volt output of the inverters, which varies as a function of the ambient light on the side of the car-top display in which a given display panel 1036 is located.

The displays 1036 are each high-bright displays. As we use the term "high bright displays" we mean displays which can produce over 1000 NITs of illumination, where a NIT equals one candella of light per square meter of surface radiation. In the particular embodiment shown in FIG. 46 the back lights built into the LED display 1036 are actually capable of providing upto 2000 NITS but their pulse-width-modulation drive circuitry has been set to limit their output to a maximum of approximately 1500 NITs in order to save power.

In this embodiment of the invention, the illumination generated for each display is controlled as a function of the amount of light falling on its associated light sensor, independently of the amount of light generated for other displays and/or the amount of light falling on the sensors associated with other displays, and is limited to said 1500 NIT limit. In other embodiment the illumination control circuitry 1044A is connected, either directly as indicated by the dotted lines in FIG. 75, or under computer control, to vary the amount of illumination of each display as a function not only of the amount of illumination incident upon its light sensor, but also as a function of the amount of light incident on other light sensors or on the amount of power light being generated by other displays.

This more complicated control scheme allows illumination power to be allocated to a display unit's different displays more efficiently. In some embodiments, if lighting conditions make it appropriate to illuminate one or more displays at a level below the unit's maximum average per-display lighting energy, the energy saved is used to provide more than that maximum average energy to a display that could use it.

In some embodiments, system uses light sensors other than that associated with a given display to determine the amount of illumination the display should have. For example, if viewers of a given display will see the sun verythere is very bright light behind light which viewers will see behind a given display in determining behind the use of multiple light sensors to determine the amount of illumination provided to a given light sensors take into account sensors indicate that the amount of light -//lf-since the power supply has a max, it may make sense, for example, to sometimes blackout one display completely (because there is so much incident bright light shining on it that you can't supply it with enough power anyway—so cut your losses and feed the power to the other surfaces so at least they look good).

Figure 47:
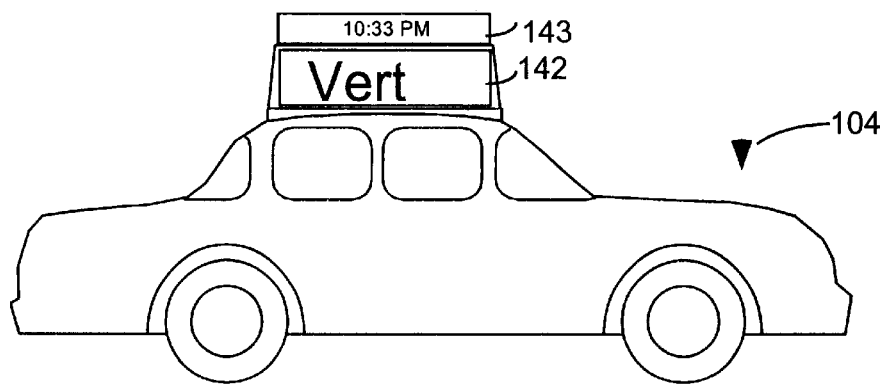
FIGS. 47 through 50 illustrate an embodiment of the invention which includes both a relatively lower resolution textoriented display, as well as a higher resolution graphic display in one mobile unit.
Figure 48:
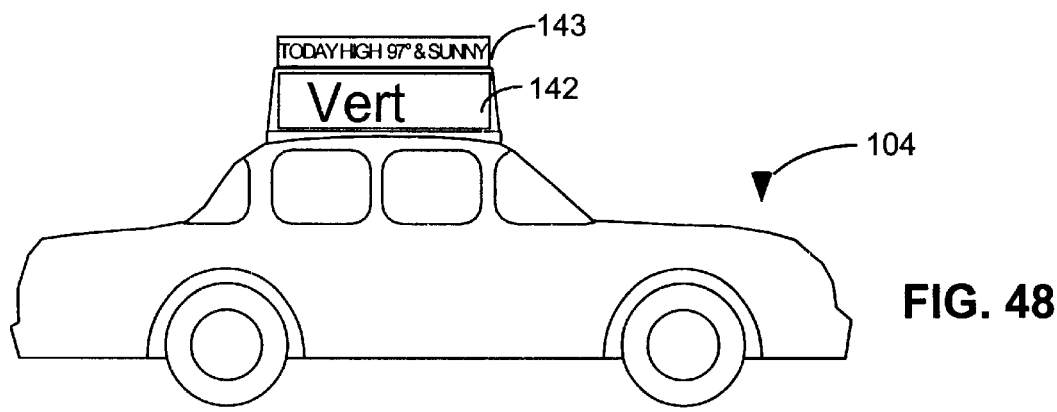
Figure 49:
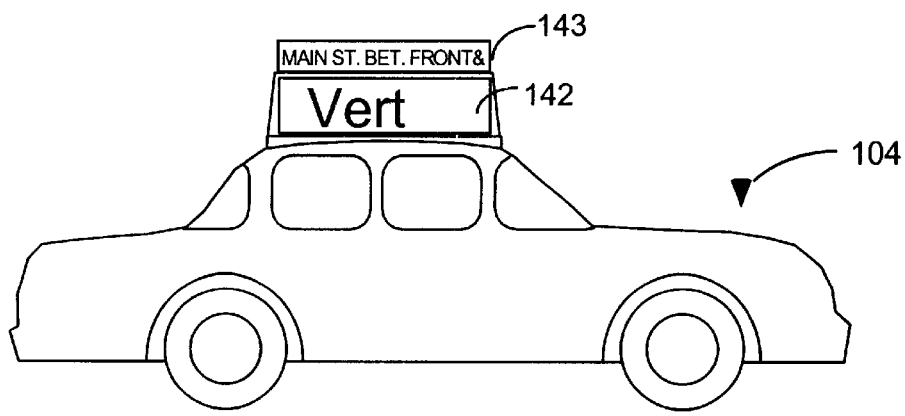
Figure 50:
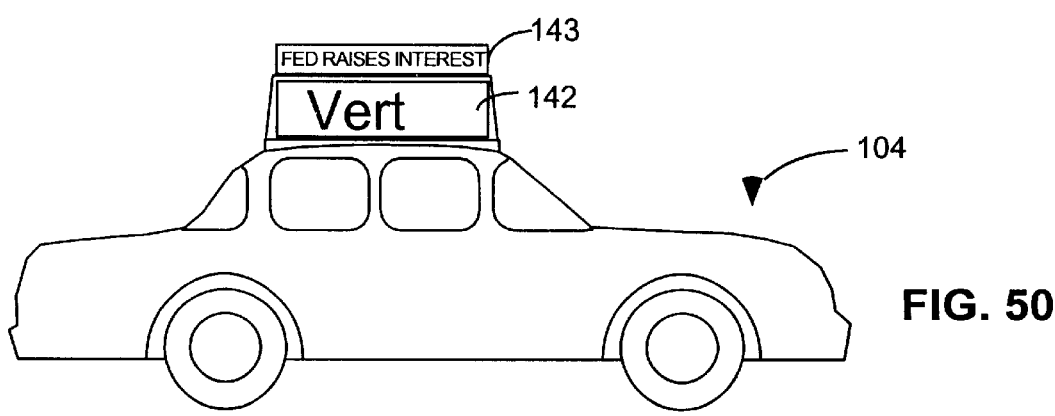

-//limit on total power consumption by displays, system determines temporary max allowed to individual displays as function of total power limit, equalizing, for example, percent of desired illumination -//could allocate power based on which display is considered to have better viewership, such as if on highway, or if at high speed, or if demographics say otherwise-//lf-ed, i think we can also claim (though we are not implementing it yet) a separate architecture: the system reads the readings from each of the sensors at each of the ganged displays and optimally re-distributes the power to the 3 displays-//lf-since the power supply has a max, it may make sense, for example, to sometimes blackout one display completely (because there is so much incident bright light shining on it that you can't supply it with enough power anyway—so cut your losses and feed the power to the other surfaces so at least they look good).-//limit on total power consumption by displays, system determines temporary max allowed to individual displays as function of total power limit, equalizing, for example, percent of desired illumination -//could allocate power based on which display is considered to have better viewership, such as if on highway, or if at high speed, or if demographics say otherwise FIGS. 47 through 50 illustrate an alternate embodiment of the invention in which a mobile unit has different types of displays, including a high-resolution graphic display, such as the display 142 discussed above with regard FIGS. 42 and 43, and a low resolution, largely text-oriented, display 143. In the embodiment shown in FIGS. 47 through 50, these two displays are oriented so that they can both be read from generally similar locations relative to the mobile unit 104 on which they're mounted. A text-based display 143 of the type shown in FIGS. 47 through 50 can be used for multiple different purposes. For example, it can be used to show information such as time, as is indicated in FIG. 47; weather or temperature, as is indicated in FIG. 48; the current streets location of the vehicle, as indicated in FIG. 49; and news information, as is indicated in FIG. 50. Such a display can also be used for many other types of information, such as the status of the motor vehicle as a taxi cab, that is, whether it is off-duty, currently driving for a passenger pickup, or currently occupied.

One of the advantages of using a combination of text-oriented, and graphics-oriented display is that the text-oriented display can show text information with a given degree of legibility from a given distance with a less expensive display, and with less energy consumption, than most bitmap displays.

In another embodiment of the invention, a combination of an electronically controlled display and a more traditional static printed display can be used. In some such embodiments, the controlled display will be a text-oriented display of the type shown in FIGS. 47 through 50.

FIGS. 51 through 56 display alternate types of outdoor displays which can be used in some embodiments of the current invention. These displays are all designed to use reflected light, such as sunshine, for backlighting, as well as electrically generated backlight.

So-called transreflective displays, which have both a reflecting surface and electrical backlighting behind their display surface have been used in the prior art. They are particularly useful when displays are used outdoors, because when such displays are in bright sunshine they can reflect such bright light back through their display, giving them the brightness to be visible in such sunshine without requiring a tremendous amount of energy to be consumed by the display's electrical backlights. When it is dark, however, they can used their electrical backlights to provide necessary lighting.

In the prior art most transreflective have their reflecting surface parallel to, and immediately behind, their LCD light valve, which spatially filters, or modulates, light so to form images. In such transreflective displays, virtually the only light reflected out through light valves toward viewers is that which impinges upon the reflecting surfaces by first traveling through such displays', light valves.

Although such normal transreflective display can be used in some embodiments of the invention, the particular types of transreflective display shown in FIGS. 51–56 have backlighting reflective surfaces which are not both close and parallel to their light valve. This enables such displays to light the images seen by their viewers with reflect light other than that which has such displays through their light valves. This enables the displays of FIGS. 51–56 to provide much more reflected illumination when the sun is high in the sky, and thus at its brightest, or is low in the sky and somewhat behind the display.

FIGS. 51 through 53 illustrate the operation of such a display 1060, showing the sun 1064 in three different locations relative to it. In the embodiment of this invention shown in FIGS. 51 through 53, the display has a lens 1062 located at its top which is designed to bend the rays of the sun down into the display device to increase the amount of light which either hits the back of a display panel 1036 directly, as shown in FIG. 53, or which hits a light diffusing surface 1064, from which a portion of such light is reflected in a diffuse manner toward the back of the display 1036. In some embodiments of the invention, the bottom surface of the lens 1062 will be covered with either a one-way reflecting surface, or a controllable light valve 1065 to reduce the amount of light which is reflected back through the lens 1062 from the diffusions surface 1064 or to prevent too much light from illuminating the display panel 1036.

The display 1060 includes a plurality of light sensors 1067 which function in the same manner as the light sensors 1034 described above with regard to FIGS. 42 and 46, except that they measure the amount of light reaching a part of the display 1036 from behind. In many embodiments of the display 1060, an ambient light sensor 1034 will also be used to measure the light available on the other side of the display 1036 so as to help determine the amount of total lighting that should be used for the display. This information would then be used to control the amount of light generated by the backlights that are built into the display panel 1036.

FIGS. 54 and 55 illustrate how two displays 1062 could be fitted on into a car-top box similar to that described above with regard to FIGS. 42 and 43. In the embodiment shown in FIGS. 54 and 55 only two external displays are provided in the car-top box each of which, has a length parallel to the length of the vehicle upon which they are mounted. In FIG. 54, the numeral 1066 shows where the electronic components of the car-top box could be mounted in such a display. Those skilled in the design arts should realize that other configurations of displays similar to the displays 1060 could be fitted into a car-top box, including those with a generally triangular shape roughly equivalent to that of the car-top box shown in FIGS. 42 and 43, as well as those having four displays, with one such display mounted on each side of a rectangular shaped car-top box.

FIG. 56 illustrates how a display 1060A, which operates in a manner similar to display 1060 shown in FIGS. 51 through 55, could be designed for use for a fixed outdoor display. In the embodiment shown in FIG. 56, the lens 1062A at the top of the display is a flat lenticular lens. Although either a conventional lens or a lenticular lens could be used in either a mobile or fixed display, a lenticular lens is particularly desirable for a large fixed display because the weight of a large lenticular lens is substantially less than the weight of a conventional lens. In some embodiments of the invention shown in FIG. 56, the lenticular lens 1062A could have a chevron shape with a center which points upward so as to catch more light when the sun is low.

In other embodiments of the invention, other means could be used to capture sunlight for use in backlighting outdoor display. This could include the use of mirrors, instead of lenses, to deflect sunlight onto the display's defuser surface 1064 or directly onto the back of the display's one or more panels 1036. In some embodiments of the invention which use transreflective displays, a combination of both traditional reflective surfaces which are close and parallel to a display's light valve, and the non-parallel reflective surfaces shown in FIGS. 51 and 56, could be combined into one display. In some embodiments, the mirrors or light reflecting surfaces could be movable under the control of a computer so as to keep sunlight reflected in the proper direction as the sun and/or the display moves. For example, a MEM device having thousands of separately electronically positionable mirrors could be used to help direct sunlight into a backlighting system of the general type discussed above with regard to FIGS. 51 through 56. In some embodiments, differing combinations of one or more lenses, mirrors, and/or non-specular reflecting surfaces could be used to direct illumination to one or more displays as desired.FIG. 57 shows programming 1070 of the central system that relates to a system in which drivers are paid as a function of the amount of money earned by the messages displayed in their mobile units. Such a system could be used in a taxicab, but it also could be used with private vehicles which are supplied with car-top units, or other external displays.

As is shown in FIG. 57, this programming includes a step 1072 that uses successive locations and times through which the display unit has traveled and shown messages to calculate an earned value for that travel. This is the value that a user has earned as a function of amount of money displays at those times and locations have earned the system.

The central system could obtain information about the successive locations of a mobile unit through the use of locator signals, of the type described above with regard to steps 282 and 284 of FIG. 16. It could also use such locator signals to indicate which messages had been displayed at which locations, as is described above with regard to FIG. 12. In other embodiments, other reporting schemes could be used to enable the central system to determine at which locations and times a mobile unit has displayed messages.

In step 1074 the system credits the calculated earned value to the vehicle operator in its internal database. Then, step 1076 transmits the calculated credited value to the vehicle for display to the driver, such as, for example on a driver display 386 of the type shown in FIG. 20 and in FIG. 63 at numeral 1274.

In step 1078, the central system transmits information to the driver showing the different value that can be earned as a function of the driver driving through those different areas at different times. This enables a driver, particularly a private party driving a vehicle for his own purposes, to alter his driving patterns so as to earn larger amounts of money. If drivers do so vary their driving patterns, the central system will earn more money, since it will have more displays available in more valuable geosynchrons.

The information transmitted in step 1078 can be transmitted to the mobile vehicle so that it can be shown to the driver on the driver display 386, as illustrated at numeral 1276 in FIG. 63. In many embodiments of the invention, this information will also be made available on the central system's web site so that before a driver enters his car he can plan a route that will help earn her or him the most money.

As indicated by steps 1080 through 1084, if a driver enters into the system a desired destination for his travels, such as through the driver input 392 shown in FIG. 20, or over the Internet, the central system calculates one or more routes which reach the destination with a maximum combination of the quickest route, largest display earnings, and/or lowest cost (such as cost in tolls, or driving mileage). Then, step 1084 communicates this calculated information to the driver. If the request for such information was entered in a mobile unit driver input 392 of the type shown in FIG. 20, this information will be displayed on the driver display 386. If the request was entered over the Internet, the information will be sent back to the browser that made the request.

FIG. 58 illustrates some of the various types of non-commercial programming which can be shown by the invention's display systems in addition to advertising messages. Often such programming will be stored in programming database 1124 stored on the central system. But some of such programming can be generated dynamically, such as from a programming studio, or automatically by software programs. These programming types include street location programming 1125 of the type referred to above with regard to FIG. 49; time programming 1126 which indicates the current time, as indicated in FIG. 47; weather programming 1128 which has been discussed above with regard to FIG. 48 and FIG. 41; news programming 1130 which is illustrated above with regard to FIG. 50; sports programming 1132; traffic programming 1134 which is discussed above with regard to FIG. 40 and elsewhere in the specification; public service announcements 1136; contest programming 1138; soap opera programming 1140, which could consist of brief snippets of a an ongoing story which could also be incorporated with contests; and greeting programs, such as seasonal or holiday greeting messages or other messages designed to spread goodwill among the audience of the system's displays.

Figure 61:
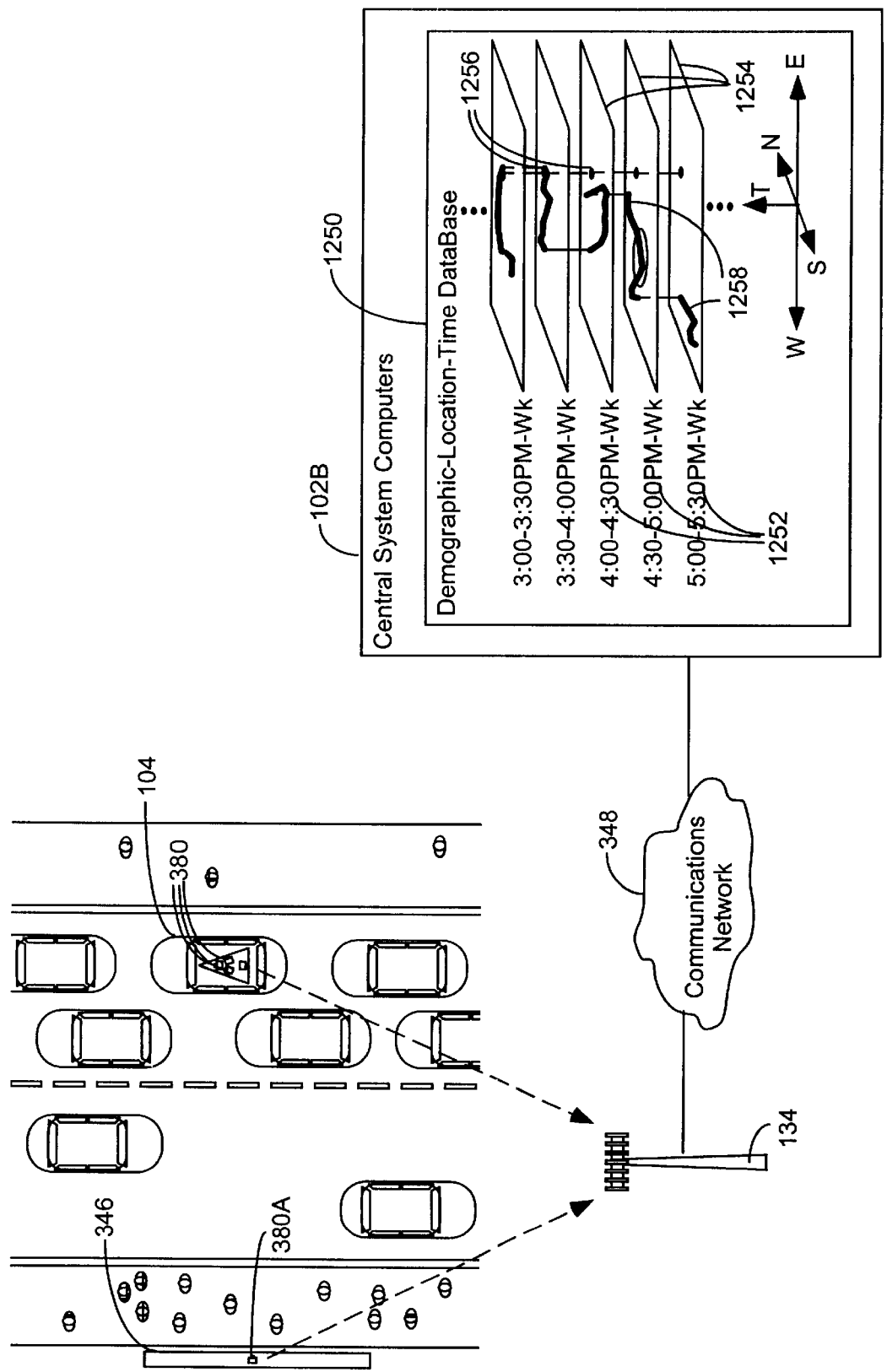
FIG. 61 illustrates how information form such cameras can be used to develop demographic data as a function of both time and location.

FIG. 61 illustrates how information from cameras such as those shown in FIG. 60 and that discussed above with regard to FIGS. 33 and 34, can be used to develop demographic data as a function of both time and location. As illustrated in FIG. 61, image information from a mobile unit 104 or a fixed display 346 is transmitted through a wireless system, indicated by the wireless tower 134 shown in that figure, from whence it is transmitted over a communication network, such as the Internet or a phone network 348 to the central system's computers 102B, shown in FIG. 61.

The image data transmitted from the mobile unit 104 or the fixed unit 346 preferably has already had machine vision performed upon it so as to extract current demographic data from the images obtained by the cameras 380 or 380A. In some embodiments of the invention, however, actual images can be transmitted to the wireless network and to the central system and machine vision can be performed upon it by the central system.

Once such demographic information has been extracted from the images taken by the cameras 380 and 388, that information can be added to a demographic-location-time database 1250 of the type shown in FIG. 61. In FIG. 61 a small portion of this database, that used to represent weekdays between 3 PM and 5:30 PM, is shown. In this particular embodiment each half-hour of that time period is represented by a different plane 1254. The horizontal directions in each such plane represent East and West and North and South, as is indicated in that figure. The vertical direction represents time. The values of one or more demographic attributes are stored in the data base for each location and space and time. The values of one such attribute are shown in graphs 1263 and 1264 in FIG. 62.

Of course those skilled in the art of databases will understand that this demographic information can be stored in many different data structures, and data can be recorded with different time granularity than the half-hour granularity shown in FIG. 61.

As a mobile unit 104 moves through space, the demographic information it sends back to the central unit is tagged with successively changing location values. These different location values cause that information to be recorded at successively different space-time locations in the database. The resulting path in space-time for the mobile unit 104 is shown in FIG. 61 by the line 1258. As can be seen by the vertical space-time page represented by the numeral 1256, demographic information coming from a fixed display 346 does not move in the north-south or east-west direction, but does move in the time dimention in the. demographic database.

In order to make past demographic information useful in predicting current or future demographic audiences, demographic information obtained from similar past times is combined. For example, demographic information from normal weekdays over a period of months, years, or even decades can be combined to form the demographic database illustrated in FIG. 61. As such information is compiled from multiple fixed and mobile display units over time, the database will tend to develop a substantial amount information about potential audiences at different times and places throughout the area in which its displays are operating.

Figure 62:
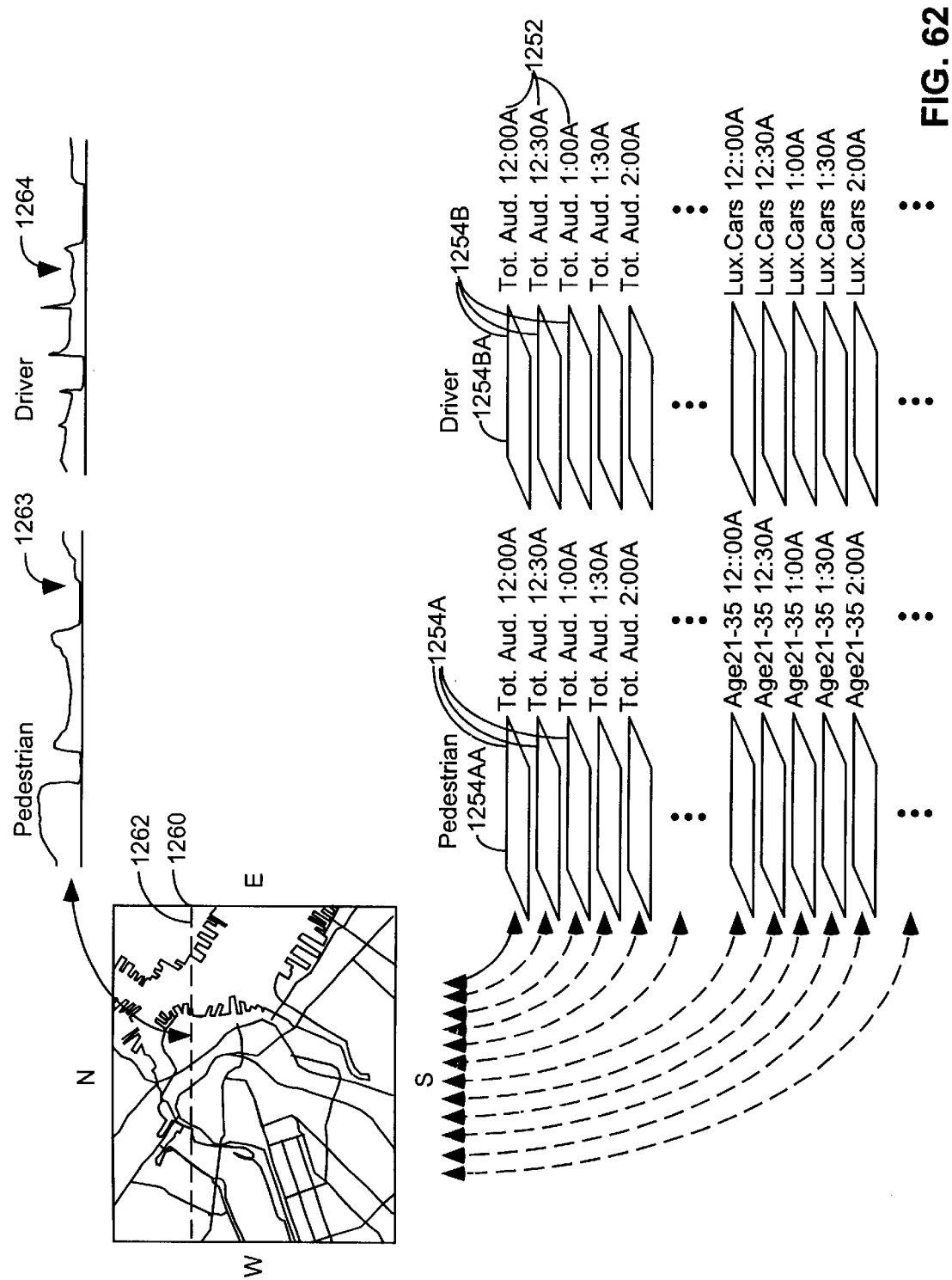
FIG. 62 is a schematic representation of a multidimensional demographic database for a given geographic area that includes separate demographic data at the same location for pedestrians and for drivers.

FIG. 62 is a schematic representation of a multidimensional demographic database for a giving geographic area similar to that shown in FIG. 61, except that it shows that separate demographic data being stored for each of a plurality of different space-time locations for both pedestrians and drivers, the two different audiences likely to see a mobile unit's side and back displays, respectively.

As shown in FIG. 62 demographic data 1254A is stored for pedestrians and different demographic data 1254B is stored for drivers. As in the example of FIG. 61, a separate plane of data is stored for each half-hour. In the portion of the database shown in FIG. 62 a separate plane of data is shown for each half hour from 12:00 AM to 2:00 AM. As is indicated in FIG. 62, this demographic data can include a plurality of different demographic attributes for each space-time plane 1254, each of which corresponds to the geographic area represented by the map 1260 in FIG. 62. In FIG. 62, the top group of data planes relate to total audience, whereas a lower group of such database data planes represents the number of people between the age of 21 and 35 in various locations in the pedestrian database and the number of luxury cars within the view of the rear camera in the case of the driver demographic database.

In FIG. 62 the value of the total audience number associated with the pedestrian database and the driver database along the line 1262 shown in the map 1260 are illustrated by the graph 1263 and 1264, respectively. The height of this graph represents the value of the total audience at each point along the line 1262. It should be appreciated that the map 1260 will normally cover the entire area over which a message display system has fixed or mobile units.

FIG. 63 is a schematic representation of an aspect of the invention which involves associating different values with the display of messages at different locations and times and calculating a sum of such values along a space-time path through which one or more vehicles has traveled. Such a calculated sum can be charged to an advertiser based on where and when its messages have been shown by the system or credited to a vehicle operator in return for the locations in which a vehicle owned or operated by that operator has shown messages.

As is shown in FIG. 63, the central system 102B includes a price-location-time database 1272 which includes data indicating a price associated with each of a plurality of locations represented by horizontal distance in the planes 1257, at each of a plurality of times represented by the vertical dimension in FIG. 63. As in FIGS. 61 and 62, the database is shown having a time granularity of one half-hour with a different data plane 1257 being associated with each such half-hour interval. Of course, in other embodiments of the invention other time granularity's could be used, and other ways of representing price as a function of time and place could be used. At each given region within a plane 1257, such as the region indicated by the circle 1259 in FIG. 63, a plurality of prices or values is associated. This is indicated by the values 1270 shown in the blown up portion of one of the planes 1257 at the lower left-hand corner of FIG. 63. In some embodiments of the invention a different value will be associated with each location in time for the amount of money to be charged to an advertiser and for the amount of money to be paid to vehicle operators or drivers.

As a mobile unit 104 moves through geographic space it radios its location and the identity of the messages it displays to a wireless network, represented by the wireless tower 134 in FIG. 63. The wireless network communicates that information to the central system. This enables the central system to determine a space-time path 1258A through the price-location-time database. A sum of values along such a space-time path, such as the sums represented by the graphs 1274 of 1282 in FIG. 63 can be calculated for each of the paths. The value associated with a given time-location combination in this sum calculation can be multiplied by the number of messages shown in that location, or the amount of time spent displaying messages in that location. In the case of a sum calculated for an advertiser, the advertiser will only be charged for the display of messages which it has agreed to pay for, and not for the display of messages for other advertisers. In most embodiments, the sum calculated for crediting toward a mobile unit operator will give that operator credit for all messages displayed on his vehicle.

As is indicated in FIG. 63, in some embodiments of the invention a driver display 386 of the type described above with regard to FIGS. 20 and 21, which is located in the mobile unit's drivers compartment, is used to display the sum 1274 of money which is been earned by the display operator or driver over a given period of time. In some embodiments, the mobile unit can also show a screen 1276 upon the driver's display which allows the drivere to see the different amounts of money which can be earned by driving through, and showing messages at, different locations at different times.

FIG. 64 is a schematic representation of how multiple receivers can be used to determine the location of a mobile unit in some embodiments of the invention.

As is shown in that figure, the mobile vehicle 104 transmits wireless messages to a wireless network having a multiple receivers 134A through 134C. Electronic comparators 1290 associated with the wireless network can compare information about the receipt of the same signal from the mobile unit by the network's different receivers in a step 1292 to determine the location of the mobile unit. Once this determination is been made a step 1294 can communicate that location information to the mobile unit 104 and/or to the central system 102B. The comparison in step 1292 can be of differences in signal strength received at the different wireless receivers, or of differences in the time at which a given signal is received by such different receivers.

At the time of the writing of this application, it is expected that within several years standard digital wireless communication networks, such as those which will be used by cellular phones and personal digital assistants, will determine the location of wireless transmissions as a standard part of their service. Once such location detection becomes a standard part of wireless service, it may no longer be necessary or desirable for mobile units 104 to contain global positioning systems or other geographic location detection equipment.

FIGS. 65 and 66 illustrate one possible embodiment of the. scheme for the auto-placement of messages described above briefly with regard to steps 456 and 458 of FIG. 24A. FIGS. 65 and 66 illustrate, respectively, programming 1300 and 1364 which can be executed, respectively, by the central system and a display unit as part of this scheme.

As shown in FIG. 65, the central system auto-placement programming includes steps 1302 through 1346 which provide a user interface for allowing a user to define an auto-placement order in terms of the types and number of people it wishes to reach and the time frame over which it wishes to reach them.

Steps 1304 through 1342 allow a user to specify one or more desired viewer types to which one or more customer messages are to be shown under the order. For each such viewer type, it enables the customer to specify one or more characteristics which defined that viewer type, as well as the number of viewers of that type to which the messages are to be shown. As indicated by numerals 1308 through 1338, these steps enabled a customer to characterize viewer type not only in terms of traditional demographic categories, such as ethnic group, estimated income, and lifestyle category, as indicated by numerals 1308 through 1312; but also by viewer context factors which might affect the appropriateness of showing a given message to a given set of viewers.

As indicated by numerals 1314 through 1320, these viewer context factors can include the current activity of the viewer, such as whether they are driving, walking, or sitting.

As indicated by numerals 1322 through 1334, these factors can also include the viewers' relationship to the display on which the message is to be shown, including whether they are seeing a vehicle side display 142 or a vehicle back display 144 of the type shown in FIG. 6; the length of time viewers are likely to be able to see a message (as estimated from factors such as the speed of the mobile unit, the relative speed of the mobile unit to viewers, and whether the viewers are pedestrians or drivers located behind a vehicle); the relative speed of the display to viewers; the viewers' proximity to the display; and the viewer's orientation relative to the display.

As indicated by numeral 1336, these factors can also include the one or more times at which viewers areto see the message, such as a time of day, a day of the week, etc.

As indicated by numeral 1338, these factors can also include location classifications, such as one or more specific locations, or one or more classes of locations, in which the viewer is to see the display. This can include locations near a given type of event, a given type of store, or a given type of public facility.

As indicated by numeral 1342, for each of the viewer types defined, a customer can specify the number of viewers of that type to which he desires to have a given message shown under the current order. Preferably the auto-placement customer interface uses historical information in the central system's databases to inform customers of the number of viewers of each customer specified viewer type which are realistic during a specified time frame.

As indicated by step 1344, the interface also allows a user to select the overall time frame over which the messages associated with a given order are to be shown. This selection could specify a sample duration, such as a day, week, or month, or a custom duration having a user selected start date and time and a user selected end date and time.

As indicated at step 1346, the system specifies the price of each customer specified viewer type for the selected timeframe. This allows a customer to see the price of different types of orders before it selects to commit to purchasing them in step 1347.

Step 1174, which can be the same step 1174 described above with regard to FIG. 23, allows a user to select one or more messages to be shown according to the order. In the particular embodiment just described, if the user selects more than one message to be shown for an order, the system randomly selects between such messages. In such embodiment, if the customer wants different messages shown under different circumstances, such different circumstances can be specified with separate orders.

Steps 1348 through 1362 describe operations which the central system takes in response to the receipt of shown-message information from individual display units which those display units have generated in response to the steps of FIG. 66.

As indicated by FIG. 66, the auto placement programming of individual display units consists largely of a loop 1366 performed for each display unit display that is about to be free to show a new message. If the display unit is a mobile unit having two side displays 142 that show the same message in unison, and one back display 144 that shows a separate message, the loop 1366 is performed separately for the side and back displays.

The loop 1366 includes an internal loop 1368 which is performed for each of a plurality of orders that have been communicated to the display unit by the central system. In some embodiments the loop 1368 will only consider orders which have an urgency, described below, which is above a certain level, so as to reduce computation.

For each considered order, the loop 1368 performs an internal loop 1370 for each of the viewer types defined for that order by a customer using step 1306 of the central system programming shown in FIG. 65. For each such viewer type, steps 1372 through 1378 calculate a product which is formed by multiplying the number of viewers of that type which are estimated as being likely for the display for which loop 1366 is being performed.

This estimated viewers-of-type number can be calculated from a demographic database of the type described above with regard to FIG. 62. As indicated in FIG. 62 if the display is a mobile unit it can access different demographic data for pedestrian populations which are likely to see side displays and driver populations which are more likely to see back displays.

In some embodiments of the invention, the viewers-of-type number can be calculate from such a demographic data base and/or from real-time demographic data determined by the use of cameras and machine recognition software hardware of the type described above with regard to FIGS. 60 and 61.

Step 1372 multiplies this estimated viewers-of-type number both by the price for each viewer of the current type associated with the current order and by an urgency number calculated by the central system for that viewer type in the current order, as described below.

Once step 1372 has calculated its product, step 1380 adds that product to an orderScore variable used to sum the products calculated by step 1372 over all of the viewer types associated with the current order.

Once loop 1370 has calculated the orderScore for each order for which the loop 1368 is performed, step 1382 selects the order with the best orderScore. Then when display for which loop 1366 has just been performed is available to show the next message, step 1384 causes the message associated with the selected order to be shown on that display.

Steps 1386 to 1396 record the following shown-message information for each message shown in step 1384: the ID of the message, the ID of the order; the time and location at which the message was shown; and for each viewer type associated with the order, the number of viewers of that type estimated by step 1374.

As indicated by numeral 1398, the display units uploads this shown-message-information to the central system. This upload can occur immediately after each messages is shown, or can occur less frequently, in which case it will normally include shown-message information associated-with the showing of multiple messages.

Returning now to FIG. 65, the central system receives shown-message information from each of a plurality of display units over its wireless communications interface, as indicated by step 1348.

A loop 1350 is performed-for each individual shown-message record received. This loop includes an inner loop 1352 performed for each viewer type associated with the shown-message record's associated order.

For each such viewer-type loop 1352 causes steps 1354 through 1360 to be performed, each of which uses viewer type's estimated viewers-of-type number generated in step 1374 of FIG. 66.

Step 1356 subtracts this estimated viewers-of-type number from the number of desired exposures to viewers of that type specified for the shown-message record's corresponding auto-placement order. This number of desired exposures is the number which has been previously selected for the order by a customer in step 1342 of FIG. 65. The number resulting from this subtraction corresponds to the number of unfulfilled viewer exposures for the current viewer type under shown-message record's corresponding order.

Then step 1358 calculates an urgency number for viewers of the current type as a function of the number of unfulfilled exposures to viewers of that type just calculated in step 1356 and as a function of the amount of time remaining in the order.

In many embodiments of step 1358, the urgency number is calculated not only as a function of the amount of time remaining for the completion of the order, but also as a function of such factors as the expected rate at which opportunities for exposures to such viewers are likely to occur over that remaining time, and the extent to which that rate of likely exposure opportunities might very over that remaining time, all as calculated from information recorded by the system for similar exposures at similar past time periods.

Such calculations of expected exposure opportunities for a given viewer type preferably also take into account the extent to which other orders are seeking to make exposures to the same viewers during the same period of time.

In step 1360, the central system uses the viewers-of-type number associated with a shown-message record to calculate the charge to be made to the order's customer as a function of the price associated with exposures to viewers of the current viewer type.

In step 1362, the central system download to multiple display units the changes in viewer-type urgency associated with different orders that have been calculated by step 1358 of FIG. 65.

The process described in FIGS. 65 and 66 provides a system for automatically controlling the time and place at which messages are shown as a result of the plurality of different customer selected specifications of the types of viewers, and the numbers of those types of viewers, to which one or more messages are to be shown over a given period of time. The system automatically response to changes in circumstances in determining which adds to show when and where. It also automatically spaces out the showing of messages over the duration of the order by means of the urgency number described above.

It can be seen that in this auto-placement system the urgency numbers used in selecting which messages are shown on an individual display are calculated as a function of the extent to which exposures to each viewer type for a given order have been made by a plurality of different display units.

When this auto-placement system is used by mobile units having both side and back displays, it will often automatically select different messages for the side and back displays as a function of different demographic information associated with the likely audiences for side and front displays. This different demographic data can be derived from a demographic database, such as that shown in FIG. 62, and/or from real time sensor information, such as information from cameras of the type indicated in FIGS. 60 and 61.

FIGS. 67 through 76 illustrate one embodiment of a rooftop display unit 174A which can be used by mobile units according to some aspects of the present invention.

Figure 67:
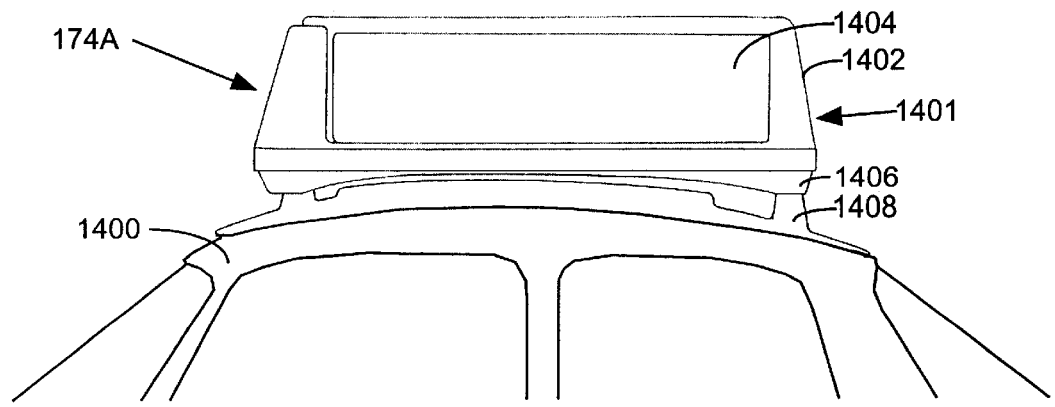
FIG. 67 is a side view of one embodiment of a rooftop unit for carrying a mobile unit's displays and electronics on the roof of a motor vehicle.
Figure 68:
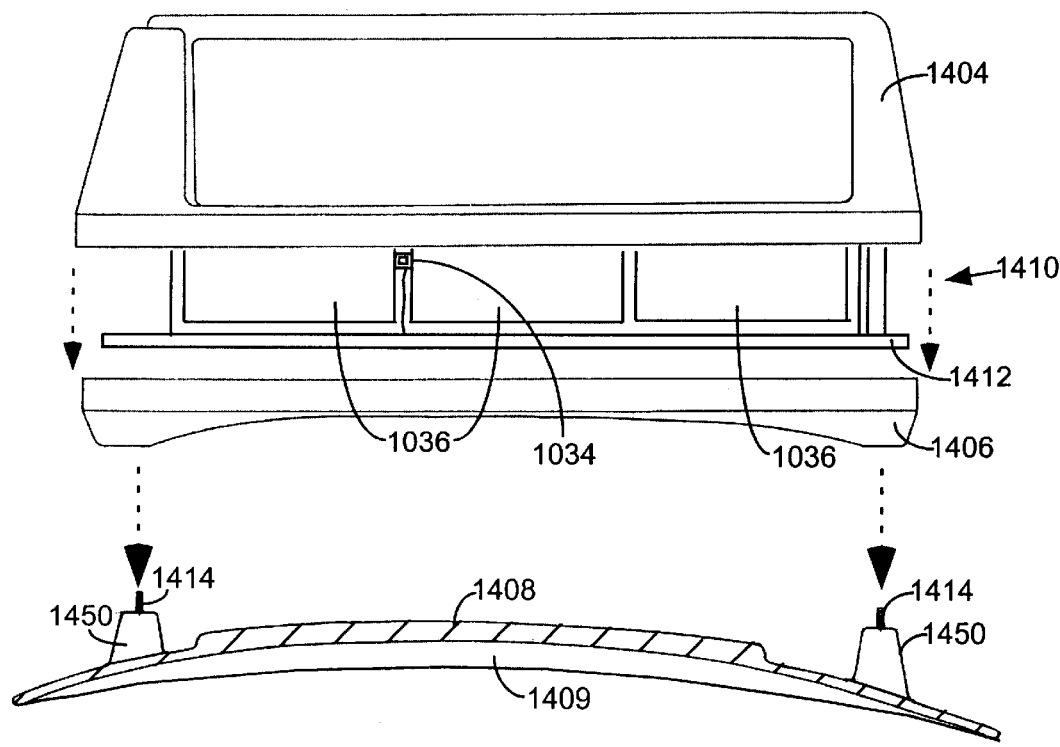
FIG. 68 shows the components of the rooftop unit shown in FIG. 67 in an exploded view.

FIGS. 67 and 68 provides side views of this rooftop unit 174A. FIGS. 67 shows the rooftop unit assembled on the roof 1400 of a vehicle on which it is to be used. FIG. 77 is an exploded view of the rooftop unit.

The roof top display unit 174A is similar to the car-top unit 174, described above with regard to FIGS. 3–6 and FIGS. 42–46. Like them it has two side displays and one back display placed in a triangular arrangement.

The rooftop unit 174A includes a top cover 1402 and a bottom cover 1406, which together form an enclosure for the electronic components of the rooftop unit. This enclosure is substantially waterproof, except for ventilation and mounting holes located in the bottom surface of the bottom cover. The top cover 1402 includes a transparent window 1404 over each of its three displays.

The enclosure, and the components it contains, form a rooftop box 1401. This box is designed to be mounted above a roof protector 1408. The roof protector has a bottom surface 1409, which can be seen in FIG. 68, that is shaped to fit the 3-dimensional shape of the roof of the car on which the rooftop unit is designed to be mounted. The roof protector is designed to spread the weight of the rooftop unit over a relatively large area (at least two square feet and preferably more) of the roof of the vehicle on which it is mounted. Such spreading of the rooftop box's weight is valuable, because the roofs of many vehicles are made of relatively thin sheet metal, which cannot support much weight if that weight is applied to a relatively small area of such sheet metal. This is particularly true if the vehicle is to travel on streets having pot holes and other bumps, which will cause the force exerted on the roof by the mass of the rooftop box 1401 at certain moments to be even greater.

The roof protector can be attached to the vehicle roof with several screws or bolts. In some embodiments a thin film, such as one made of an elastomeric or plastic foam can be placed between the roof protector's bottom surface and the vehicle roof to reduce scratching and other wear upon the roof.

In the exploded view of FIG. 68 part of the electronic components 1410 of the rooftop unit are shown between the top cover 1404 and the bottom cover 1406. These components are similar to those shown in FIGS. 42 and 43, although in newer versions the computer and related electronics are somewhat smaller and more integrated, a trend that should continue even further in the future. Also in the embodiments shown in FIG. 68 the light sensor 1034 associated with each ganged display is located in a slightly different position than in FIG. 42. Of course in other embodiments, each displays light sensors could be in yet other positions, or a plurality of light sensors could be used for each display.

The electronic components shown in FIG. 68 include a metal base 1412 upon which the other components, including the displays 1036 are mounted. This base plate is similar in function to the base plate 1026 shown in FIGS. 42 and 43. This metal base 1412 is attached to mounting shafts 1414 which extend up from the roof protector through mounting holes 1415 in the bottom of the bottom cover 1406, shown in FIG. 70, so as to securely mount the metal base on the roof protector.

Figure 69:
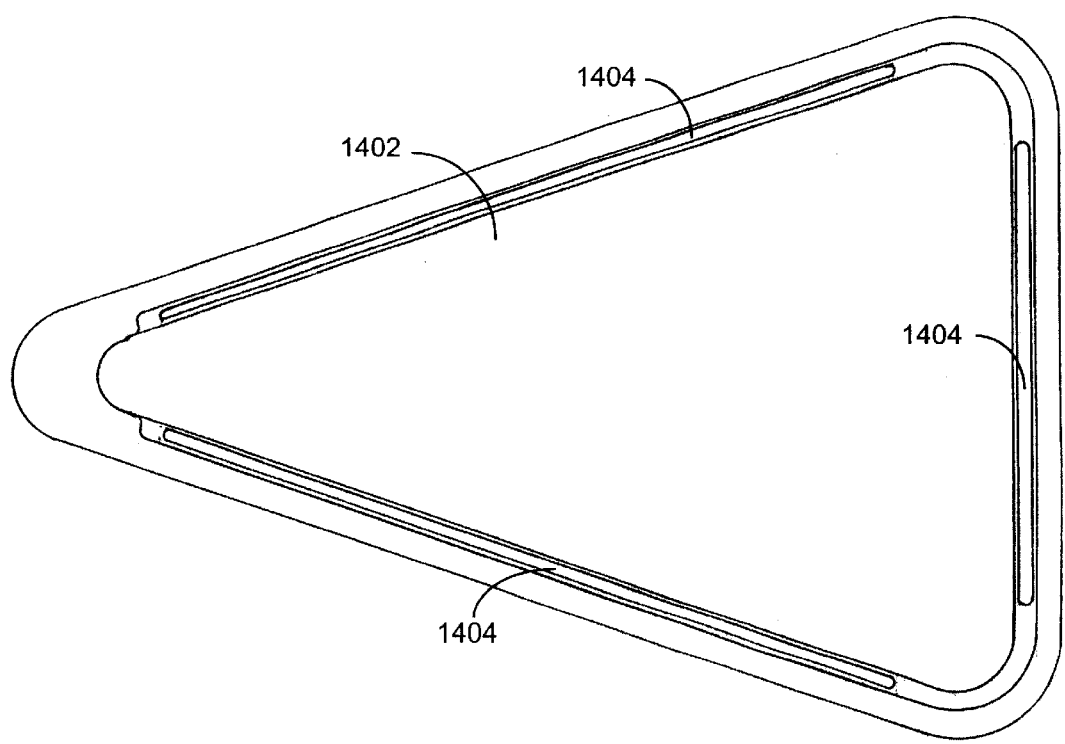
FIG. 69 is a top view of the top cover of the rooftop box shown in FIGS. 67 and 68.

FIG. 69 provides a top view of the rooftop box's top cover. It shows the three windows 1404 which are placed over each of the rooftop units displays, although in FIG. 69 these windows are greatly foreshortened due to the angle at which they are seen.

Figure 70:
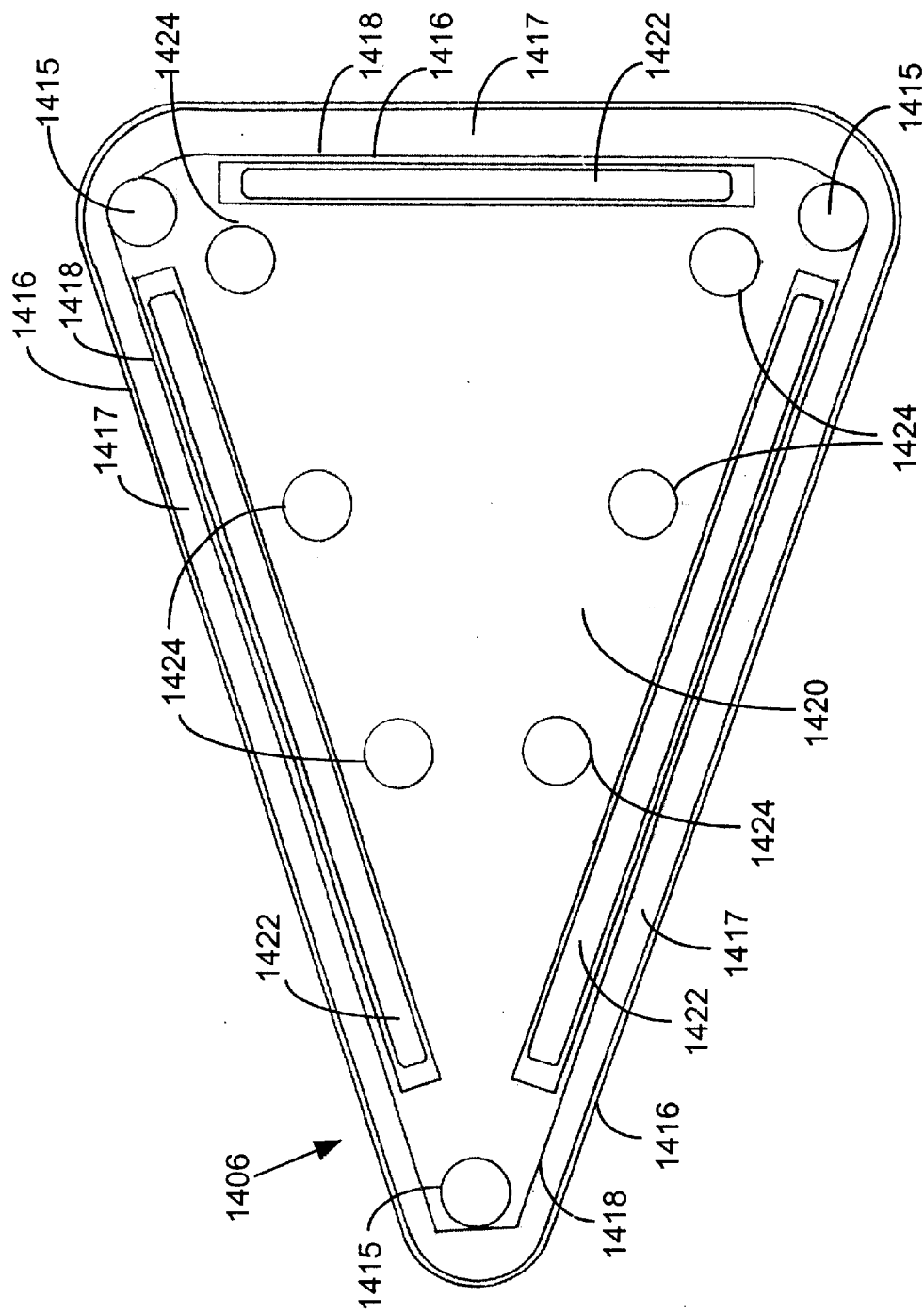
FIG. 70 is a top view of the bottom cover of the rooftop box shown in FIGS. 67 and 68.

FIG. 70 shows a top view of the rooftop box's bottom cover 1406. In FIG. 70 the part of the bottom cover between its roughly triangular outer edge 1416 and the roughly parallel downward bend 1418, which extends inside the outer edge, defines a depressed peripheral portion 1417 of the bottom cover. This peripheral portion is depressed relative to the largely flat central portion 1420 of the bottom cover. This depressed peripheral portion, as well as the bottom cover's outer edge and the bend 1418, are shown in FIG. 72.

FIG. 70 shows the inflow ventilation holes 1422 and outflow ventilation holes 1424 that are formed in the bottom cover. One of each of these types of holes is also shown in FIG. 72. As can be seen from FIG. 72 the peripheral depression 1417 extends down below the ventilation holes 1422 and 1424. This is done to increase the likelihood that rainwater or condensation will gather on the bottom of the peripheral depression rather than near the ventilation holes 1422 and 1424. It is also done to decrease the likelihood that rainwater will enter the ventilation holes, particularly the inflow ventilation holes 1422, which are located very close to the bottom cover's depressed periphery 1417, decreasing the likelihood that rainwater will be sucked into such inflow holes.

Figure 71:
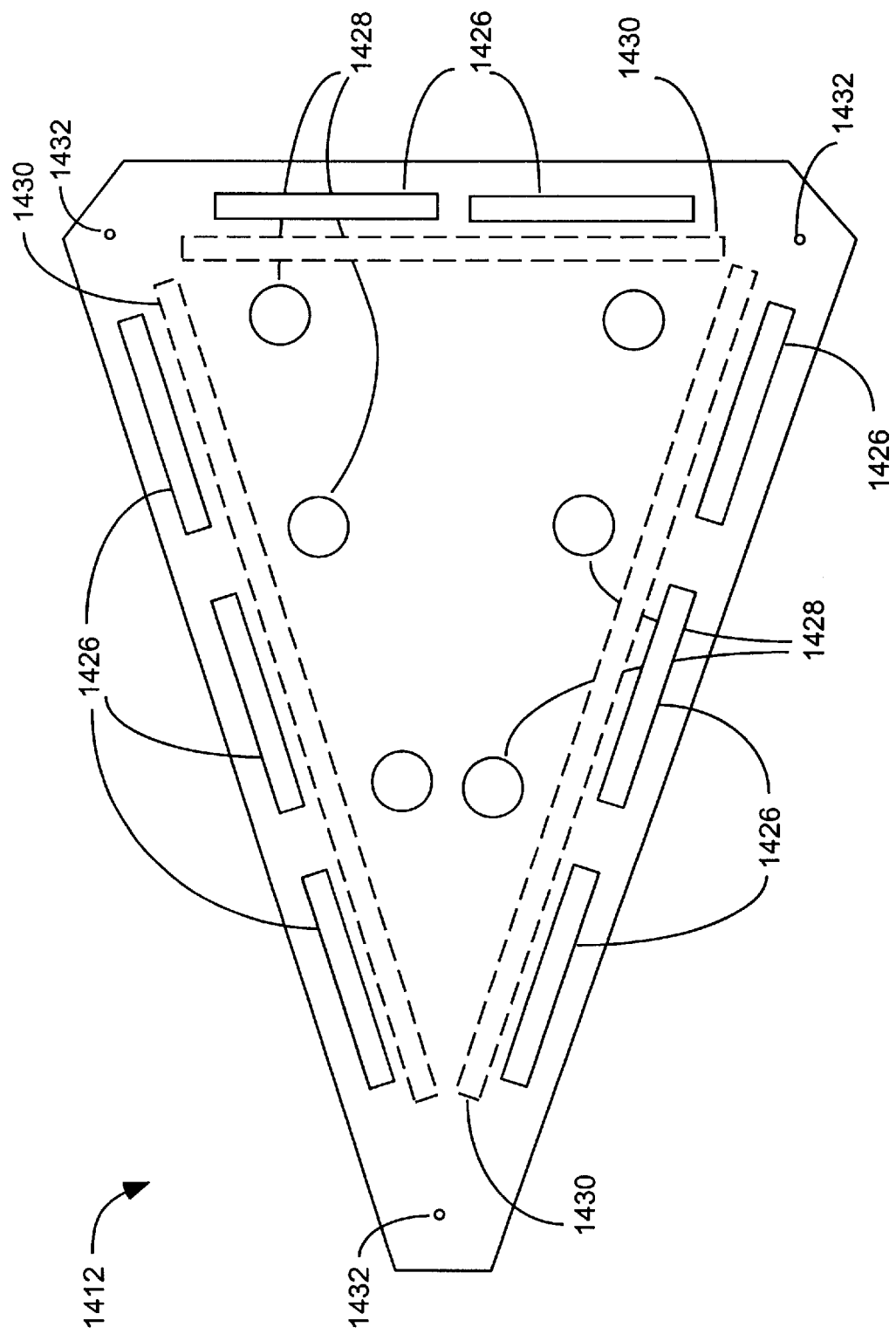
FIG. 71 is a top view of the metal base plate shown from the side in FIG. 68.

FIG. 71 is a top view of the metal base plate 1412, upon which the other electronic components of the rooftop units are mounted. This base plate includes rectangular holes 1426 designed to fit approximately over the ventilation inflow holes 1422 shown in FIG. 70 and circular holes 1428 designed to fit over the ventilation outflow holes 1424 shown in FIG. 70. It also includes mounting holes 1432 designed to be fit upon the mounting shafts 1414 of the roof protector in the manner shown in FIG. 74.

Figure 72:
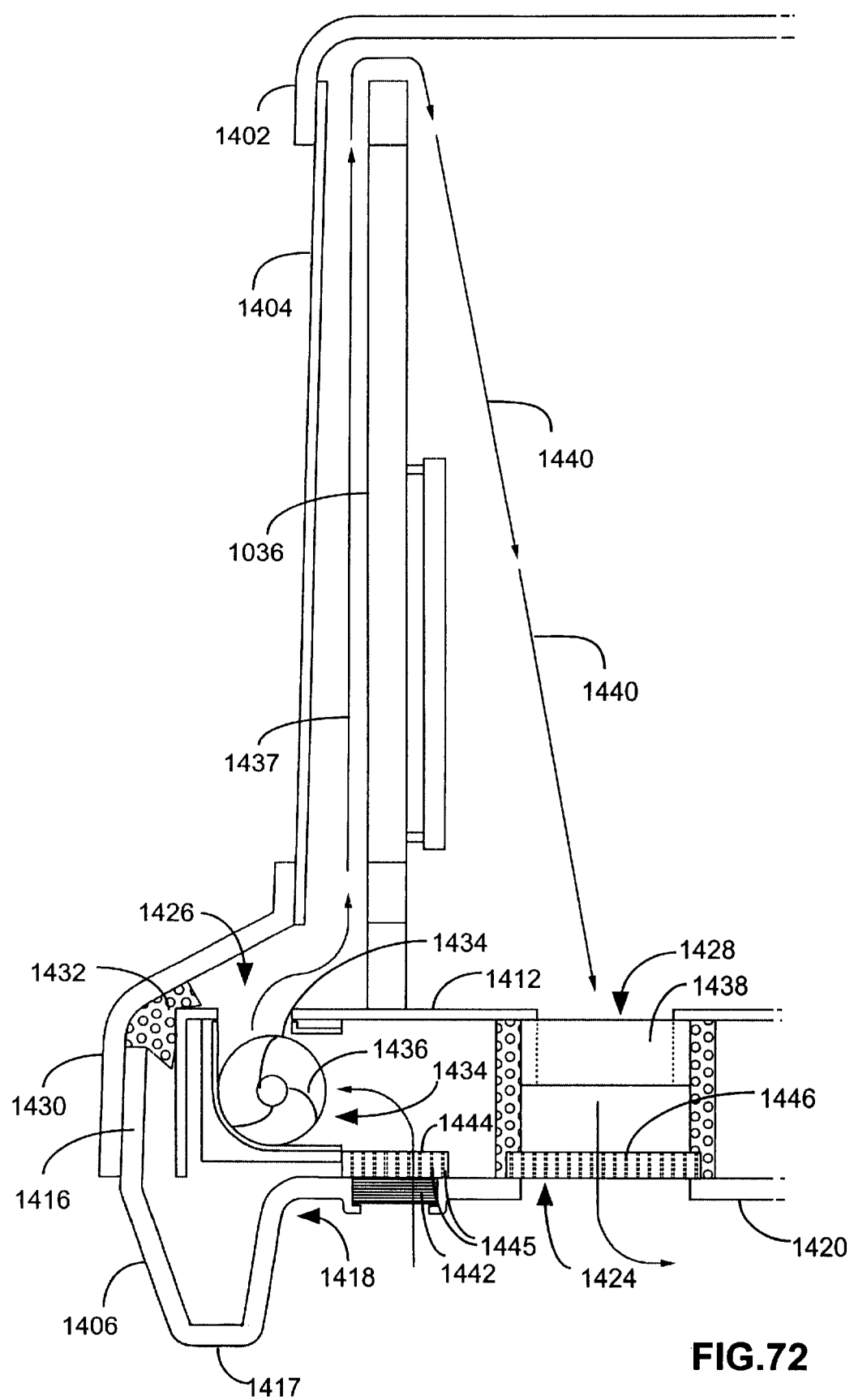
FIG. 72 is a cross-sectional view of a portion of the rooftop box shown in FIGS. 67 and 68 for the purpose of illustrating the ventilation within that box.

FIG. 72 is a cross-sectional view of a portion of the rooftop box used to illustrate its ventilation. This figure shows that the rooftop box's top cover 1402 is designed to have its lower peripheral edge 1430 snugly fit over the outside edge 1416 of the box's bottom cover 1406. Screws or bolts can be attached between these two edges to securely lock the top and bottom covers together. Foam 1432 can be used to make the seal between the top and bottom cover relatively watertight.

FIG. 72 show that a crossflow fan 1434 is located between the inflow holes 1422 of the bottom cover and the inflow holes 1426 of the base plate 1412. Each such crossflow fan has a long cylindrical air impeller, the major axis of which extends under the length of its associated inflow hole 1426 shown in FIG. 71. Each such impeller-has blades 1436 designed to impel air from a bottom cover's inflow hole 1422 out through a base plate's inflow hole 1426, up across the front surface of a display 1036, as is indicated by the arrow 1437

An outflow fan 1438 is located just beneath each of the base plate's outflow holes 1428. Each such outflow fan impels air out through its associated outflow hole 1424 in the box's bottom cover. This outflow fan 1438 sucks air down the backside of the display 1036, as is indicated by the arrows 1440 in FIG. 72.

A strip of foam 1442 is located in each inflow hole 1422 of the bottom cover 1406. It's purpose is to keep dirt and moisture out of the air sucked into the rooftop box by the inflow fan 1434. Above the foam strip 1442 is located an air verticalizing grate 1444, which has a set of vertical gratings 1445 designed to substantially verticalize the flow of air through it, so as to further reduce the likelihood that moisture will be sucked up into the fan. The grating 1444 also served to help hold the foam strip 1442 in-place. In the embodiment shown, the foam strip 1442 is placed outside of the verticalizing strip 1444, so as to enable the foam strip to be easily replaced without the need to take apart the rooftop box. This is desirable since these foam strips, which act as filters, will need to be replaced fairly often. In other embodiments of the invention the air verticalizing grate can be placed below the filter strip to reduce the amount of water which hits the filter strips.

As can be seen from FIG. 72, the outflow hole 1424 of the bottom cover also has an air verticalizing grating 1446 placed over it so as to help keep water droplets and other undesired objects from getting into the rooftop box.

Figure 73:
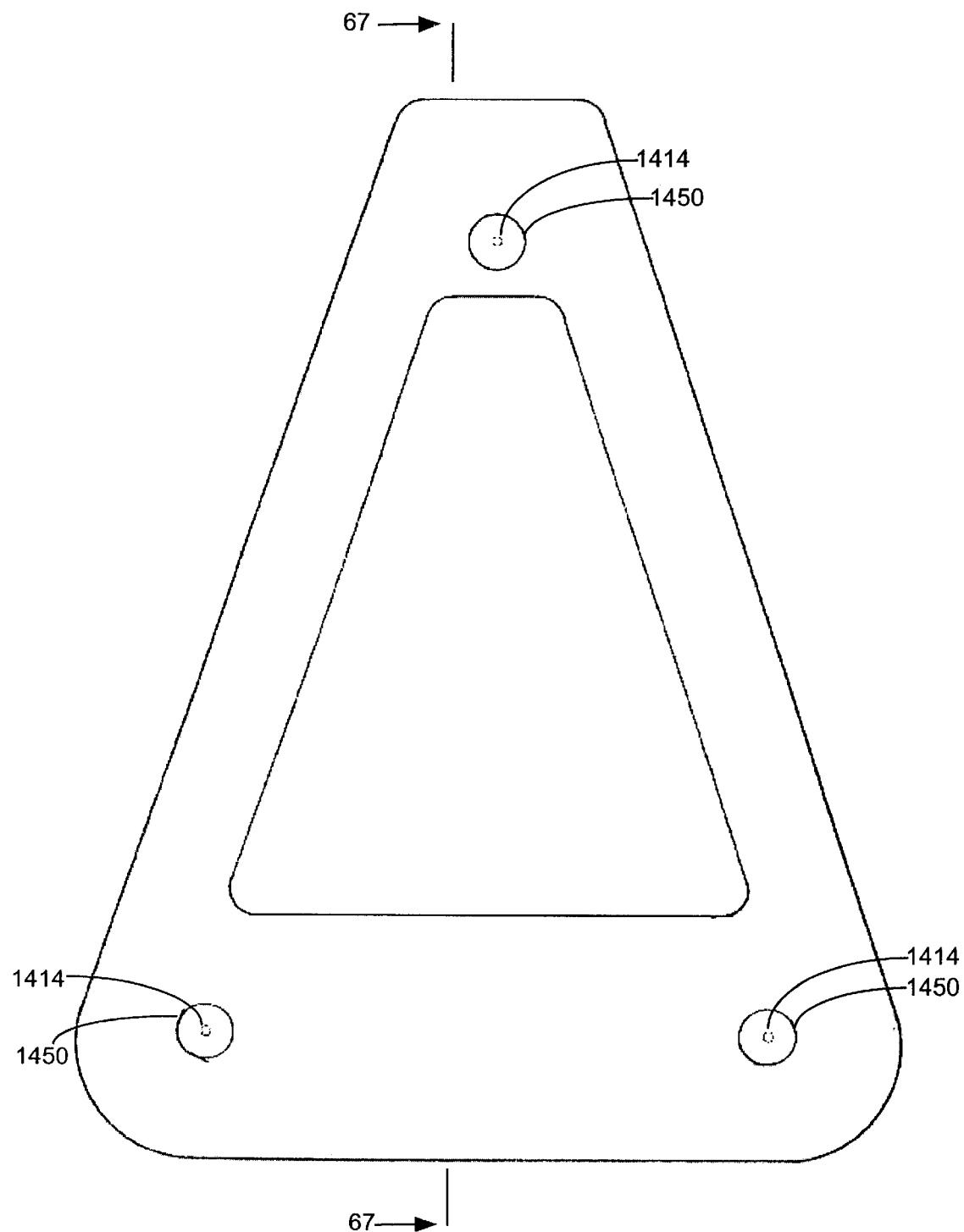
FIG. 73 is a top view of the roof protector of the rooftop unit shown in FIGS. 67 and 68.

FIG. 73 provides a top view of the roof protector shown in FIGS. 67 and 68. This roof protector is designed in a generally triangular shape roughly matching, but somewhat larger than the triangular shape, indicated by FIG. 69, associated with the rooftop box. In other embodiments, the roof protector can have other shapes, including being formed of separate portions, or of having holes formed in it to reduce its weight. In the embodiment shown the roof protector is made of fiberglass, but in other embodiments it can be made of other materials.

Figure 74:
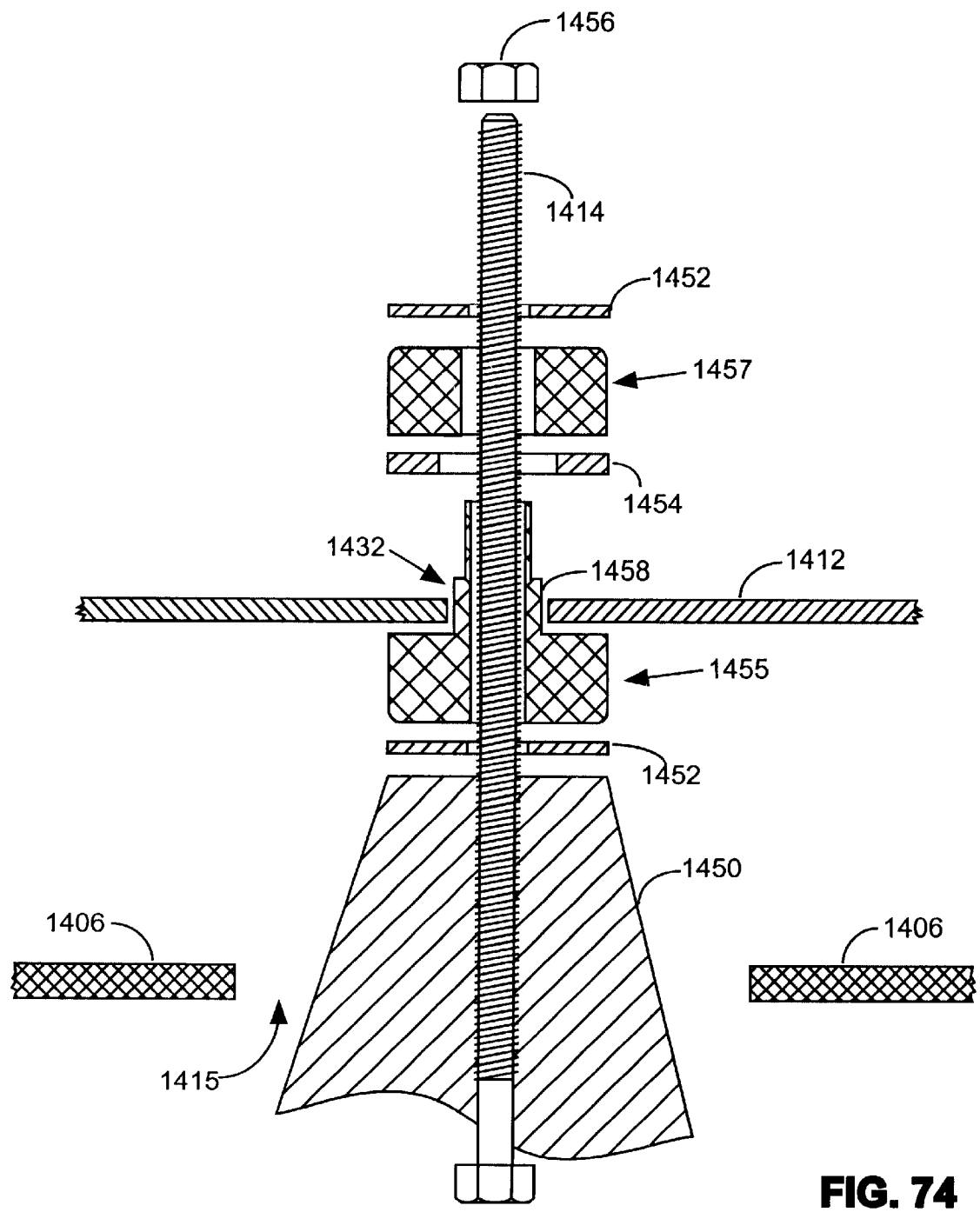
FIG. 74 is a cross-sectional view illustrating how the rooftop box and roof protector shown in FIGS. 67 and 68 are mounted together.

FIG. 74 provides a cross-sectional view of how the rooftop box is mounted on the mounting supports 1450 which extend up from the root protector 1408.

Each of the roof protector's three mounting supports includes a mounting shaft 1414, in the form of a threaded bolt. The bottom portion of each such bolt is embedded in the material of its associated mounting support 1450. Each such mounting bolt and its associated mounting support are intended to extend up through one of the mounting holes 1415 in the bottom cover of the rooftop box. The mounting holes 1415 are wider than the mounting support 1450 to allow room for the rooftop box to bounce relative to the support as the vehicle upon which rooftop unit is mounted travels, hits Bumps, and/or brakes rapidly.

The metal base plate 1412 which supports the rooftop box's electronics is, itself, mounted upon the roof protector's mounting supports 1450 and their associated bolts 1414. It is mounted upon each such supports and associated bolt with the help of flat washers 1452, a lock washer 1454, and an elastomeric vibration isolator comprised of two portions, a lower portion 1455 and an upper portion 1457. A nut 1456 is tightened down upon each bolt 1414 so as to firmly hold the metal base plate 1412 in place relative to the vibration isolator mounted upon that bolt.

As is shown in FIG. 74, the vibration isolator's two portions 1455 and 1457 are shaped to extend between the metal base plate 1412 and the rigid mounting structures formed by the mounting support 1450, bolt 1414, washers 1452, and nut 1456. The top portion 1475 of the vibration isolator extends between the base plate and the combination of the washer 1452 and the nut 1456 that holds the base plate down; the bottom portion 1455 of the vibration isolator extends between the base plate and the combination of the washer 1452 and the mounting surface 1450 that hold the base plate up; and the elastomeric collar 1458 of the bottom portion of the vibration isolator extends between the base plate and the bolt 1414 which restrains the base plate in horizontal directions. Thus, the base plate receives isolation from vibration between the rooftop box and its mounting in all three dimensions.

Figure 75:
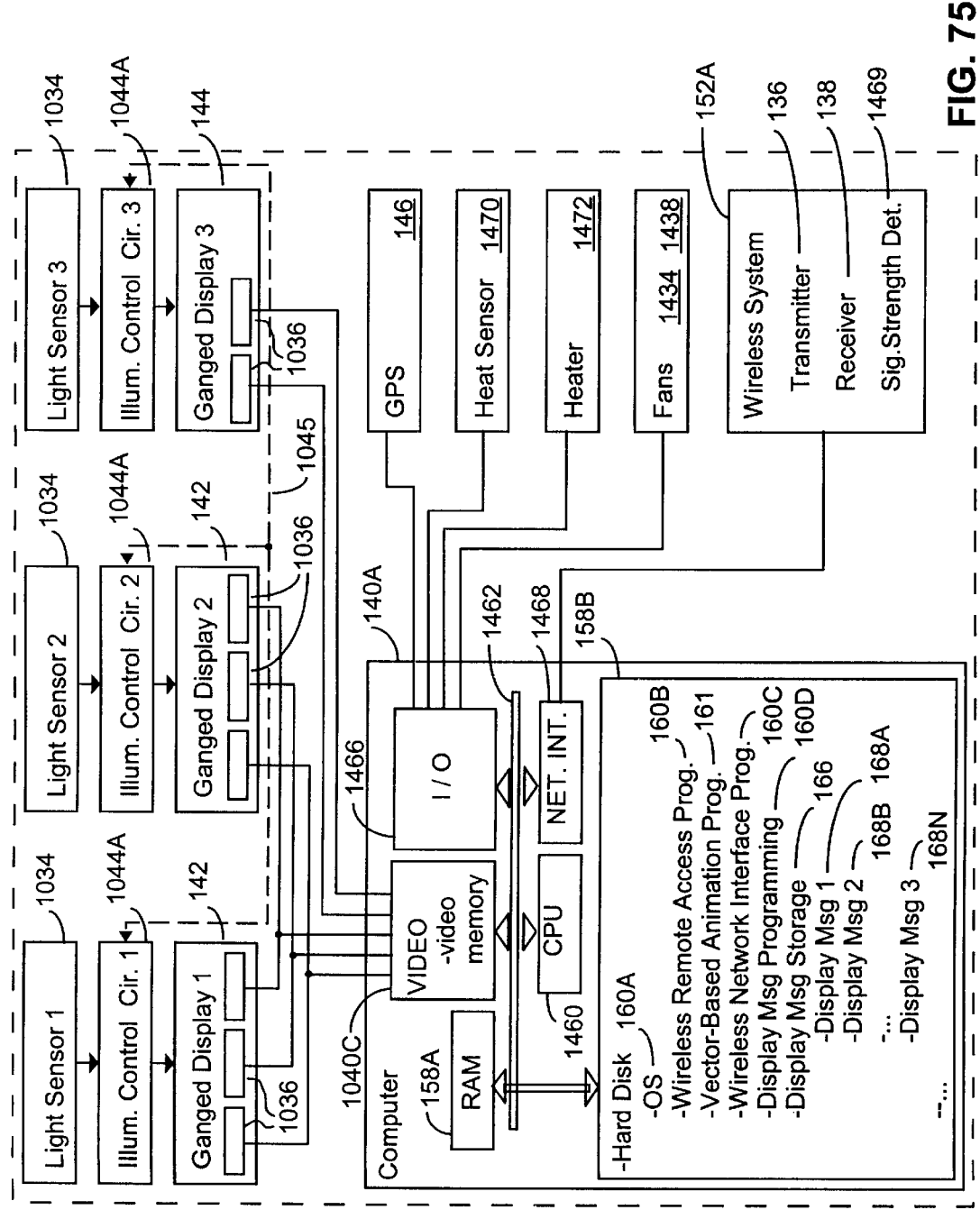
FIG. 75 is a block diagram of some of the major electronic components contained within the roof top box shown in FIGS. 67 and 68.

FIG. 75 provides a block diagram of some of the major electronic components of the embodiment of the rooftop box shown in FIGS. 67 and 68.

As can be seen from FIG. 75, the rooftop box includes a computer 140A that is generally similar to the mobile unit computers, or controllers, 140 shown in FIGS. 1, 7, 20, and 21. In FIG. 75 some of the relatively standard components of the computer 140A are shown. These includes its central processing unit, or CPU, 1460; its bus 1462, which enables the CPU to communicate other components of the computer; its random access memory, or RAM, 158A; its hard disk 158B; its video interface 1040C; its I/O ports 1466; and its network interface 1468.

The video interface 1040C corresponds to the video interface 1040 and 1040A shown in FIG. 45. It includes one portion of video memory for driving the same images on each of the corresponding three individual panels 1036 in each of the two ganged side displays 142, and another portion of memory for driving the two individual panels 1036 which make up the ganged back display 144.

Each of the ganged displays has an associated light sensor 1034 and illumination control circuit 1040A, which correspond to the light sensor 1034 and the pulse width modulation control circuit 1044 shown in FIG. 46.

In some embodiments, the illumination control circuit 1044A determines the brightness of its associated ganged display 142 or 144 in response to the output of its associated light sensor 1034 independently of the operation of the other gang displays and their light sensor or illumination control circuitry. But in other embodiments the operation of the illumination control circuits is interconnected, as is indicated by the dotted line 1045 in FIG. 75. Such functional dependence, can be controlled either by circuitry or programming within the illumination control circuits themselves, or under control of the rooftop box's computer 140A.

Such interdependent illumination control allows illumination power to be allocated to a rooftop box's different displays more efficiently. In some embodiments, if lighting conditions make it appropriate to illuminate one or more displays at a level below the unit's maximum average per-display lighting energy, the energy saved can be used to provide more than that maximum average energy to a display whose visibility could benefit from greater illumination.

In some interdependent illumination embodiments, the illumination control circuits use light sensors other than those associated with their own display to determine the amount of illumination the display should have. For example, if the light sensors indicate there is bright light behind a display, that bright light, which would not fall on a display's own sensor, is used in determining how much illumination should applied to a display.

In some interdependent illumination embodiments, the illumination control circuits cut off illumination to an individual display when it determines that it will be difficult for viewers to see messages on that display, such as due to very bright light falling on the display or very bright light behind the display. In such a case the power saved by turning off backlighting to the display can be applied to other displays on the rooftop-box.

FIG. 75 represents one or more heaters 1472 which are located inside the rooftop-box, as well as the inflow and outflow fans 1434 and 1438 which have been described above with regard to FIG. 72. The rooftop-box also includes one or more heat sensors 1470, the output of which is supplied to the computer 148. The computer can control the operation of the heaters and fans in response to the output of the heat sensor.

The computer 140A includes in its memory storage system, which in the embodiment of FIG. 75 includes the RAM 158A and the hard disk 158B, an operating system 160A, wireless remote access programming 160B, vector-based animation program 161; wireless network interface programming 160C, as well as display message programming 160D, and display message storage 166 of the type described above with regard to FIGS. 1, 7, 20, and 21.

Figure 76:
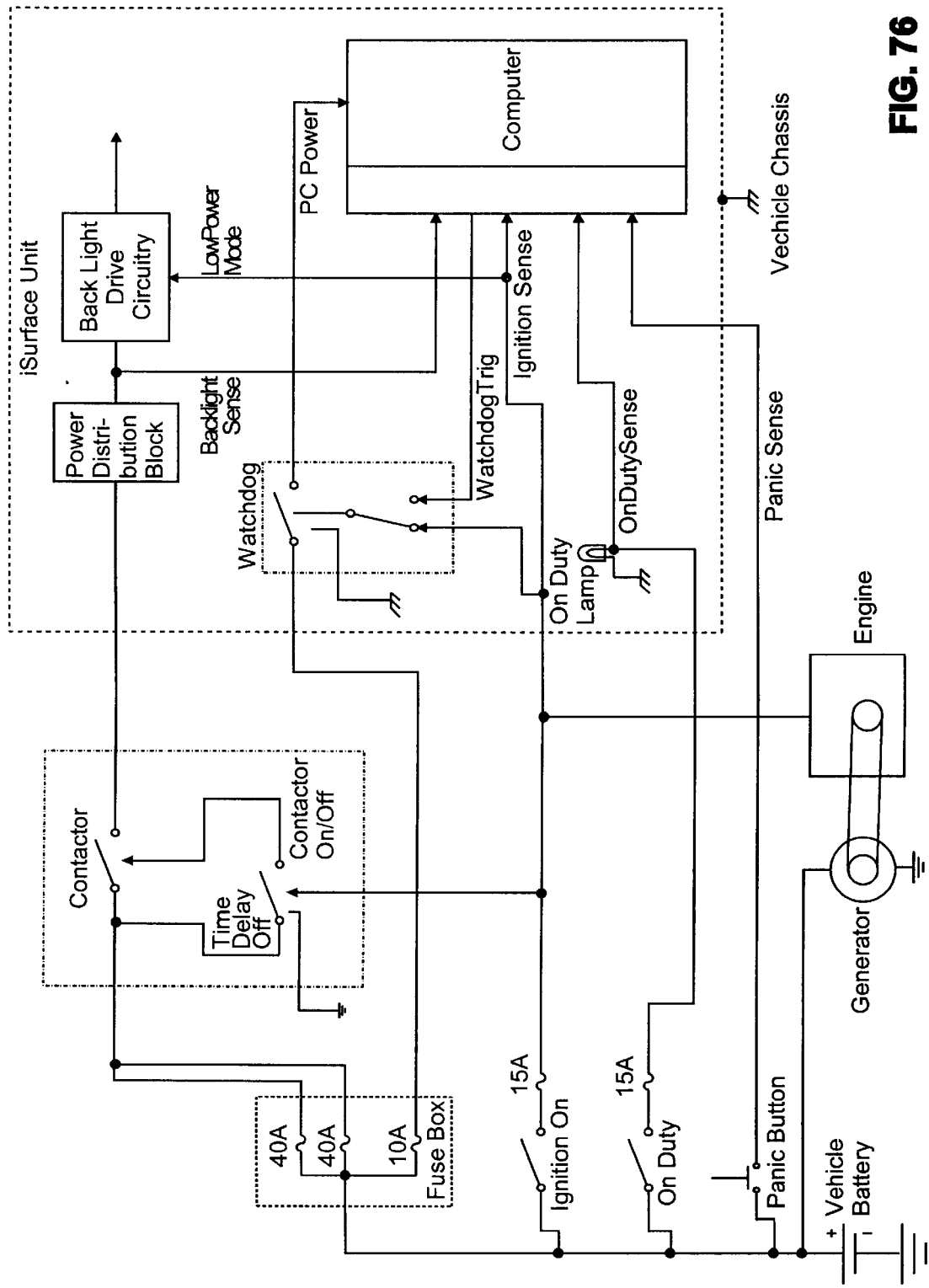
FIG. 76 illustrates how the rooftop box shown in FIGS. 67 and 68 is connected to the electrical system of the motor vehicle on which it is mounted.

FIG. 76 illustrates how the rooftop box (indicated by the dotted line numbered 1401) is connected the electrical system of the vehicle on which the rooftop box is mounted.

The vehicle's electric system includes a battery 1480 connected to ground on one side and to a positive terminal on the other. An ignition switch 1482 has one end connected to the battery's positive terminal and its other end connected to an ignition line 1484. This ignition line is connected to the ignition of the vehicle's engine 1486. When the engine is running it turns a generator 1488, causing the generator to generate electricity that charges the battery 1480 and provides power to circuitry connected to the battery's positive terminal.

The battery's positive terminal is connected through a fuse box to a line 1492, which is connected to a terminal 1493 on one end of the switched path of a watchdog circuit 1494 located in the rooftop box 1401. The other end 1495 of the watchdog circuit's switched path is connected to a line 1496 that supplies power to the rooftop box's computer 140A. The Watchdog circuit has a input 1498 which is connected to the ignition line 1484 and also has another input 1500 connected to an output line 1502 from the computer 140A.

The watchdog switch makes a connection across its switched path between terminals 1493 in 1495 when it senses that power has been supplied to the ignition line. Once this connection has been made the watchdog circuit keeps its switch path connected until it senses that a watchdog timeout period longer than several minutes has elapsed without receiving a watchdog signal on line 1502. When the computer 104A is on and functioning properly it generates such watchdog signals at a frequency higher than the watchdog timeout period.

Thus, it can be seen that the Watchdog switch cause the computer to receive power from when the ignition switch is turned on until the computer stops working.

The computer receives an input from the ignition line 1484 so that it can tell if the vehicle's ignition is on. It is programmed to shut itself off if a sufficiently long period of time has elapsed since it senses that the ignition switch has been turned and remained off.

The positive terminal of the battery 1480 is also connected through the fuse box 1490 to one or more lines 1504 which are supplied to one end 1506 of the switched path of a relay 1505. The other end of the switched path 1508 is connected to line 1510, which supplies power to a set of connectors which comprise a power distribution block 1512. These connectors supplied current to the backlight drive circuitry 1043, which corresponds to the circuitry 1043 shown in FIG. 46. The power distribution block also supplies current over a line 1514 to one input of the computer 140A, which enables the computer to sense whether or not the backlight drive circuitry is receiving power from power distribution block.

The relay 1505 is a time delay relay which receives an input from the ignition line 1484. When power is received from the ignition line, the time-delay relay 1505 turns on its switched path, enabling current flow from the line 1504 to the line 1510 into the backlight drive circuitry. Once this switch is turned on it stays on until power has been removed from the ignition line 1484 for a give time period, which is roughly a minute or so in duration.

The function of the time-delay relay 1505 is to turn off the rooftop box's backlight shortly after the vehicle's ignition has been turned off. This is done because the backlight drive circuitry 1043 consumes a considerable amount of electricity, enough to drain the typical vehicle battery within a fraction of an hour if the displays were left on after the vehicle's generator 1488 stopped generating electricity.

As shown in FIG. 76, the vehicle can have an on-duty switch 1516. This switch is normally placed in the driver's compartment of vehicles which are taxi cabs to enable drivers of such vehicles to indicate whether or not they are on duty. The switch 1516 is connected through a line 1518 both to an on-duty lamp 1520 that is mounted in some embodiments of the rooftop box 1401, and to one input of the computer 140A.

In taxi cab embodiments of the invention, as well as some other embodiments, the driver's compartment is also provided with a panic button, or emergency switch, 1522 which is connected between the positive end of the vehicle's and a line 1524 connected to an input of the computer 140A. This panic switch enables a driver to indicate upon the displays of the rooftop box or over the box's wireless that he is having some sort of emergency, such as a serious breakdown, or a robbery or assault. In other embodiments more complex inputs such as a keyboard, the driver input 392 shown in FIG. 21, or multiple separate emergency buttons, could allow the driver to indicate the particular type of emergency he or she is having.

FIG. 77 provides a schematic description of the energy conservation scheme 1530 which is acheived by the circuitry of FIG. 76.

As indicated by numerals 1532 through 1548, the scheme causes a staged power shut down to occur within the rooftop box after the vehicle's ignition switch 1482, shown in FIG. 76, is turned off. As indicated by numerals 1534 and 1536, at a first-time after the ignition shut off, power to the displays is decreased. In the emobidment of FIG. 76 this first power reduction occurs immediately after the ignition is turned off and it is caused by the fact that the backlight drive circuitry 1043 receives an input from the ignition line 1484 which causes the pulse width modulation circuitry 1044, shown in FIG. 46, to reduce power to the rooftop box's backlights as soon as it senses that the ignition has been turned off. In the embodiments of FIG. 76 approximately one-half of the power to the backlights is cut off in this first power reduction.

As indicated by numerals 1538 in 1540 of FIG. 77, power to the back lights is totally turned of at a second time which is longer after the ignition has been turned off than the time at which the first, partial, power reduction to the backlights takes place. This second power reduction is performed by the hardware time delay relaty 1505 shown in FIG. 76.

As indicated by numerals 1542 and 1544 of FIG. 77, at a third, even longer, time after the ignition switch 1482 has been shut off, the computer 140A shuts down. This happens under control of software in the computer 140A that responds to a drop in voltage on the ignition sense line 1484 which is connected to one input of the computer, as shown in FIG. 76.

As indicated at numerals 1546 and 1548 in FIG. 77, shortly after the computer has been shut down by operation of step. 1544, power to the computer is shut off. This is done by the watchdog switch 1494.shown in FIG. 76, because once the computer has shut itself off it will cease to emit periodic watchdog signals on line 1502. Once the watchdog switch has failed to receive a watchdog signal from the computer for a period longer than the watchdog timeout period, the watchdog switch will break the signal path between its terminals 1493 and 1495, cutting power to the computer 140A.

In summary, the steps indicated by numerals 1532 through 1548 of FIG. 77 save power by reducing illumination to the rooftop box's displays shortly or immediately after the ignition has turned off. Then, shortly thereafter they turned off all power to those displays so as to prevent the displays from draining too much power out of the vehicle's battery. At a longer period after the ignition has been off the computer 140A shuts itself down under software control, and power to it is cut. The computer 140A draws substantially less electricity than the rooftop box's display backlights, however it draws enough electricity that were the computer left on for long periods of time it would also drain the vehicles battery.

Because of the importance of preventing the rooftop box from inadvertently having its battery drained, in many embodiments of the invention the time-delay relay 1505 is a hardware relay independent of the operation of the computer 140A. This causes the power to be cut from the power hogging backlights even if the computer 140A become hung, decreasing a chance that the vehicle will have its battery rundown accidentally.

In the embodiment shown in FIG. 76 the time-delay relay 1505 is shown outside of the rooftop box 1401. In other embodiments it can be constructed as part of the rooftop box.

In other embodiments of the invention variations on this power saving scheme could be used. For example, in some only certain of the power reductions steps are made. In others, additional such steps are made. In one embodiment, all power to the backlights is turned off immediately when the ignition is turned off, and, thus, no time delay is used for the relay which turns such power off. In others embodiments, there is reduction in power to the backlights until for some time after the ignition is turned off. It should also be understood that the amount of time after the ignition that various power reduction steps should be made will vary as a function-of the amount of power different components of a vehicle display unit consume in proportion to the power stored in the vehicle's battery.

As indicated by numerals 1550 through 1554 of FIG. 77, when the ignition switch is turned on power is supplied to boot up the rooftop box's computer. This results from the fact that the watchdog switch 1494 is designed to be triggered to an on, or conducting, state between its terminals 1493 and 1495 when it first receives power from its connection at terminals 1498 to the ignition line 1484.

Then, as indicated at numerals 1556 and 1558 in FIG. 77, power is provided to backlight the displays at a slightly later time. This is because the time delay relay 1550 of FIG. 76 delays its making of a connection between its terminals 1506 and 1508 until the computer 140A has had enough time to boot up and drive images upon the vehicle's displays.

FIG. 78 illustrates some of the energy conservation, temperature control, and a status reporting programming 1516 which can be contained within the computer 140A, shown in FIG. 75.

As indicated by numerals 1562 and 1564, if the computer's connection to the ignition line 1484, shown in FIG. 76, indicates that the ignition is off, the computer records the time at which such an ignition off status was sensed.

As indicated by steps 1566 and 1568 of FIG. 78, if the time since the computer recorded in step 1564 that the vehicle's ignition was off is above a given length, which is longer than the time delay associated with the time-delay relay 1505, step 1568 causes the computer to start shutting down, as was described above with regard to step 1544 FIG. 77.

Steps 1570 through 1592 of FIG. 78 illustrates some of the temperature control programming contained within the rooftop box.

If step 1570 receives an input from the temperature sensor 1470 shown in FIG. 75 indicated that temperature in the rooftop box is above a first level, step 1572 tests to see if the vehicle's fans 1434 and 1438 shown in FIG. 75 are on, and, if not, step 1574 turns them on.

If the input from the temperature sensor 1470 indicates that temperature in the rooftop box is below a second level which is cooler than the first level, step 1578 tests to see if the fans 1434 and 1438 are on, and, if so, step 1580 turns them off.

If the input from the temperature sensor indicates that temperature is above a third level cooler than the second level, step 1582 causes step 1584 to test if the rooftop box's heater 1472 is on. If so, step 1586 turns that here are off.

If the input from the temperature sensor 1470 indicates that temperature inside the rooftop box is below a fourth temperature level, cooler than the third temperature level, step 1588 causes step 1590 to test if the heater 1472 is off, and if so step 1592 turns the heater on.

It can be seen that steps 1570 through 1592 causes the rooftop box's fans to cool the box when its internal temperature is too high and causes its heater to heat the box when its temperature is too low. Such temperature control helps the LCD displays of the rooftop box to operate better, and it also helps the electronics of the box to operate more reliably.

Steps 1594 for through 1608 of FIG. 78 relate to programming for responding to operation of the panic button 1522 illustrated in FIG. 76.

If the computer receives an input indicating that the panic button 1522 has been pushed, step 1594 causes either the steps under step 1596 or step 1603 to be performed.

If the programming of the rooftop box is not currently in an emergency state when the button is pressed, step 1596 causes steps 1598 through 1602 to be performed.

Step 1598 turns on the emergency state, which suspends the display of normal messages on the rooftop box's three displays.

Then step 1600 repeatedly shows one or more predefined emergency messages on all displays. Such emergency messages, for example, might flash information stating that the vehicle is having an emergency and that bypassers should dial 911 and inform the police of the emergency and of the location of the vehicle.

Step 1602 repeatedly sends a pre-defined emergency message over the rooftop box's wireless transmitter informing the central system of the emergency state and the vehicle's current location. In some embodiments of the invention step 1602 also sends emergency messages directly to the police or a security service.

If the vehicle is already in an emergency state when the panic button 1552 is pressed, step 1603 will cause steps 1604 through 1608 to be performed.

Step 1604 displays a message on all of the vehicle's displays stating that the emergency is over. After a such messages have been displayed for a given time, step 1606 turns the emergency state off causing the system to resume the normal display of messages upon its screens. Step 1608 sends a message to the central system informing it that the emergency is over.

In summary, the panic button 1522 of FIG. 76 toggles the rooftop box between two states, a normal state and an emergency state. In some embodiments of the invention the driver is provided with an discrete indicator to enable a driver to know with confidence which of these two states the rooftop box is in. It is also preferred that the panic button be placed in a location that would prevent passengers of the taxi cab in which it is used from being able to know when the drivers operating that button. This is because one of the major functions of the panic switch is to help taxi cab drivers call for help when they are being threatened by criminals, and in such situations it is normally desirous to enable the driver to make a call for help without letting the criminals who are assailing him know it.

In other embodiments of the invention other types of emergency switches can be provided. For example in some embodiments one or more panic buttons would enable a user to separately controlled the generation of emergency messages on its displays and the sending of such emergency messages over its wireless system. In some embodiments the user is provided with controls which allow him or her to indicate the particular time of emergency being experienced, such as whether is a vehicle breakdown, an accident, a medical emergency, or a crime.

Step 1610 through 1626 of FIG. 78 illustrates programming in the rooftop box's computer to enable the central system to better keep track of the operation of the box.

If a rooftop box's computer receives a request from the central system over its wireless communication link requesting a particular type of status report, step 1610 cause steps 1612 and 1614 to be performed. Step 1612 generates the requested report from the current values of parameters to be contained in the requested type of report, and step 1614 sends the requested report to the central system over the rooftop box's wireless links.

FIGS. 80 through 82 represent examples of some types of status reports which can be generated by a rooftop unit in response requests from the central system.

FIG. 80 illustrates a standard status report 1642 which contains real-time data on multiple aspects of the operation of a given rooftop box. In the embodiment of FIG. 80 the standards status report includes a header 1644 containing, among other things, information identifying that the current communication is a standard status report. The standard status report includes a mobile unit ID 1646, which identifies from which mobile unit the status report is being generated.

The standards status report can further includes the vehicle's geographic coordinates.

In embodiments, such as those described above with regard to FIG. 64, in which a mobile unit's location can be determined by the wireless network which receives communications from it, status reports from mobile units need not contain a mobile unit coordinates.

The standard status report also include vehicle speed 1650; the size 1652 of one or more of its mass storage devices, such as it's hard disk; the amount of free space 1654 in that mass storage device; the size 1656 of the random access memory in the mobile unit's computer; the amount 1658 of that RAM which is free; and the degree of CPU usage 1660 within the mobile unit's computer. This CPU usage figure can be represented by one or more numbers representing moving averages of the degree of usage of this CPU over one or more recent periods of time, such as the last ten seconds, the last-minute, or the last five minutes.

The standard status report also includes the degree of network traffic 1662 on the mobile unit's wireless system; the IDs 1664 of the currently displayed messages; the output 1666 of each of the mobile unit's light sensors; the amount of power 1668 supplied to illuminate each display; the temperature 1670 sensed by the rooftop box's heat sensor; the power 1672 supplied to the rooftop box's heater; the status 1674 of the vehicle's ignition; the strength 1676 of the signal received by the wireless system 152A (shown in FIG. 75) as detected by a signal strength detector 1469 contained within that wireless system; and the IP address 1678 of the network interface 1468, shown in FIG. 75.

FIG. 81 represents a message cache status report 1680, which is another type of status report the central system can request from the mobile unit. The message cache status report includes, in addition to a header 1682 identifying the type of report and the mobile unit ID number 1684, a list 1686 of all the Ids of all the display messages which are currently stored, or cached, in the mobile unit's mass storage device. This corresponds to the IDs of all the display messages 168A through 168N shown on the hard disk 158B in FIG. 75. Such cache status reports are valuable because they enable the central system to know which mobile units currently contain the data necessary to display which given messages.

FIG. 82 illustrates a video memory status report 1688 which the central system can ask a mobile unit to generate and send it. In addition to a header 1690 and mobile unit ID 1692, this status report contains a compressed image of the data contained within the video memory of the video controller 1040C in the rooftop box's computer. This enables the central system to see data corresponding to the actual image currently being displayed by each of the rooftop box's displays.

Returning now to FIG. 78, the programming in a rooftop box not only enables it to generate status reports in response to requests from the central system, but also to initiate the transmission of status information upon the occurrence of certain events.

For example, as is indicated at numerals 1616 and 1618, if the rooftop box's computer detects that power to its backlights has been cut, as is described above with regard to numerals 1536 or 1540 of FIG. 77, step 1618 sends a message to the central system informing it of this change and of the time at which it took place.

As indicated at numerals 1620 and 1622, if the mobile unit's computer detects that power to the backlights is been returned after a previous outage, it causes a message to be generated and sent to the central system informing it of this change and of its time.

As indicated at numerals 1624 and 1626, if the rooftop box's computer detects that it's hard disk or other mass storage device is full to a certain predetermined extent, that computer will automatically generate a message to the central system informing it of this change and its time. This enables the central system to generate instructions to the mobile unit informing it of which of its stored display messages it should delete.

In other embodiments of the invention, other information can be obtained from the rooftop box computers in the form of requested status messages and spontaneously generated reports.

FIG. 79 briefly illustrates some of the status monitoring programming 1628 contained in computers of the central system. This status monitoring programming includes remote accessing programming 1632, which enables the central system to gain remote access to functions of a rooftop box's computer's operating system (OS) 168, shown in FIG. 75.

The rooftop box computers 140A contain wireless remote access programming 160B which enables those computers to turn over control of its operating system to the central system in response to messages received from the central system over the wireless communication link after appropriate verifications been made that the attempt to gain such remote access is from a trusted party.

Once the central system has gain such remote access, it is free to run various programs loaded in the rooftop box's mass storage device, including various diagnostic programs.

The central systems status monitoring program also includes status request programming 1634 which enables the central system to requests status reports, such as those described above with regard to steps 1610 through 1614 of FIG. 78.

The central system also includes status recording, analyzing, and reporting programming, 1636, 1638 and 1640, respectively. This programming enables the central system to record status information about all or part of its mobile units over time, and to perform analysis of that information and the output that results from such analysis, so it can be used to help the central system better utilize, maintain, and redesign the message display system.

It should be understood that the foregoing description and drawings are given merely to explain and illustrate, and that the invention is not limited thereto.

In particular, it should be noted that this application explains the present invention in more detail than is common in many patent applications. The inventors hope they will not be punished for providing the public with such a detailed teaching by having the scope of their claims limited to the detail of the particular embodiments shown. Punishing a more detailed teaching of an invention with a more limited interpretation of the claims would be contrary to one of the primary purposes of the patent system, which is to reward inventors for teaching their inventions to the public. In this application, it is intended that each claim be interpreted just as broadly as if this specification had included a separate block-level diagram having blocks and functional connections corresponding to each of the claim's recited elements and recited relationships between elements. Since such block diagrams would add no information to the application, and since their number would greatly impede any reading of this application, an effort has been made to make this application more readable by excluding such diagrams.

Considerable thought has been put into the wording of the following claims so that they will provide an accurate description of the scope of what the inventor considers to be his invention, and it is hoped that the meaning of the claims will be interpreted from their own wording rather than from the particulars of the one or more embodiments of the invention described in the specification. For example, where a dependent claim includes limitations not contained in a parent claim, the parent claim is meant to be read as not including that limitation, unless common sense would require a contrary interpretation among those skilled in the relevant technical art.

It should be understood that the behaviors described in the pseudo-code of the drawings, like virtually all program behaviors, can be performed by many different programming and data structures, using substantially different organization and sequencing. This is because programming is an extremely flexible art in which a given idea of any complexity, once understood by those skilled in the art, can be manifested in a virtually unlimited number of ways. Thus, the claims are not meant to be limited to the exact steps and/or sequence of steps described in the pseudo-code of the drawings. This is particularly true since the pseudo-code described in the text above has been highly simplified to let it more efficiently communicate that which one skilled in the art needs to know to implement the invention without burdening him or her with unnecessary details. In the interest of such simplification the structure of the pseudo-code described above often differs significantly from the structure of the actual code that a skilled programmer would use when implementing the invention. Furthermore, many of the programmed behaviors, which are shown being performed in software in the specification, could be performed in hardware in other embodiments. For example, those skilled in the programming arts will understand that where program is shown responding to inputs through a control loop or a deamon, in other embodiments of the invention a message, event based, or interrupt based architecture could be used.

In the embodiments of the invention discussed above, many of the various aspects of the invention are shown occurring together in a system. It should be understood that in other embodiments of the invention different subsets of one or more individual features of the invention would occur in a given system.

It should be understood that with regard to many aspects of the invention disclosed in the specification, functions which are described above as performed by the system's fixed or mobile units could in other embodiments of many aspects of the invention be performed by the central system, and functions described as performed by the central system could in embodiments of many aspects of the invention be performed by the system's fixed or mobile units. Also, it should be understood that all the capabilities and functionality, which are described above for mobile units are applicable to fixed units, unless they are inherently inapplicable to, fixed units.

It should be understood that the controller of the mobile unit and the processor of the central system might each actually contain more than one processor in some embodiments of the invention. Furthermore, it should be understood that in some embodiments of the invention the central system might be distributed, and, thus, be made of a plurality of separate computing systems, each with communication capability, whether there is a wireless transmitter and receiver separately associated with each such distributed computing system, or whether they are part of a unified communication system. Preferably in such distributed system all of the separate computer systems will be networked together so that the multiple computer systems can operate as a unit. In some embodiments of the invention, the central system might actually be composed of distributed functionality executed on the computational network formed by the system's plurality of display units.

In the embodiment of the invention shown in FIGS. 1, 7 20, 21, and 22 the positioning system used in the mobile unit is a GPS system. In other embodiments of the invention, any other currently, or hereafter, known location determining system could be used. As is discussed above with regard to FIG. 64, in some embodiments of the invention the mobile unit need not have a position determining system at all, and the wireless system used by the central system will locate the mobile unit based on information determined from the receipt of that message by various receivers within that wireless system.

In some of the embodiment of the invention described above the locator signals are transmitted by the same wireless system that is used to receive display-selection messages from the central system. It should be understood that in other embodiments of the invention the locator signals could be transmitted by a separate radio transmitter. For example, in some such embodiments the wireless system used for most data communication between the mobile units and the central system could be a cellular system, whereas the locator signals can be transmitted by separate radio transmitters, which is not part of the cellular system. In some such embodiments, the locator signals transmitted can contain little more information than an identification of the mobile unit itself. In such case, the central system will include additional wireless receivers designed to receive and determine the location of the transmission of such locator signals.

In FIGS. 1, 7, 20, 21, and 22 the GPS electronics 146 are shown as being connected to their respective display unit's controller. In other embodiments, the GPS (or other position detecting) electronics could have their output connected directly to electronics for transmitting the position values they determine to the central system, without having such position value pass to or through the display unit's controller.

In some embodiments of the invention UHF transmitter illustrated in FIGS. 7 and 19 might be driven in such a manner as to generate both data streams of the type described above with regard FIG. 8 as well as audio or visual signals which are designed to be received by a standard UHF television receiver. This would enable the UHF receiver to be used to generate messages which could be used to explain and promote the display system of the invention, provide programming content, and provide possible control information to the system's displays. To decrease the amount of potential bandwidth, such standard UHF messages which are intended to be received by standard UHF television receivers will divert from use for data streams of the type illustrated in FIG. 8, such standard UHF content could be transmitted only intermittently, or for only portions of video frames or fields.

The following paragraphs lists some additional aspects of the invention that can be incorporated into embodiments of the invention described above.

According to one aspect of the invention, a computer readable data structure recorded in machine readable memory is provided. The data structure comprises information relating to the number of people available to see a publicly displayed message in each of a plurality of physical locations at each of a plurality of times, including various times of day.

In some embodiments of this aspect of the invention, the plurality of locations include a plurality of outdoor locations. In some embodiments the information includes information relating to the numbers of different types of people available to see such messages at different locations and times. Such different types can include virtually any classification of types of people which are useful to those seeking to target messages to desired audiences, including sex, age, income, racial or ethnic background, employment type, sexual preference, location of residence, life style, religion, number of children; dress, prior purchasing information, behavioral information, and any other demographic or psycho graphic information which is considered useful in marketing.

In some embodiments the data structure's information includes information derived from data about the number of different types of people who live in areas associated with the individual physical locations. In some such embodiments, information relating to the number of people available to see a public display at a given location can be a function the population and/or demographics of the given location. In other such embodiments such information can be a function of the population or demographics of areas related to the given location, such as nearby locations or locations from which people travel through the given locations, such as be road or by train.

In some embodiments the information about the number of people available includes information derived from estimates of the foot traffic near said individual physical locations at various times of day. In some embodiments the information regarding available audience includes information derived from estimates of the automotive vehicle traffic near said individual physical locations at various times of day.

In some embodiments of this aspect the audience information is updated in response to electronic sensors in a plurality of physical locations.

In some such embodiments the electronic sensors include cameras and the audience information is updated in response to machine visual recognition of images captured by such cameras. It should be understood that the machine recognition need not be totally accurate or even close to totally accurate to help the system more accurately target the display of messages. Such visual recognition can be used to estimate the number of people in images from different locations at different times. Such visual recognition can also be used to estimate the number of different types of people in images from different locations at different times. For example, visual recognition could be used to estimate the race of potential people in the audience by measuring their skin color or facial features. It could estimate their age by their size and/or facial features. It could estimate their sex by their size and their dress. It could guess other information about people by their dress. In some embodiments the vision recognition is used to estimates the behavior of people in images from different locations at different times. This could include information about their proximity and angular position relative to the display, the likelihood of their attention toward the display, and the speed of motion relative to the display.

In some embodiments other types of machine perception could be used to obtain audience information. For example, audio information could be used to help determine the age and sex of potential viewers. Audio information could also-be used to identify the voice of individual speakers and/or whether or not the potential audience members are speaking about the display itself, or whether or not their words indicate they might belong to a given demographic or marketing group.

According to another aspect of the invention, a computerized method provides values for demographic attributes as a function of physical location and time. This method involves receiving input data comprising values of one or more demographic attributes at each of one or more given discrete locations in physical space and time, in which the inputs include variations in values over a period at least as short as a week. The method smoothes these values over location and/or time so as to produce a set of values for each of the input attributes which vary at a higher spatial and/or temporal resolution than the input data. The method responds to queries for a given one of the attributes' values at a given location and time by producing such smoothed values for the attribute.

The input data can include attribute value associated with point locations and/or geographic zones. Where values for point locations are received, the method smoothes values between points. Where values for zones are received, the method smoothes values across zones, such as for example associating the value for a zone with its center point and then smoothing values between such center points.

In some embodiments of this aspect of the invention, the smoothed values could be generated dynamically at the time of a query. In other embodiments, the smoothed data could be stored in the database. In some embodiments the smoothed data itself could involve discrete values associated with different zones, but at a higher resolution than the resolution of the input data. In other embodiments, particularly those in which the data is calculated on the fly in response to queries, the resolution of the smoothed data can be as fine as the resolution of the information as to the location for which the attribute value is being requested.

According to another aspect of the invention, a computerized method of provides values for multiple different demographic attributes as a function of physical location and time. The method receives input data comprised of values of each of a plurality of demographic attributes as a function of physical location and/or time. The method performs statistical inference from the input data to calculate inferred values of demographic attributes for physical locations and/or time for which such attribute values are not explicitly included in said input data. The method responds to queries for a value of an attribute, which is not including in said input data by producing one of said inferred values.

For example, if the input data includes an estimate of the number of Hispanic available to see a message at a given location and time, but does not have an estimate of the number of such Hispanics are professions, it can statistically infer than number by multiplying the number of Hispanics at the given location by percentage of Hispanics in general who are professionals. Although such inference is not always accurate, it often provides a reasonable estimate.

For another example, if the input data includes the percent of the foot traffic at a given location that is comprised of professional people, but no specific information about how amount of professional foot traffic varies over time, and if the input information includes general data about how the amount of foot traffic in general varies over time, then the system can multiply the figure of specific professional foot traffic at the given location by the general variations in foot traffic as a function of time to derive an estimate of the amount of professional foot traffic at different times at the given -location.

According to another aspect of the invention, a computerized method individually selects which messages to show on each of a plurality of publicly visible, networked, electronic displays. The method stores demographic information relating to the number of different types of people available to see a publicly displayed message in each of a plurality of physical locations at each of a plurality of times, including various times of day. The method stores for each of a plurality of messages targeting information about the one or more desired demographic audiences for said message. The method obtains from the demographic information for each of a plurality of display availabilities, each associated with publicly display at a given location and time. The information obtained for each display availability includes estimated audience information, including an estimate of the numbers of different types of people available to see a message shown at said display availability. The method calculates a score as a function of the match between the targeting information associated with each of said plurality of messages and the audience information associated with a display availability. The method further includes selecting which of said messages to show in a given display availability as a function of the relative values of said scores calculated for said different messages.

In some embodiments of this aspect of invention the criteria only vary with regard to location, and not time. In others, the criteria vary both as a function of location and time. In some embodiments of this aspect of the invention, the displays are publicly visible displays. In some embodiments at least some of the displays are mobile, causing them to be located at different locations at different points and time. In some embodiments the individual displays have associated with them sensors that are used to help update the demographic database used by the method.

According to another aspect of the invention, a computerized method individually selects which messages to show on each of a plurality of networked electronic displays. The method stores for each of a plurality of messages one or more criteria desired for showings of said message. The method further stores in machine readable memory information relating to the number of people available to see a publicly displayed message in each of a plurality of physical locations at each of a plurality of times, including various times of day. The method obtains information regarding the values for said criteria associated with a given display availability (i.e., the opportunity to display a message on a given one of said displays at a given time). The method calculates a score as a function of the match between the criteria associated with each of said plurality of messages and the values for such criteria associated with said given display availability. And the method selects which of said messages to show in a given display availability as a function of the relative values of said scores calculated for said messages.

In some embodiments of this aspect of the invention, the individual displays have different geographic locations; and the obtaining of information regarding the values for said criteria associated with a given display availability includes obtaining values for one or more of said criteria as a function of geographic location of the individual display associated with the display availability. In some such embodiments such information will be obtained from a database having values for each of a plurality of locations. In other such embodiments in which such decisions are made separately for individual ones of said displays, which are at one fixed location, a portion of said database associated with the given location of an individual display will be accessed to obtain information relating to that display.

According to another aspect of the invention, a computerized method of displaying individual messages on individual electronic displays in a network of such displays comprises the following:

Providing an estimate of a number of people available to watch a showing of a message on a given individual display; and charging a party for the showing of a given message on the given display as a function of said number of people.

In some embodiments of this aspect of the invention, the number of people used to calculate the charge is a number of one or more particular types (i.e. demographic groupings) of people.

In some embodiments of this aspect of the invention, the estimate of the number of one or more particular types of people available to watch a showing of a message includes making such estimate for a display at on a given display at a given time. Such embodiments store for each of a plurality of messages an indication of the amount a party has agreed to pay for having the message shown to a number of one or more particular types of people. Such embodiments select which of said messages to show on a given display at a given location and time as a function of the relative amount of money which can be charged for showing each such message at the given location and time, given the estimate of the number of said one or more particular types of people estimate for the given time and location and the indication of the amounts which have been agreed to be paid for the showing of each message to a number of one or more particular types of people.

In some embodiments of this aspect of the invention, the estimate of the number of people is based on the physical location of the given display. In some such embodiments the estimate of the number of people is also based on the time of day in which the message is shown.

In some embodiments of this aspect of the invention, the electronic displays are publicly visible.

In some embodiments of this aspect of the invention, the estimate of said number of people is based on computerized perception. In some such embodiments the estimate of said number of people is a function of computerized visual perception of one or more images taken by cameras located near the given individual display. In some embodiments of the estimate of said number of people is a function of computerized voice perception of sound obtained by microphones located near the given individual display. In some embodiments the estimate of said number of people is provided for the showing of a message at a given time and said estimate is a function of computerized perception of data gathered near the given individual display within an hour of said given time. In some embodiments of the estimate of said number of people is provided for the showing of a message at a given time and said estimate is a function of computerized perception of data gathered at one or more times more than an hour before said given time.

Except when the language of a claim implies otherwise, reference to a display is meant to refer to either a fixed or a mobile display. Fixed displays are meant to include large billboard sized displays as well as smaller displays, including without limitation those which might be placed on the sides of buildings, inside buildings, or on the sides of phone booths.

As used in this specification the word demographic means information as to overall population, and information as to numbers of different types of people, including virtually any classification of types of people which are useful to those seeking to target messages to desired audiences, including sex, age, income, racial or ethnic background, employment type, location of residence, life style, sexual preference, religion, number of children, dress, prior purchasing information, behavioral information, current activity, current location, or any other demographic or psycho graphic information which is considered useful in marketing products, services, political candidates or view, and the ideas.

According to one aspect of the invention, a computerized method individually selects which messages to show on each of a plurality of networked electronic displays. The method includes calculating, for each of a plurality of messages, which are to be shown on displays of the network, a desired display rate as a function of a desired number of exposures of such messages to be made within a remaining period of time. The method selects which of possible messages to show on an individual display as a function of the relative values of the desired display rates associated with different messages, so as to favor the selection of messages having a higher desired display rate. The method then uses information that a given message has been selected to be shown on a given display to update the calculation of the desired display rate for given message by decreasing the number of showings of the given message which are to be made a remaining period of time associated with the message.

In some embodiments of this aspect of the invention, the number of exposures used in calculating the desired display rate is a function of a number of people estimated to have seen showings of a given message, so that in calculating the desired display rate not only the number of prior showings of a message is relevant, but also an estimate of a number of people who have seen each such showing is used. In some such embodiments the number of people used to calculate said number of exposures is a number of one or more particular type of people, such as a number of people belonging to one or more demographic groups.

In some embodiments of this aspect of the invention, the electronic displays are publicly visible displays. In some such embodiments electronic displays have a fixed location, in sound they are mobile, and in others that a mixture of text and mobile displays.

In some embodiments of this aspect of the invention, the selection of which messages to show on individual display is made locally by computational equipment associated with individual displays, but information as to what messages have been shown on individual displays are communicated to other displays, either directly, or through a central system, so as to enable a information about the desired display rate for different messages used by such local computational equipment to be updated to reflect the showings of individual messages which have been made by other displays.

In some embodiments of this aspect of the invention, the selecting all of which messages to show on an individual display is performed not only as a function of the relative values of the desired display rate associated with different messages, but also as a function of the match between values for one or more criteria which vary between individual displays as a function of location and/or time and desired values of those one or more criteria associated with individual messages. In some such embodiments the one or more criteria include one or more demographic criteria concerning an estimate of the number of people of a given demographic category available to view a given showing of a message at a given display.

According to another aspect of the invention, a computerized method of individually selecting which messages to show on each of a plurality of networked electronic displays is provided which includes storing for each of a plurality of messages one or more criteria desired for showings of said message. The method obtains information regarding the values for said criteria associated with a given display availability (i.e., the opportunity to display a message on a given one of said displays at a given time). The method further calculates a score as a function of the match between the criteria associated with each of said plurality of messages and the values for such criteria associated with said given display availability. The method then selects which of said messages to show in a given display availability as a function of the relative values of said scores calculated for said messages.

In some embodiments of this aspect of the invention, the displays have different geographic locations; and the obtaining of information regarding the values for said criteria associated with a given display availability includes obtaining values for one or more of said criteria as a function of geographic location of the individual display associated with the display availability.

In some embodiments of this aspect of the invention, the displays are publicly visible displays. In some embodiments the one or more criteria include one or more demographic criteria concerning an estimate of the number of people of a given demographic category available to view a given showing of a message at a given display.

According to another aspect of the invention, a computerized method of individually selecting which messages to show on each of a plurality of networked electronic displays includes providing, for each of a plurality of messages which are to be shown on displays of the network, an indication of a desired number of remaining exposures. The method selects which of possible messages to show on an individual display as a function of the desired number of remaining exposures associated with different messages. The method then uses information that a given message has been selected to be shown on a given display to update the desired number of remaining exposures for the given message.

In some embodiments of this aspect of the invention, the selection of which message to show on each of a plurality of said individual display is made by a local computer associated with each such individual display; and the updating of the desired number of remaining exposures for a given message includes communicating information that a given message has been selected to be shown on a given display by the given displays associated local computer to local computers associated with other displays so that those other displays can use the updated desired number of remaining exposures into account when make their selection as to what messages to display on their associated display.

In some embodiments of this aspect of the invention, the desired number of remaining exposures for each message is a function of a number of people estimated to have already seen individual showing of the message.

In some embodiments of this aspect of the invention, of the number of people used to calculate said number of exposures is a number of one or more particular types of people.

Except when the language of a claim implies otherwise, reference to a display is meant to refer to either a fixed or a mobile display. Fixed displays are meant to include large billboard sized displays as well as smaller displays, including without limitation those which might be placed on the sides of buildings, inside buildings, or on the sides of phone booths.

What we claim is:

1. A system for publicly display messages comprising:
   (a) an automotive vehicle having an automotive electrical system including an ignition system and a generator for generating electricity when the vehicles ignition system is on; and
   (b) the following elements carried by the vehicle:
      (1) a publicly visible electronic backlit display including one or more backlights;
      (2) video drive circuitry for generating signals to cause images to be shown on said display; and
      (3) display-power circuitry for receiving power from the vehicle's automotive electrical system and supplying that power to said one or more backlights, and for automatically reducing said power supplied to said one or more backlights after the vehicle's ignition is turned off and for turning said backlights off at a time after the ignition is shut off.

2. A system for publicly displaying messages comprising:
   (a) an automotive vehicle having, an automotive electrical system including an ignition system and a generator for generating electricity when the vehicles ignition system is on, and;
   (b) the following elements carried by the vehicle:
      (1) a publicly visible electronic display;
      (2) video drive circuitry for generating signals to cause images to be shown on said display, wherein said computer is programmed to shut down more than a certain time after said ignition is shut off; and
      (3) display-power circuitry for receiving power from the vehicle's automotive electrical system and supplying that power to said display, and for automatically reducing said power supplied to said display after the vehicle's ignition is turned off whether or not said computer is operating and without turning off said computer.

3. The system as in claim 2, further including circuitry carried by said vehicle that provides power to the computer to turn it back on once the ignition is turned back on.

\* \* \* \* \*